United States Patent
Gray et al.

(10) Patent No.: US 9,427,945 B2
(45) Date of Patent: Aug. 30, 2016

(54) EXTENDABLE SELF-SUPPORTING MATERIAL COMPOSITES AND MANUFACTURE THEREOF

(71) Applicant: Liberman Distributing and Manufacturing Co., Saint Paul, MN (US)

(72) Inventors: David A. Gray, Saint Paul, MN (US); Robert M. Hume, Woodbury, MN (US); David L. Safranski, Atlanta, GA (US)

(73) Assignee: Liberman Distributing and Manufacturing Co., Saint Paul, MN (US)

( * ) Notice: Subject to any disclaimer, the term of this patent is extended or adjusted under 35 U.S.C. 154(b) by 514 days.

(21) Appl. No.: 13/731,944

(22) Filed: Dec. 31, 2012

(65) Prior Publication Data
US 2013/0196120 A1    Aug. 1, 2013

Related U.S. Application Data

(60) Provisional application No. 61/631,284, filed on Dec. 30, 2011.

(51) Int. Cl.
*B32B 3/02* (2006.01)
*B32B 7/12* (2006.01)
(Continued)

(52) U.S. Cl.
CPC ............... *B32B 37/06* (2013.01); *B32B 1/00* (2013.01); *B32B 3/28* (2013.01); *B32B 7/12* (2013.01);
(Continued)

(58) Field of Classification Search
None
See application file for complete search history.

(56) References Cited

U.S. PATENT DOCUMENTS

| 2,990,081 A | 6/1961 | De Neui et al. |
| 3,073,544 A | 1/1963 | Cirves et al. |

(Continued)

FOREIGN PATENT DOCUMENTS

| EP | 1921120 A1 | 5/2008 |
| EP | 1928018 A2 | 6/2008 |

(Continued)

OTHER PUBLICATIONS

"Fascinating Silicone Chemistry Corner Physical & Chemical Properties", obtained Aug. 13, 2011 and May 22, 2013, Dow Corning, http://www.dowcorning.com/content/discover/discoverchem/properties.aspx.

(Continued)

*Primary Examiner* — Vivian Chen
(74) *Attorney, Agent, or Firm* — Knowles IP Strategies, LLC; Brent R Bellows

(57) ABSTRACT

Specific composite materials described herein are based on the discovery that certain selections of materials and manufacturing conditions and processes provide unexpectedly improved self-supporting thin-film composite materials. It has been discovered that certain combinations of backing materials, shrink film materials, and manufacturing conditions provide improved composites having highly controllable, readily repeatable, and stable arc shaped cross-web curled structures. In general, the composite materials described herein comprise a dimensionally alterable film such as a polyester shrink film having a first surface and a second surface, and a polyester backing material having a first surface and a second surface, wherein the second surface of the backing material is laminated to the first surface of the dimensionally alterable film. Upon activation of the alterable film, for example upon exposing the composite material comprising the polyester heat shrink film to heat, the composite material can be imparted with an arc shaped cross-web curled structure along it longitudinal width, resulting in resistance to bending in its axial length, and a self-supporting material.

32 Claims, 28 Drawing Sheets

(51) Int. Cl.
*B32B 27/08* (2006.01)
*B32B 27/16* (2006.01)
*B32B 27/36* (2006.01)
*B32B 27/40* (2006.01)
*B32B 37/12* (2006.01)
*C08K 5/1515* (2006.01)
*C09J 5/06* (2006.01)
*C09J 133/04* (2006.01)
*C09J 133/06* (2006.01)
*C09J 175/04* (2006.01)
*B29C 65/48* (2006.01)
*B29C 71/00* (2006.01)
*B32B 37/06* (2006.01)
*B32B 3/28* (2006.01)
*C09J 7/02* (2006.01)
*B32B 38/18* (2006.01)
*B32B 27/12* (2006.01)
*B32B 1/00* (2006.01)
*C08K 5/00* (2006.01)
*B32B 38/00* (2006.01)
*B32B 37/14* (2006.01)
*B32B 27/26* (2006.01)

(52) U.S. Cl.
CPC .............. *B32B 27/08* (2013.01); *B32B 27/12* (2013.01); *B32B 27/36* (2013.01); *B32B 38/1866* (2013.01); *C09J 7/0296* (2013.01); *B29C 65/485* (2013.01); *B29C 65/4835* (2013.01); *B29C 71/00* (2013.01); *B32B 3/02* (2013.01); *B32B 27/16* (2013.01); *B32B 27/26* (2013.01); *B32B 27/40* (2013.01); *B32B 37/12* (2013.01); *B32B 37/1207* (2013.01); *B32B 37/144* (2013.01); *B32B 38/0036* (2013.01); *B32B 2037/1253* (2013.01); *B32B 2037/1269* (2013.01); *B32B 2037/1276* (2013.01); *B32B 2250/03* (2013.01); *B32B 2250/24* (2013.01); *B32B 2307/50* (2013.01); *B32B 2307/734* (2013.01); *B32B 2307/736* (2013.01); *B32B 2309/02* (2013.01); *B32B 2367/00* (2013.01); *B32B 2405/00* (2013.01); *C08K 5/0025* (2013.01); *C08K 5/1515* (2013.01); *C09J 5/06* (2013.01); *C09J 133/04* (2013.01); *C09J 133/06* (2013.01); *C09J 175/04* (2013.01); *C09J 2467/006* (2013.01); *C09J 2467/008* (2013.01); *Y10T 428/24628* (2015.01); *Y10T 428/31565* (2015.04); *Y10T 428/31616* (2015.04)

(56) References Cited

U.S. PATENT DOCUMENTS

| | | | |
|---|---|---|---|
| 3,109,207 A | 11/1963 | Cooper | |
| 3,132,204 A | 5/1964 | Giellerup | |
| 3,409,988 A | 11/1968 | Zelnick | |
| 3,510,037 A | 5/1970 | Sharpe | |
| 3,625,810 A | 12/1971 | Swartz | |
| 3,635,754 A * | 1/1972 | Beede | 428/349 |
| 3,718,495 A | 2/1973 | Tomita | |
| 4,049,483 A * | 9/1977 | Loder et al. | 156/230 |
| 4,149,320 A | 4/1979 | Troyer et al. | |
| 4,199,646 A * | 4/1980 | Hori et al. | 428/344 |
| 4,248,748 A * | 2/1981 | McGrath et al. | 524/271 |
| 4,256,528 A | 3/1981 | Patterson | |
| 4,313,991 A | 2/1982 | Lamb | |
| 4,315,047 A | 2/1982 | Seabold et al. | |
| 4,341,585 A | 7/1982 | Seabold et al. | |
| 4,448,947 A * | 5/1984 | Miyake | C08G 18/701 528/44 |
| 4,471,103 A * | 9/1984 | Miyake | C08G 18/701 528/65 |
| 4,856,509 A | 8/1989 | Lemelson | |
| 5,005,264 A | 4/1991 | Breen | |
| 5,314,749 A | 5/1994 | Shah | |
| 5,326,605 A * | 7/1994 | Ono | C09J 4/06 428/220 |
| 5,391,602 A * | 2/1995 | Skoultchi | C08G 18/282 522/90 |
| 5,462,797 A * | 10/1995 | Williams | C08F 283/006 428/345 |
| 5,518,763 A | 5/1996 | Patnode et al. | |
| 5,533,503 A | 7/1996 | Doubek et al. | |
| 5,605,738 A | 2/1997 | McGinness et al. | |
| 5,611,333 A | 3/1997 | Johnson | |
| 5,653,224 A | 8/1997 | Johnson | |
| 5,669,894 A | 9/1997 | Goldman et al. | |
| 5,718,224 A | 2/1998 | Muchin | |
| 5,725,814 A | 3/1998 | Harris | |
| 5,725,947 A * | 3/1998 | Johannsen | B32B 7/06 428/354 |
| 5,837,789 A | 11/1998 | Stockhausen et al. | |
| 5,859,116 A * | 1/1999 | Shih | 524/493 |
| 5,890,486 A | 4/1999 | Mitra et al. | |
| 5,939,342 A * | 8/1999 | Bragole | B32B 5/26 428/137 |
| 5,953,826 A | 9/1999 | Goodyer et al. | |
| 6,001,200 A | 12/1999 | Hibler | |
| 6,029,658 A | 2/2000 | De Voss | |
| 6,067,722 A | 5/2000 | Goodyer et al. | |
| 6,098,616 A | 8/2000 | Lundy, Jr. et al. | |
| 6,244,265 B1 | 6/2001 | Cronk et al. | |
| 6,256,938 B1 | 7/2001 | Daton-Lovett | |
| 6,362,306 B1 * | 3/2002 | Shelby et al. | 528/308.7 |
| 6,372,341 B1 | 4/2002 | Jung et al. | |
| 6,395,348 B1 | 5/2002 | O'Connor | |
| 6,518,359 B1 * | 2/2003 | Clemens | C08G 18/0823 428/355 N |
| 6,602,574 B1 | 8/2003 | Daton-Lovett | |
| 6,631,714 B2 | 10/2003 | Von Duyke et al. | |
| 6,680,097 B1 | 1/2004 | Amberger et al. | |
| 6,694,970 B2 | 2/2004 | Spinelli et al. | |
| 6,740,379 B1 | 5/2004 | Congard et al. | |
| 6,769,429 B1 | 8/2004 | Benetti | |
| 6,967,261 B1 | 11/2005 | Soerens et al. | |
| 7,107,698 B2 | 9/2006 | Liao | |
| 7,114,495 B2 | 10/2006 | Lockwood, Jr. | |
| 7,128,863 B2 * | 10/2006 | Kim et al. | 264/210.8 |
| 7,462,753 B2 | 12/2008 | Ma et al. | |
| 7,528,291 B2 | 5/2009 | Herfert et al. | |
| 7,541,395 B2 | 6/2009 | Reimann | |
| 7,541,510 B2 | 6/2009 | Beaudry | |
| 8,953,327 B1 * | 2/2015 | Salmon | G06F 1/1652 160/242 |
| 2001/0019764 A1 | 9/2001 | Bries et al. | |
| 2002/0000227 A1 | 1/2002 | Von Duyke et al. | |
| 2002/0050318 A1 | 5/2002 | Donaldson et al. | |
| 2003/0068492 A1 * | 4/2003 | Husemann et al. | 428/355 AC |
| 2003/0113533 A1 * | 6/2003 | Husemann et al. | 428/343 |
| 2003/0182878 A1 | 10/2003 | Warren | |
| 2003/0230379 A1 | 12/2003 | Roubik | |
| 2004/0077744 A1 | 4/2004 | Naylor et al. | |
| 2005/0003222 A1 * | 1/2005 | Everaerts et al. | 428/522 |
| 2005/0011665 A1 | 1/2005 | Youngers et al. | |
| 2005/0074606 A1 | 4/2005 | Nishiyama et al. | |
| 2007/0044801 A1 | 3/2007 | Mathis et al. | |
| 2007/0141126 A1 | 6/2007 | Hudson et al. | |
| 2007/0172684 A1 * | 7/2007 | Husemann et al. | 428/522 |
| 2008/0058858 A1 | 3/2008 | Smith | |
| 2008/0131634 A1 | 6/2008 | Kiuchi et al. | |
| 2008/0233320 A1 | 9/2008 | Fink et al. | |
| 2009/0016209 A1 | 1/2009 | Ikeda et al. | |
| 2009/0324883 A1 * | 12/2009 | Gray et al. | 428/136 |
| 2012/0004683 A1 | 1/2012 | Gray et al. | |

FOREIGN PATENT DOCUMENTS

| | | |
|---|---|---|
| EP | 1866895 | 5/2010 |
| GB | 2363204 A | 12/2001 |

(56) References Cited

FOREIGN PATENT DOCUMENTS

| JP | H07-137190 A | 5/1995 |
|---|---|---|
| JP | 2005-061212 | 3/2005 |
| JP | 2006-168005 A | 6/2006 |
| WO | WO 01/56777 | 8/2001 |
| WO | 2005061642 A1 | 7/2005 |
| WO | WO 2007/056715 A2 | 5/2007 |
| WO | WO 2009/132284 | 10/2009 |
| WO | WO 2009/158234 | 12/2009 |
| WO | 2010026163 A1 | 3/2010 |
| WO | WO 2012/003435 | 1/2012 |

OTHER PUBLICATIONS

"Si—Silicon", obtained Aug. 13, 2011, Ioffe Physical Technical Institute, http://www.ioffe.rssi.ru/SVA/NSM/Semicond/Si/mechanic.html.

International Search Report and Written Opinion from corresponding PCT Application PCT/US2012/072321, (dated Apr. 19, 2013).

Kebadze, et al., "Bistable prestressed shell structures" International Journal of Solids and Structures, vol. 41, 2004, pp. 2801-2820.

Mattioni, et al., "The application of residual stress tailoring of snap-through composites for variable sweep wings" 47$^{th}$ AIAA/ASME/ASCE/AHS/ASC Structures, Structural Dynamics, and Materials Conference May 1-4, 2006, Newport, Rhode Island.

Satas, Donatas. "Handbook of Pressure Sensitive Adhesive Technology" 3rd ed., Warwick, RI: Satas & Associates, 1999, pp. 515-549.

Supplementary European Search Report and Opinion from EP09771242.6.

Final Rejection mailed Jul. 13, 2016 from U.S. Appl. No. 14/752,251.

* cited by examiner

| Material | Young's Modulus (GPa) | Young's Modulus (psi) | Yield Strength (MPa) | Ultimate Strength (MPa) | Density (g/cm$^3$) |
|---|---|---|---|---|---|
| Low Density Polyethylene | 0.2 | 30,000 | — | — | — |
| Polypropylene | 1.5 – 2 | 217,000 – 290,000 | 12 – 43 | 19.7 – 80 | 0.91 |
| HDPE | 1.379 | 200,000 | 26 – 33 | 37 | 0.95 |
| Polyethylene terephthalate | 2 – 2.5 or 2.8 – 3.1 | 290,000 – 360,000 | — | — | — |
| Polystyrene | 3 – 3.5 | 435,000 – 505,000 | — | — | — |

FIG. 11

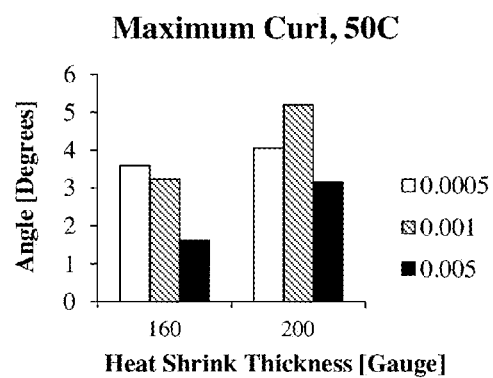
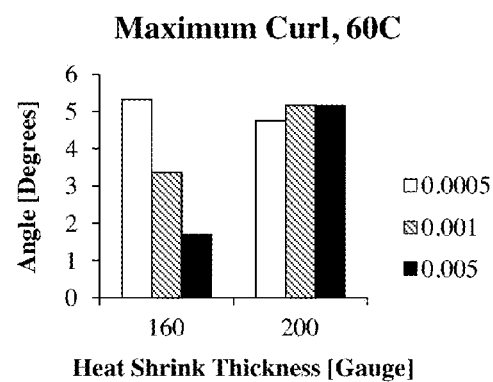
FIG. 20A
FIG. 20B
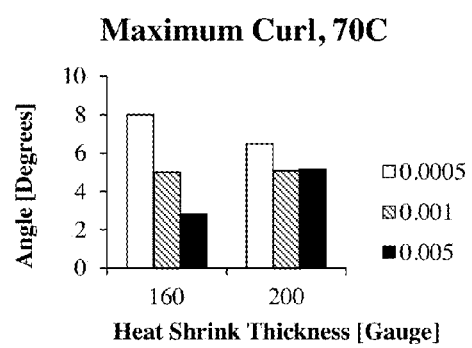
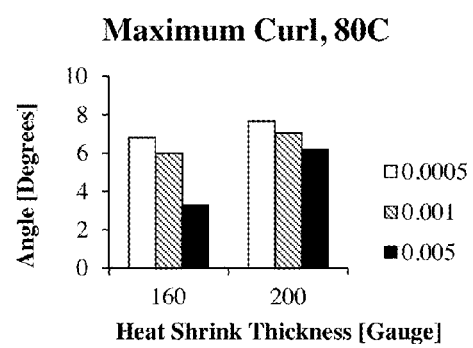
FIG. 20C
FIG. 20D

EXTENDABLE SELF-SUPPORTING MATERIAL COMPOSITES AND MANUFACTURE THEREOF

RELATED APPLICATIONS/PATENT INCORPORATION BY REFERENCE

This application claims priority from Provisional U.S. Patent Application Ser. No. 61/631,284 filed Dec. 30, 2011, which is expressly incorporated by reference.

FIELD OF THE INVENTION

The present invention is in the field of composite materials that have controlled alterable dimensions, such as a dimensionally controlling film, such as a shrink film, with a backing material and the use and manufacture of the composite material thereof. The composite material has self-supporting characteristics and has improved physical properties, which improved physical properties may include any one or more of a fracture-resistant characteristic between a shrink film and backing material, for example, delamination, extended stable bending moments, improved flexibility while maintaining strength, and/or increased shelf life.

BACKGROUND OF THE INVENTION

U.S. Patent Publication No. 20090324883 to Gray et al. describes self-supporting extendable materials that are capable of extending rigidly a certain distance without coiling or curling onto themselves, or coiling or curling prematurely onto a receiving substrate. The application describes the manufacture of materials into sheets and/or rolls. In one embodiment, the application describes the use of these self-extendable materials in pressure-sensitive tape applications, for example masking tape and medical tape, which allows the tape to maintain its flexibility, pliability, and ability to conform to the surface to which it may be applied to without coiling or curling onto itself when dispensed from a roll.

According to U.S. Patent Publication No. 20090324883, one method for imparting to a material the ability to extend rigidly comprises constructing a laminate material having a backing and a shrink film, wherein heat is applied to the composite resulting in the contraction or shrinking of the shrink film along a single axis. The differential and directional contraction of the shrink film with respect to the backing material imparts a curvature along the longitudinal width of the composite material which accounts for its self-supporting extendable characteristics.

U.S. application Ser. No. 13/175,024 and PCT/US 11/42780 to Gray et al. describe nasal dilators comprised of a composite base element having a spring element that imparts resiliency into the base element and provides the base element with return properties towards a planar conformation during use. The Gray et al. applications describe a base element that includes a shrink material, which, upon heating, creates the spring element within the base element, imparting the resiliency into the base element. In one embodiment, the base element is comprised of a backing material laminated to a shrink film, wherein the shrink film shrinks or contracts upon heating, creating the spring element.

U.S. Publication No. 20080131634 to Kiuchi et al describes a self-rolling laminated sheet comprising a shrinkable film layer which is contractible in a longitudinal direction when exposed to heat. As described, the sheet rolls up in a longitudinal direction from a longitudinal end to form one tubular roll or rolls up from two opposing longitudinal ends toward a center of the two opposing longitudinal ends to form two tubular rolls, when the self-rolling sheet is stimulated to induce the contraction of the shrinkable film layer. According to the disclosure, the purpose of the self-rolling laminate is to allow the easy removal of the sheet from a fragile adherend such as a computer chip without causing damage to or a contamination on the adherend.

SUMMARY OF THE INVENTION

Specific composite materials described herein are based on the discovery that certain selections of materials and manufacturing conditions and processes provide unexpectedly improved self-supporting thin-film composite materials. It has been discovered that certain combinations of backing materials, shrink film materials, and manufacturing conditions provide improved composites having highly controllable, readily repeatable, and stable arc shaped cross-web curled structures. In general, the composite materials described herein comprise a dimensionally alterable film such as a shrink film having a first surface and a second surface, and a backing material having a first surface and a second surface, wherein the second surface of the backing material is laminated to the first surface of the dimensionally alterable film. Upon activation of the alterable film, for example upon exposing the composite material comprising a heat shrink film to heat, the composite material can be imparted with an arc shaped cross-web curled structure along it longitudinal width, resulting in resistance to bending in its axial length. This resistance to bending provides the composite material with an improved structural rigidity compared to the same composite material without the induced cross-web curled structure. In addition, this resistance to bending allows the composite material to be self-supporting and displaces the composite materials' bending moment distally compared to the same composite material without the imparted cross-web curled structure. As such, composite materials with such cross-web curled structures can acquire the performance characteristics of much thicker or stiffer materials, allowing for material use reductions in certain applications.

In particular, the selection and use of specific shrink films, optionally in combination with selected adhesives, as described herein, can provide improved performance, including for example but not limited to, decreased fracture between the shrink film and backing, increased peel strength between the shrink film and backing, flexibility, clarity, strength, and/or durability, and precise control of the degree of arc of the cross-web curl structure.

In general, it has been discovered that thin films with high surface energy tend to provide ideal composite materials for the production of a stable cross-web curled structure that exhibits the desired self-supporting characteristic. Backing materials and shrink films with a surface energy for example of at least about 35 dynes/cm, and preferably over 36, 37, 38, 39 or 40 dynes/cm (measured either without treatment that increases the surface energy, such as corona, heat, light, other radiation, solvent or abrasion or other known technique that achieves such result or alternatively after treatment at the time of lamination) may provide improved characteristics to the stable cross-web curled structure. Particularly useful composite materials for utilizing stable cross-web curled structure with extended bending moments include a polyester backing and a polyester shrink film. In one embodiment, the polyester backing is PET (polyethylene terephthalate) and the shrink film is a PET, which in one embodiment can be a PETG (glycol-modified polyethylene terephthalate). The polyester backing can be laminated to the polyester-based shrink film using any suitable adhesive that provides high peel strength, for example, a permanent or near-permanent laminating adhesive which may be a permanent pressure sensitive adhesive, such as a permanent pressure sensitive adhesive acrylic (which in one embodiment is solventless) or another type of laminating adhesive, for example an epoxy, a urethane or polyurethane-based adhesive, which in certain embodiments may be selected from 2-component polyurethanes, polyurethane dispersions such as polyurethane dispersions, polyurethane dispersions with epoxy cross-linkers, or hybrid polyurethane dispersion/acrylic emulsions with epoxy cross-linkers, or a polyester-based adhesive which in certain embodiments may be polyester based adhesives with isocyanate cross-linkers, or a copolymer of a polyester such as a polyester polyurethane. In one embodiment, the adhesive is a heat curing adhesive that cures at a temperature at or below the initial activation temperature of the shrink film contained in the composite material. In one particular embodiment, the adhesive is a water-based hybrid polyurethane dispersion/acrylic emulsion with an epoxy cross-linker.

In some cases, certain laminating adhesives may be used at a thinner coat weight than, for example, a permanent pressure sensitive adhesive acrylic, allowing a decrease in the overall thickness of the material, improving the composite's properties such as flexibility. In one embodiment, the adhesive is applied to achieve a thickness of the adhesive between the backing and the alterable film of less than about 0.25 mils, and preferably about 0.1 mils or less.

It has also been discovered that the use of adhesives that continue to cure over a long period of time can affect shelf-life and stability of the cross-web curled structure within the composite. For example, some epoxy adhesives continue to cure over weeks or even months. This prolonged cure behavior can affect the stability of the cross-web curl which is responsible for the self-supporting characteristics of the composite and can induce changes in the properties of the composite over time. There is a short period after inducing the curl that the adhesive may be completing its cure, for example up to a day or more or up to one or two weeks; however, prolonged adhesive cure adversely affecting the properties of the composite, such as flexibility or curl structure, is undesired. In one particular embodiment, a composite having a cross-web curled structure is provided that includes an adhesive disposed between the backing material and shrink film that does not significantly continue to cure after the desired specifications of the product are achieved in such a way that the bending moment and, thus, self-supporting characteristic, is adversely affected, the degree of arc of the cross-web curl is diminished, or that the composite becomes too rigid to perform its function. In certain other embodiments, the final cross-web curled stable structure has a stable shelf life (which means that the composite does not significantly change cross-web curl structure arc degree and, thus, its bending moment or flexibility) over at least six months. In another embodiment, a composite having a cross-web curled stable structure is provided having a stable shelf life over at least 9, 12, or 18 months. This can be achieved by using a short cure adhesive, a number of which are known in the art. For example, in one embodiment, the short cure adhesive substantially cures within two weeks from exposure to the final cure condition (i.e., the exposure to heat for a heat curing adhesive or the exposure to UV radiation for a UV curing adhesive); that is, the adhesive does not exhibit substantial (more than 5%) continuing cure past two weeks from exposure to the final cure condition. In another embodiment, the short cure adhesive substantially cures within one week from the final cure condition; that is, the adhesive does not exhibit substantial (more than 5%) continuing cure past one week from exposure to the final cure condition. In one embodiment, the short cure adhesive substantially cures within between about 12-48 hours; that is the adhesive does not exhibit substantial (more than 5%) continuing cure past between about 12-48 hours from exposure to the final cure condition. In other embodiments, the improved self-supporting material is manufactured with a permanent laminate that is substantially cured in one day or less, two days or less, or three, four five six or seven days or less.

In one embodiment, composite materials are provided preferably having near-permanent or permanent bonds (i.e., a peel strength of at least 35 oz./in. or greater) between the backing material and alterable film. In one embodiment the peel strength between the shrink film and the backing material is preferably at least about 35 oz./in., and more particularly, at least about 40, 50, 60, 70 oz./in. or greater, as measured using the PSTC-1 standard peel test (peel adhesion for single coated pressure-sensitive tapes at a 180° angle).

Importantly, the degree of cross-web curled structure that can be imparted into the composite material can be controlled, allowing the same composite material to have various resistance to bending profiles—and thus rigidity profiles—based on the degree of arc of the cross-web curl. In one non-limiting example, a composite material with a cross-web curled structure having a degree of arc of, for example, 45° will have a more rigid profile than the same composite material with a degree of arc of, for example, 20°—and a comparatively greater extension of its bending moment—and a less rigid profile than the same composite material with a degree of arc of, for example, 90°—and a comparatively lesser extension of its bending moment. The degree of arc of the cross-web curl structures imparted in the composite materials described herein can be controlled so that the composite materials have controlled, constant imparted arc-shaped cross-web curled structures of at least about 5°, at least about 15°, at least 25°, at least 35°, at least 45°, at least 60°, at least 75°, at least 90°, at least 120°, at least 150°, at least about 180° or greater, but less than 360°. Thus, the degree of arc can be controlled so that the structure when extended does not, in an unaided state, form a tubular roll or circle along its longitudinal width.

The cross-web curl of the composite can be induced during in-line lamination of the shrink film to the backing, or alternatively, can be induced in a second step after lamination. In general, extension of the bending moment within the composite material does not occur until the shrink film is activated to shrink. In one embodiment, following the formation of the composite material, the composite material can be exposed to a shrink inducing element such as a heating element, such as a heated roller or infrared radiation bank or oven, or, alternatively, a heated water-bath, to activate the shrink film, which causes the shrink film to shrink, resulting in the cross-web curl structure being imparted to the composite material. In another embodiment, the shrink is induced during lamination, for example, during heat-assisted lamination. For example, the laminating adhesive can be heated prior to applying to the backing material or shrink material, or both, and the backing and shrink film laminated to form the composite material. At the time of the lamination, the heat from the laminating adhesive, exceeding the activation temperature capable of inducing shrink in the shrink film, can induce shrink in the shrink film during the lamination process, imparting cross-web curl structure. The resultant imparted cross-web curl structure can be permanent. Likewise, a heat-cure adhesive can be utilized, and the adhesive can be applied to the backing material or shrink material, or both, and the backing and shrink film laminated to form the composite material. The composite can then be immediately exposed to heat during an in-line manufacturing process to assist in the curing of the heat-cure adhesive, for example, passing through an oven or over a heated roller on a lamination machine, or alternatively, through a heated water-bath. Such exposure to heat, while exposing the heat-cure adhesive to its cure condition, simultaneously imparts cross-web curl structure in the composite. The resultant structure can be permanent.

In an alternative embodiment, the composite material can be formed utilizing a heat curing adhesive, wherein the heat curing adhesive has a cure temperature below the activation temperature of the shrink film used in the composite material. In one non-limiting example, the heat cure adhesive can have an onset curing temperature slightly below the onset activation temperature of the shrink film, for example, about 3° F., about 4° F., about 5° F., about 6° F., about 7° F., about 8° F., about 9° F., or about 10° F. less. As such, the composite material is formed and the heat curing adhesive is cured without imparting cross-web curl structure to the composite material. Subsequently, the shrink film material can be activated and the composite material imparted with a cross-web curl structure.

In one embodiment, the adhesive is allowed to cure and the shrink film of the composite is subsequently activated by exposure to heat. In one embodiment, the composite material can be exposed to a shrink inducing element such as a heating element, such as a heated roller, infrared radiation bank, oven, or heated water-bath, to activate the shrink film, which causes the shrink film to shrink, resulting in the cross-web curl structure being imparted to the composite material.

In one aspect, the composite material is exposed to a water bath, wherein the water in the bath is at a temperature sufficient to activate the shrink film and induce a desired cross-web curl structure in the composite. By utilizing a heated water-bath, a constant, evenly distributed temperature can be maintained, allowing for a uniformly induced curl. In one embodiment, the composite contains a heat cure adhesive having a cure temperature below the activation temperature of the shrink film contained in the composite, and the composite is exposed to the water-bath after being exposed to a heat source sufficient to cure the heat cure adhesive. In one embodiment, the composite contains a heat cure adhesive and exposed to a heated water-bath, wherein the heated water bath provides sufficient heat to both cure the heat cure adhesive and activate the shrink film contained in the composite resulting in the impartation of a cross-web curl structure.

The composite material can further contain an adhesive for applying the laminate to a surface, such as a pressure sensitive adhesive or other adhesive, coated on a non-laminated surface, and can, for example, be wound into a roll form. The roll material can be cut into sheets and panels that retain the cross-web curl structure and are self-supporting. In a related embodiment, the shrink film of the composite material can be activated by being passed through or over an oven or exposed to any other heat producing means capable of activating the shrink film such as a heated water bath, radio frequency, microwave radiation, gamma radiation, or infrared radiation. If the shrink film utilized in the composite material is activated by other means, for example, such as ultraviolet radiation, cold or reduced temperatures, solvent or moisture exposure, or other such means, then the composite material is exposed to the activation means in order to activate the shrink film and impart the cross-web curl structure resulting in a composite material that is self-supporting. In an alternative embodiment, the shrink film in the composite material is activated and imparts a cross-web curl in the composite material when a hot melt adhesive is incorporated into the composite material, either as an adhesive for laminating the backing to the shrink film or as an adhesive used for adhering the composite material to a surface, during the manufacturing process and the resulting heat from the "hot-melt" adhesive activates the shrink film layer.

The composite material with cross-web curled structure exhibits a longitudinal extendibility or rigidity as a result of the backing material cooperating with or interacting with the shrink film in the composite material, the shrink film having been activated to instill a designed, effective, or desired degree of arc to the composite material along the longitudinal width of the material. This cross-web curl about the longitudinal width facilitates extension of the bending moment of the material along the axial length well beyond the bending moment of the composite material before activation of the shrink film, or the backing material or shrink material alone, and provides the composite material's self-supporting characteristic. When the cross-web curl is imparted on the composite material, the bending moment can be shifted, for example, when held at one end of the composite material at least about 4 inches, at least about 5 inches, at least about 6 inches, at least about 7 inches, at least about 8 inches, at least about 12 inches, at least about 16 inches, at least about 18 inches, at least about 24 inches, at least about 36 inches or more for composite materials with widths of up to about ½ inch, about ¾ inch, about 1 inch, about 2, inches, about 3 inches, about 4 inches, about 5 inches, about 6 inches or more, well beyond the bending moment of the composite material before activation of the shrink film, or the backing material or shrink material alone. This imparted cross-web curl structure increases the rigidity and extendibility of the composite material as desired, increases the structural support of the composite material along its axial length, and reduces or prevents the composite material from coiling or curling prematurely upon itself.

As an example, a composite with the imparted cross-web curl structure imparted thereto will be able to extend for a certain horizontal distance, for example, 12 inches, 24 inches, or 36 inches or more, without bending or falling towards the ground. Comparatively, a composite without the imparted cross-web curl structure will fall or bend towards the ground when held in a similar fashion. As such, the composite with the imparted structure provides a self-extendibility that is not present in the same composite without the imparted cross-web curl structure.

The length of the composite material holds its self-extending shape, yet remains flexible, allowing the material to be utilized as intended, for example, as a tape to be affixed to a surface with varying degrees of pressure. One embodiment includes structures which, when cut into, for example a strip about ½ inch, about ¾ inch, about 1 inch, about 2 inches, about 3 inches, about 4 inches or more in width with an imparted cross-web curl along its longitudinal width, have an extended bending moment from the proximal or start of the strip of at least about 4 inches, at least about 5 inches, at least about 6 inches, at least about 7 inches, at least about 8 inches, at least about 12 inches, at least about 16 inches, at least about 18 inches, at least about 24 inches, at least about 36 inches or more. Furthermore, larger composite material samples, for example composite material sheets having longitudinal widths of at least about 8 inches, at least about 12 inches, at least about 16 inches, at least about 24 inches, at least about 30 inches, at least about 36 inches or more and having imparted cross-web curled structure also experience the extension of the bending moment in comparison to the same material without the imparted cross-web curl. Such extended bending moment can be, for example, at least about 4 inches, at least about 5 inches, at least about 6 inches, at least about 7 inches, at least about 8 inches, at least about 12 inches, at least about 16 inches, at least about 18 inches, at least about 24 inches, at least about 36 inches or more.

The composite material imparted with a cross-web curled stable structure can be used as is or can be incorporated into another structure. For example, the composite material can further contain an adhesive, for example, a pressure-sensitive adhesive, applied to either the backing or the shrink film and used as a pressure sensitive tape or in adhesive-type applications, for example, graphic design decals, shelf liners, wallpaper, labeling decals, and protective films. The composite can be used "curl-up" (i.e., shrink film on top) or "curl-down" (shrink film on the bottom), with the adhesive on the desired side In further embodiments, when the first surface of the backing material or the second surface of the shrink film is coated with an adhesive, the non-adhesive coated side of the composite material, such as the first surface of the backing material when the second surface of the shrink film contains an adhesive, or the second surface of the shrink film when the first surface of the backing material contains an adhesive, can be coated with a release agent. The composite material can be, for example, wound into a roll, and when dispensed, the composite material is rigid due to the interaction of the backing and the shrink film, which imparts a curvature in the shape of an arc along the longitudinal width to the composite materials when the shrink film is activated, allowing the composite material to extend from the roll edge a certain length and maintain its shape, and not curl, coil, or fall on itself.

In various embodiments, the composite materials having a cross-web curl structure imparted thereto can be formed into, for example, sheets, rolls, tapes, strips, panels, or customized packaging materials such as a gussetless bag. The sheet materials exhibit a rigidity that resists bending or folding when handled, and are self-supporting. In one embodiment, the composite materials can be formed into a roll. A length of the composite material can be pulled from the roll configuration, and when extended beyond the end of the roll, resists curling or coiling upon itself, and exhibits a certain amount of rigidity as the composite material extends beyond the edge of the roll, and is self-supporting. In certain embodiments enabled herein, the sheets or rolls further contain an adhesive coating on at least a portion of the first surface of the backing, allowing the sheet or a portion of the roll to adhere to a surface. In other embodiments, the sheets or rolls further contain an adhesive coating on at least a portion of the second surface of the shrink film, allowing the sheet or a portion of the roll to adhere to a surface.

In one embodiment, the composite materials can be formed into tape, for example, a pressure-sensitive tape or material. The tape can be formed into rolls constructed so that when a length of the tape or material is pulled from a roll configuration, the tape or material extends beyond the end of the tape roll without curling or coiling upon itself, and exhibits a certain amount of rigidity as the tape extends beyond the edge of the roll of tape and is self-supporting. The adhesive for the tape may be applied to the first surface of the backing or the second surface of the shrink film.

The composite material can be formed into a sheet or panel of material, wherein the sheet or panel can be lifted, or removed from a pad or stack, and the sheet or panel exhibits a certain amount of rigidity so that the sheet or panel is self-supporting. In certain embodiments, the sheet or panel can further contain an adhesive coating. The composite material can also contain silicone or other coating on a surface to allow materials coated with adhesive to be stacked or rolled. The adhesive may be applied to the first surface of the backing or the second surface of the shrink film.

Because of the rigidity in the composite imparted by the cross-web curl structure, such composites are also useful as structural support materials. In one embodiment, composites with imparted cross-web curl structures are used as stabilizing layers during the manufacturer of other articles, for example during webbing processes. As such, the composite materials act to reduce deformation of the manufactured article and shield the article from damage, for example, the composite materials with an imparted cross-web curl structure can replace cardboard, cardstock, and other types of structural supports used in such articles. In another aspect, provided herein are composite materials having performance specification parameters equal to or greater than thicker materials. For example, thin-film cross-web curl structured composite materials exhibit rigidity and strength characteristics comparable to thicker conventional materials. Composite materials described herein can be used in packaging applications. Because the thin-film composite materials with cross-web curl structures may exhibit performance characteristics equal to or greater than conventional packaging materials, packaging requirements may be met with less material, resulting in the reduction of materials used. For example, in one embodiment, the composite materials having a cross web curl structure can be formed into gussetless bags or tube-like containers for use in packaging consumer goods. The composite materials described herein can be formed into gussetless or tube-like containers, for example, by sealing opposing axial length sides to each other, forming a container capable of standing on its own.

In another application, the composite materials described herein can be used to form nasal dilators, which can be applied across a user's nose in order to increase the nostril openings. When used as nasal dilators and placed across a user's nose, the arc structure contained in the herein described composite materials imparts sufficient elastic memory in attempting to return towards a planar orientation so as to lift the outer surfaces of the nose and dilate the nasal passages within by the lifting action provided by the structural arc. As such, the interaction of the described composite materials results in the formation of a spring element within the composite that provides tension, elastic memory and/or stiffness to the composite material when the base element is transitioned from a planar to a non-planar state during use, such that the spring element imparts resiliency into the composite material and provides the composite material with return memory properties towards a planar conformation during use.

BRIEF DESCRIPTION OF THE DRAWINGS

These as well as other objects and advantages of the composite materials described herein will be more completely understood and appreciated by referring to the following more detailed description of the exemplary embodiments of the invention in conjunction with the accompanying drawings, of which:

FIG. 11 represents a table of exemplary composite materials that can be used in tape, sheet and panels, and certain characteristics of the materials.

FIG. 20 shows the maximum temporary curl angle at 50° C. (FIG. 20A), 60° C. (FIG. 20B), 70° C. (FIG. 20C), and 80° C. (FIG. 20D) as a function of PETG heat shrink thickness with 3 PET backings of varying thickness.

DETAILED DESCRIPTION OF THE INVENTION

Figure 1:
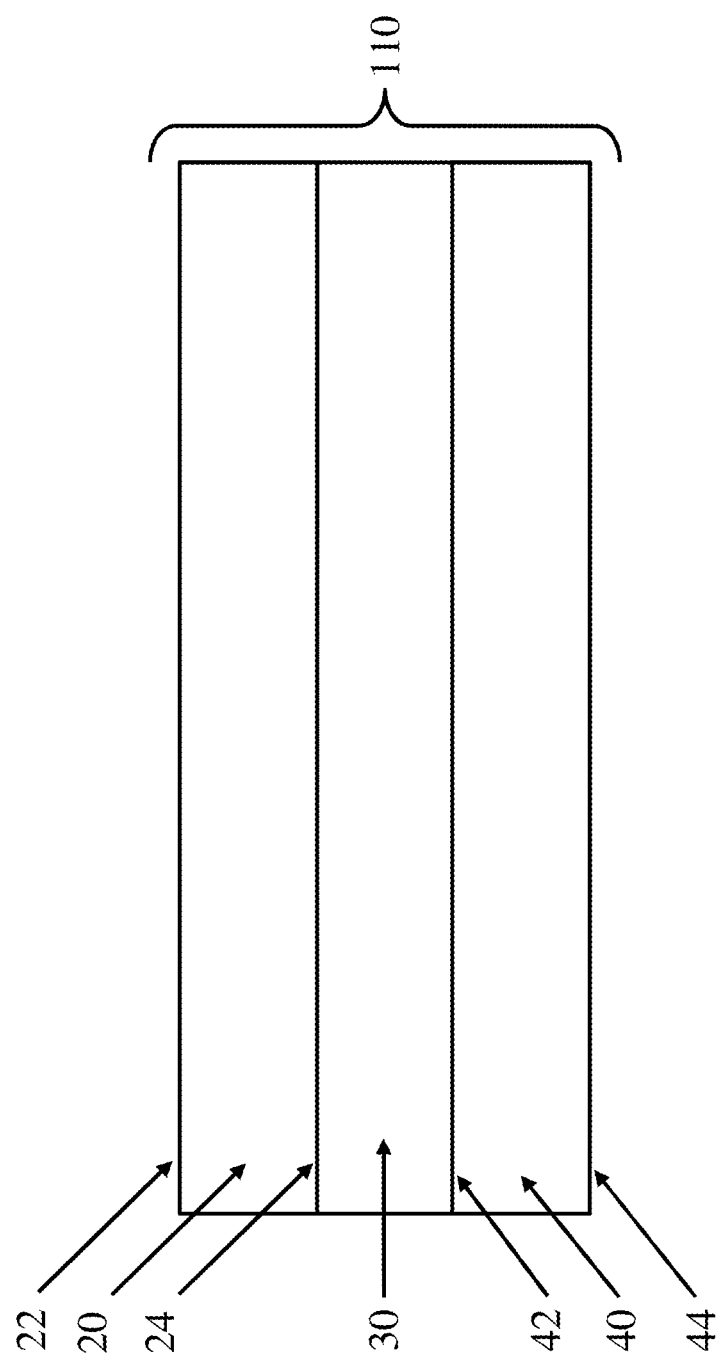
FIG. 1 depicts examples of the components of a composite material.

Provided herein are composite materials, manufacture of composite materials, and use of composite materials, wherein the composite materials have improved properties and are capable of self-extending. The composite materials have a dimensionally alterable film such as a shrink film having a first surface and a second surface, and a backing material having a first surface and a second surface, wherein the second surface of the backing material is laminated with an adhesive to the first surface of the shrink film. In certain embodiments, an adhesive useful for adhering the composite material to a surface, such as a pressure sensitive adhesive or other laminating-type adhesive can be applied to the first surface of the backing material or, alternatively, to the second surface of the shrink film, or both.

As used herein, the term shrink film describes a material that is sometimes also referred to as a shrink wrap film. It is a polymeric film that either naturally or has been structurally programmed to activate (i.e., shrink) on exposure to a certain stimulus such as elevated temperature (i.e., heat), light, chemical treatment, or other activating means. The polymers of shrink film are programmed such that the individual polymer strands are made to exist in a linear conformation at ambient conditions, albeit in a higher energy state because the polymers are not in their desired random conformation. On application of, for example, heat, including by heat roller, a heated bar, a pass-through-oven, radio frequency, microwaves, gamma radiation, and infrared radiation, the linearized polymers recoil to their more natural random conformation, resulting in shrinkage of the material. The direction of shrinkage of a film can be programmed by orienting the linearized polymeric strands in specific ways. For example, shrink films can be programmed for uniaxial shrinkage (shrinkage only along one axis) or biaxial shrinkage (shrinkage along tow axes). The properties of shrink film are the result of intentional mechanical engineered programming of the polymer to capitalize on the change in film properties as polymers transition from a non-preferred linear formation to a random formation. The term shrink film does not denote a specific polymer (e.g., polyethylene, polyvinyl chloride, ethylene vinyl acetate). Instead, it demotes performance and memory properties that have been structurally programmed into the film.

It has been found that the selection and use of certain materials in the manufacture of the composite provides new or improved desirable properties. In particular, the selection and use of specific shrink films, optionally in combination with selected adhesives, as described herein, can provide improved performance, including for example but not limited to, decreased fracture between the shrink film and backing, increased peel strength or peel resistance between the shrink film and backing, flexibility, clarity, strength, and/or durability, improved shelf-life, precise control of the degree of arc of the cross-web curl structure, and rigidity.

FIG. 1 is an illustration of a side-view of the components and placement of an exemplary embodiment of the composite materials. As illustrated, the composite material 110 is comprised of a backing material 20 comprising a first surface 22 and a second surface 24, a dimensionally alterable film such as a shrink film 40 comprising a first surface 42 and a second surface 44, and an adhesive 30 disposed between the second surface 24 of the backing material 20 and the first surface 42 of the shrink film 40, the adhesive 30 used to laminate the second surface 24 of the backing material 20 and the first surface 42 of the shrink film 40.

The backing material 20 may be formed of one or more thin, flexible materials suitable for use in the contemplated embodiments. The backing may be comprised of one or more polymeric thin films. Backing materials with a surface energy for example of over about 35 dynes/cm, and preferably at least about 38 dynes/cm or greater provide improved characteristics to the stable cross-web curled structure. The surface energy of the backing can be optimally surface activated to achieve a preferable surface energy prior to lamination to the shrink film using any method known in the art, including corona treatment, an alcohol wash, for example an isopropanol wash, abrasion, excimer laser, or plasma treatment. In one embodiment, the composite material comprises a backing material 20 with a surface energy of at least about 35 dynes/cm, and preferably at least about 38 dynes/cm or greater, at the time of lamination. Polyester thin films, including polyethylene terephthalate thin films, are particularly suitable backing materials.

The backing material 20 may be formed from for example, porous or microporous polymer films or thermoplastic films. Such films may be woven or non-woven, such as thermoplastic polyester films such as polyethylene terephthalate (PET), including glycol modified polyethylene terephthalate (PETG), polybutylene terephthalate (PBT), polycyclohexylenedimethylene terephthalate (PCT), polycyclohexylendimethylene terephthalate glycol (PCTG), acid-modified polycyclohexylenedimethylene terephthalate (PCTA), and polytrimethylene terephthalate (PTT), or another kind of polyester which can include monomers or co-monomers that have other carboxylic acid or alcohol functions. For example, aromatic or aliphatic dicarboxylic acids other than or in addition to terephthalic acid can be used. Dialcohols other than or in addition to ethylene glycol, such as propylene glycol, butylene glycol, etc. can be used in the thin film polymer. Monomers with both a carboxylic acid and an alcohol can also be used as desired. Polyesters such as polyethylene terephthalate are especially useful, including woven and non-woven polyethylene terephthalate, spun-bonded, spun-laced, embossed polyethylene terephthalate, LDPE non-woven polyethylene terephthalate, glycol-modified polyethylene terephthalate (PETG), or the like. In one embodiment, the polyester backing comprises a thin film polyethylene terephthalate (PET), wherein the PET thin film has a surface energy of at least about 35 dynes/cm or greater, or at least about 38 dynes/cm or greater at the time of lamination. In one embodiment, the PET thin film is a PETG thin film.

In certain applications of composite materials described herein, the backing materials may include polyethylene or polypropylene (which can be spun-bonded, spun-laced, or embossed), or a combination thereof. The backing material 20 may for example include one or more materials such as paper, cloth, including medical grade cloth and coated cloth, such as vinyl coated cloth, vinyl, including embossed vinyl, polypropylene, including oriented polypropylene such a MOPP and BOPP, polyesterurethane, polyethylene, including LDPE, LLDPE, MDPE, HMWPE, and HDPE, more generally polyolefin, acrylonitrile butadiene styrene, polycarbonate, polyvinyl chloride, cellophane, cellulose, cellulose acetate, films comprised of block co-polymers such as styrenelisoprene, butadiene or thylene-butylene/styrene (SIS, SBS, or SEBS), polyurethane, ethylene copolymers such as ethylene vinyl acetates, including embossed ethylene vinyl acetate, ethylene/propylene copolymer elastomers or ethylene/propylene/diene terpolymer, nylon, crepe, flat back, a foil, rayon, a polyvinyl derivative, polyamides, cuproammonium cellulose, wool, silk, jute, hemp, cotton, linen, sisal, ramie, polystyrene, polyurethane, polyvinylidene chloride, saponified ethylene-vinyl acetate copolymer, linoleum, acrylics, natural rubber, reclaimed rubber, synthetic rubber, thermoplastic resin films, biodegradable resins such as polylactic acid and polyhydroxyalkanoates, polyamide, polyimide, paper, foil, metalicized films, such as copper film, other resin based films, polylactic acid films, other thin-films, or combinations thereof. Other backing materials may include a fabric material such as one or more woven or non-woven fabric layers, such as non-woven, polyester fabric with a strengthening mesh therein, or a combination thereof. One example is a fabric produced by DuPont E. I. de Nemours & Co., Inc. under the trademark Sontara®.

In one embodiment, a composite backing material is selected from the group consisting of a medical grade cloth material, a polyethylene film material, a vinyl material, an ethylene vinyl acetate material, a polyurethane material, a polyesterurethane material, a polyester material, including a polyethylene terephthalate material, a glycol-modified polyethylene terephthalate (PETG) material, a spun-laced polyethylene terephthalate material, a spun-laced polyethylene terephthalate non-woven material, an embossed non-woven polyethylene terephthalate material, an LDPE non-woven polyethylene terephthalate fabric material, or a coated cloth material, such as a vinyl coated cloth.

The dimensionally alterable film 40 useful for the composite materials described herein is preferably a shrink film. The shrink film 40 may include conventionally known materials prepared from one or more resins that shrink or contract upon heating, cooling, or other activation technique or means. In specific embodiments, the shrink film 40, when activated (i.e., shrunk), maintains a permanent conformational change. In general, it has been discovered that shrink films with high surface energy tend to provide optimal composite materials for the production of a stable cross-web curled structure that exhibit the desired self-supporting characteristic desired in the composite material. Shrink films with a surface energy for example of at least about 35 dynes/cm, and preferably at least about 38 dynes/cm or greater at the time of lamination may provide improved characteristics to the stable cross-web curled structure. The surfaces of the shrink film 40 can be optimally surface activated prior to lamination to achieve the desired surface energy using any method known in the art, including corona treatment, an alcohol wash, for example an isopropanol wash, abrasion, excimer laser, or plasma treatment. In addition, the orientation of the shrink film can be altered prior to use through an activation technique such as, for example, corona treatment. In one embodiment, the shrink film is a polyester thin film, such as a polyethylene terephthalate (PET) or glycol-modified polyethylene terephthalate (PETG) thin film.

The shrink film 40 can be a uniaxially (unidirectionally) or biaxially (bidirectionally) oriented. In general, the shrink film 40 will be oriented within the composite material 110 so that the effects of the activation of the shrink film 40 (i.e., its shrinkage) are greater along the longitudinal width of the composite material, that is, in a direction that is at a right angle to the axial length of the composite material 110, than its shrinkage along the axial length of the composite material 110. In general, the shrink film 40 is oriented within the composite material 110 so that its machine direction (MD) is oriented along the axial length of the composite material, and its traverse direction (TD) is oriented along the longitudinal width of the composite material. In a preferred embodiment, the shrink profile of the shrink film 40, when exposed to heat, shrinks greater along its traverse direction (TD) than along its machine direction (MD).

The shrink film 40 may have shrink profiles wherein the shrink film, when exposed to heat, shrinks along its traverse direction in ratios between at least about 2% to about 75% or greater, wherein the increase in traverse direction shrink percentage increases with an increase in heat exposure. In one embodiment, the shrink film 40 has a shrink percentage within 5° C. to about 10° C. above its initial onset activation temperature of at least about 10%, at least about 15%, at least about 20%, at least about 25%, or at least about 30%. In one embodiment, the shrink film 40 has a maximum shrink percentage in the traverse direction (TD) of no more than about 80% when exposed to heat. In one embodiment, the shrink film 40 has a maximum shrink percentage in the traverse direction of no more than about 65% when exposed to heat. In one embodiment, the shrink film 40 has a maximum shrink percentage in the traverse direction of no more than about 50%. In one embodiment, the shrink film 40 shrinks between at least about 30% and no more than about 75% when exposed to heat.

The degree of arc imparted in the cross-web curl structure of the composite material 110 is determined by the amount of shrink in the longitudinal width direction of the shrink film 40 in combination with the stiffness of the backing material 20. In general, the degree of arc of the cross-web curl structure in the composite material 110 will be determined by the shrink percentage of the shrink film 40. In general, a shrink film having a large range of potential shrink, for example up to about 70%, 75%, 80%, 85%, or 90% or more shrink potential, is capable of imparting a large range of degree of arc of the cross-web curl within the composite material 110. The degree of arc imparted is general dependent on the heat temperature exposure of the composite material 100 and the amount of shrink induced in the shrink film. As such, the degree of arc can be controlled within the composite material 110. For example, differing degrees of arc of the cross-web curl can be established within different samples of the same composite materials by exposing the different samples to differing heat temperature profiles. In general, a composite material 110 comprising a shrink film 40 with a large potential shrink will have a greater degree of arc imparted in the cross-web curl structure as the temperature to which the composite material is exposed increases above the shrink film's onset activation temperature. As such, a large array of rigidity and self-extending characteristics can be imparted using the same composite materials by altering heat exposure profiles. As such, the composite materials described herein are tunable, that is, the rigidity imparted to the structure through the arc can be controlled based on the shrink film's shrink profile and the composite's exposure to heat during manufacture.

The temperature range of the shrink film 40 from its onset activation temperature to its maximum achievable shrink percentage is an important factor in the ability to control the degree of arc imparted on the cross-web curl within the composite material 110. For example, composite materials 110 comprising a shrink film 40 having large shrink percentage ratios over a short temperature range (i.e. about 10° C.) may experience a less controllable degree of arc. Likewise, the range of degree of arc in a composite material 110 comprising a shrink film 40 having a small or narrow shrink curve (i.e., 10%-30%) may experience a smaller range of potential degree of arc. Comparatively, a composite material 110 comprising a shrink film 40 having a large shrink percentage ratio over a large temperature range (i.e., about 30° C. or greater) will have a greater controllable degree of arc, allowing for a wider range of rigidity and self-extending characteristics based on the heat exposure profile. In one embodiment, the temperature range of the shrink film 40 in the composite material 110 from its onset activation temperature to its maximum achievable shrink percentage is about 10° C., about 20° C., about 30° C., about 40° C., about 50° C., about 60° C., about 70° C. or greater. In one embodiment, the temperature range of the shrink film 40 in the composite material 110 from its onset activation temperature to its maximum achievable shrink percentage is about 30° C. or greater. In one embodiment, the temperature range of the shrink film 40 in the composite material 110 from its onset activation temperature to its maximum achievable shrink percentage is about 40° C. or greater. In one embodiment, the temperature range of the shrink film 40 in the composite material 110 from its onset activation temperature to its maximum achievable shrink percentage is about 50° C. or greater.

In one embodiment, the shrink film 40 has an onset activation temperature—that is, a first temperature wherein, when the shrink film 40 is exposed thereto, the shrink film 40 begins to shrink—higher than the heat curing temperature of the adhesive 30 when a heat curing adhesive is used to laminate the shrink film 40 to the backing material 20. In one embodiment, the shrink film 40 has an onset activation temperature that is the same as, or similar to, the heat curing temperature of the adhesive 30 when a heat curing adhesive is used to laminate the shrink film 40 to the backing material 20.

Polyester is an advantageous shrink film. The polyester can be a thermoplastic thin-film polyester such as polyethylene terephthalate (PET) including glycol-modified polyethylene terephthalate (PETG), polybutylene terephthalate (PBT), polycyclohexylenedimethylene terephthalate (PCT), polycyclohexylendimethylene terephthalate glycol (PCTG), acid-modified polycyclohexylenedimethylene terephthalate (PCTA), and polytrimethylene terephthalate (PTT), or another kind of polyester which can include monomers or co-monomers that have other carboxylic acid or alcohol functions. For example, aromatic or aliphatic dicarboxylic acids other than or in addition to terephthalic acid can be used. Dialcohols other than or in addition to ethylene glycol, such as propylene glycol, butylene glycol, etc. can be used in the shrink film polymer. Monomers with both a carboxylic acid and an alcohol can also be used as desired. In one embodiment, the shrink film 40 is a polyester-based polyethylene terephthalate (PET). In one embodiment, the PET shrink film 40 is a glycol-modified polyethylene terephthalate (PETG). In one embodiment, the polyester shrink film comprises a thin film polyethylene terephthalate (PET), wherein the PET shrink film has a surface energy of at least about 35 dynes/cm or greater, or at least about 38 dynes/cm or greater at the time of lamination. In a more particular embodiment, the PET shrink film is a PETG shrink film, wherein the PETG shrink film has a surface energy of at least about 35 dynes/cm or greater, or at least about 38 dynes/cm or greater at the time of lamination.

In addition to the polyester-based shrink films, other shrink film materials may be useful in certain applications of composite materials, as described herein, and can include, for example, films formed from polymers and/or semicrystalline polymers such as one or more of the following: polyolefin (including cyclic polyolefin), including polypropylene and polyethylene; polyvinyl chloride; polystyrenes; polyvinylidene chlorides; polynorbornene; polyimide; polyamide; polyurethane; polystyrene; polyvinylidene chloride; polyvinyl chloride; polylactic acid; or a combination or combinations thereof. The shrink film 40 can include, for example, films, including monolayer and multilayer laminated films, made from one or more of the resins identified above or below. For example, the shrink film 40 can include: polyolefin shrink films, such as polyethylene and polypropylene shrink films (including oriented polypropylenes such as BOPP and MOPP); polyurethane shrink films; and polyvinyl chloride shrink films. Monolayer polyolefin shrink films include cross-linked and uncross-linked oriented polyethylene, oriented polypropylene, polyurethane, and oriented ethylene-propylene copolymers. Monolayer polyvinyl chloride ("PVC") shrink films involve a variety of PVC formulations. Shrink films 40 useful for composite materials may include shrink films commercially available from: Bemis Co. Inc. such as Clysar® ABL polymer, Clysar® polymer AFG, Clysar® EZ polymer, Clysar® HPG polymer, Clysar® LEG polymer, Clysar® LLG polymer, Clysar® ShrinkBox polymer, and Clysar® VHG polymer; Toyobo Co., such as Space Clean S5630 polymer; Intertape Polymer Group, such as Exlfilm® polymer; Reynolds Packaging LLC such as Reynolon® polymer, Reynolon® Plus polymer and PVC shrink films; Syfan USA, Corp. such as Sytec® shrink films; Mitsubishi Polyester Film; Gunze Ltd. such as Fancy Wrap® polymer; Toray Industries Ltd. such as Toradan® polymer and Lumirror® polymer; JSR Corp. such as Arton® polymer; Nippon Zeon Co. such as Zeonore® polymer; SKC, Inc. such as Skyrol® type SP19H Polyester Film; ULine PVC shrink films; Skywel® PLA film from SKC, Inc.; and the like. In one embodiment, the shrink film 40 is a polyolefin shrink film. In one embodiment, the shrink film 40 is a polypropylene.

In the exemplified embodiment depicted in FIG. 1, the second surface 24 of the backing material 20 is laminated to the first surface 42 of the shrink film 40 using an adhesive 30. In general, adhesives useful in the present application include adhesives that can durably hold the backing and the shrink film together, including for example, a non-pressure sensitive adhesive, a pressure-sensitive adhesive, or other permanent or near-permanent lamination adhesives, while not substantially interfering with the flexibility of the composite materials. If subsequent removability or repositioning of layers is desired, a microspherical containing pressure-sensitive adhesive may be utilized. The adhesive 30 can include one or more additives to improve its properties, and can, for example, be applied with a diluent for a thinner application. It must be noted that other techniques for laminating the composite materials are contemplated herein besides utilizing an adhesive, including coextrusion of the backing materials and shrink materials described above, or heat lamination of the backing materials and shrink materials described above. Preferably, the laminating technique, including a laminating technique using an adhesive 30, results in a peel strength between the shrink film and the backing that provides a near-permanent or permanent bond, for example, a peel strength of at least about 35 oz./in., and more particularly, at least about 40 oz./in., 50 oz./in., 60 oz./in., 70 oz./in. or greater, using the PSTC-1 standard peel test (peel adhesion for single coated pressure-sensitive tapes at 180° angle).

The adhesives 30 contained in the composite material 110 are preferably applied at a minimal coat thickness, for example, less than about 1.0 mils, and more preferably, less than about 0.25 mils, less than about 0.2 mils, less than about 0.15 mils, or less than about 0.1 mils. In one embodiment, the adhesive 30 is contained in the composite material 110 at between about 0.05 mils and 0.2 mils.

It has also been discovered that the use of adhesives that continue to cure over a long period of time can affect shelf-life and stability of the cross-web curled structure. For example, some epoxy adhesives continue to cure over weeks or even months. This prolonged cure behavior can affect the stability of the cross-web curl which is responsible for the extended bending moment and can induce changes in the properties of the product, and affect the flexibility of the composite material 110. There is an expected short period after inducing the curl that the adhesive may be completing its cure, for example a day or more up to one or two weeks; however, prolonged cure adversely affecting the properties of the composite, such as flexibility, is undesired. In one particular embodiment, a cross-web curled structure is provided that includes an adhesive disposed between the backing material and shrink film that does not significantly continue to cure after the desired specifications of the product are achieved in such a way that the bending moment is adversely affected, the degree of arc of the cross-web curl is diminished, or that the composite becomes too rigid to perform its function. In certain other embodiments, the final cross-web curled stable structure has a stable shelf life (which means that the composite does not significantly change its bending moment or flexibility) over at least six months. In another embodiment, the cross-web curled stable structure has a stable shelf life over at least 9, 12, or 18 months. This can be achieved by using a short cure adhesive, many of which are known in the art. For example, in one embodiment, the short cure adhesive substantially cures within two weeks from exposure to the final cure condition (i.e., the exposure to heat for a heat curing adhesive or the exposure to UV radiation for a UV curing adhesive); that is, the adhesive does not exhibit substantial (more than 5%) continuing cure past two weeks from exposure to the final cure condition. In another embodiment, the short cure adhesive substantially cures within one week from the final cure condition; that is, the adhesive does not exhibit substantial (more than 5%) continuing cure past one week from exposure to the final cure condition. In one embodiment, the short cure adhesive substantially cures within between about 12-48 hours; that is the adhesive does not exhibit substantial (more than 5%) continuing cure past between about 12-48 hours from exposure to the final cure condition.

Adhesives 30 useful in the described embodiments can be single component or multiple component compounds. In one embodiment, the adhesive 30 is selected from the group consisting of a permanent pressure sensitive acrylic, such as a solventless or solution acrylic, an epoxy, a polyurethane-based adhesive, for example, 2-component polyurethanes, such as 100% solids 2-component polyurethane adhesives, including solvent-free 100% solids 2-component polyurethane adhesives, polyurethane dispersions such as water-based polyurethane dispersions, water-based polyurethane dispersions with epoxy cross-linkers, or water-based hybrid polyurethane dispersion/acrylic emulsions with epoxy cross-linkers, a polyester-based adhesive, for example, solvent-based polyester based adhesives with isocyanate cross-linkers, including solvent-based polyester based adhesives with isocyanate cross-linker "F" and solvent-based polyester based adhesives with isocyanate cross-linker "A", or a copolymer of a polyester such as a polyester polyurethane, and solventless acrylics. In one embodiment, the adhesive 30 is a heat curing adhesive that cures when exposed to a sufficient temperature. In one embodiment, the adhesive 30 is a heat cure adhesive that cures at at least a temperature similar to or below the onset activation temperature of the shrink film 40 contained in the composite material 110. In one embodiment, the adhesive 30 is a heat cure adhesive that cures at a temperature above the onset activation temperature of the shrink film 40 contained in the composite material 110. In one particular embodiment, the adhesive is selected from the group consisting of two-component polyurethane, polyurethane dispersion, hybrid polyurethane dispersion/acrylic emulsion, polyester, and acrylic heat cure adhesive. In one particular embodiment, the adhesive may be a heat-cure water-based hybrid polyurethane dispersion/acrylic emulsion with an epoxy cross-linker.

In one embodiment, the adhesive 30 is a solventless acrylic adhesive, such as 3M Company High Performance Adhesive 467®, or acrylic adhesive similar thereto. In one embodiment, the adhesive 30 is a two-component solventless, aliphatic polyurethane such as Purelam Fastcure™ 110/230 100% solids adhesive, Purelam™ 6000/6050 100% solids adhesive, or Purelam™ Hybrid 6050 100% solids adhesive from Ashland, Inc., or an adhesive similar thereto. In one embodiment, the adhesive 30 is a water-based polyurethane dispersion with epoxy cross-linker such as Purethane™ A 4020 adhesive from Ashland, Inc., or an adhesive similar thereto. In one embodiment, the adhesive 30 is a water-based hybrid polyurethane dispersion/acrylic emulsion with epoxy cross-linker such as Purethane™ A 1078 or Purethane™ A 1090 from Ashland, Inc., or an adhesive similar thereto. In one embodiment, the adhesive 30 is a water-based polyurethane dispersion such as Purethane™ A 4025, or an adhesive similar thereto. In one embodiment the adhesive 30 is a solvent-based polyester with isocyanate crosslinker "F" such as Solvester™ SB-F from Ashland, Inc. or an adhesive similar thereto. In one embodiment, the adhesive 30 is a solvent-based polyester with isocyanate "A" such as Solvester™ SB-A from Ashland, Inc., or an adhesive similar thereto.

Other useful adhesives 30 useful in certain applications described herein may include maleic anhydride modified elastomers, ethyl vinyl acetates and olefins, polyacrylic imides, butyl acrylates, peroxides such as peroxypolymers, e.g., peroxyolefins, silanes, e.g., epoxysilanes, reactive polystyrenes, chlorinated polyethylene, acrylic acid modified polyolefins and ethyl vinyl acetates with acetate and anhydride functional groups and the like, which can also be used in blends or as compatiblizers in one or more of layers. Adhesives 30 can be, for example, in the form of a water-based adhesive, solvent-based adhesive, solvent-less adhesive, 100% solids adhesive, or hot melt adhesive. Such adhesives, for example, can be acrylic based, rubber based, or silicone based, and can include, for example, polyacrylates, thermoplastic acrylic solutions, thermal curing acrylics, self-curing or ambient temperature acrylics, 100% solid thermoplastic acrylics, vinyl alkyl ether, polyurethane-polyethylene adhesives, styrene-diene block copolymers, one component polyurethane adhesives, two component polyurethane adhesives, such as polyurethane and polyethylene based adhesives, and crosslinking type adhesives. Examples of potential acrylic adhesive components include homopolymers or copolymers of a (meth)acrylic acid alkyl ester, for example (meth)acrylic acid C1-C20 alkyl ester such as methyl (meth)acrylate, ethyl (meth)acrylate, butyl (meth)acrylate, 2-ethylhexyl(meth)acrylate, and octyl (meth)acrylate; and copolymers of the above-described (meth)acrylic acid alkyl ester and another copolymerizable monomer including a carboxyl group-containing or acid anhydride group-containing monomer such as acrylic acid, methacrylic acid, itaconic acid, fumaric acid or maleic anhydride; a hydroxyl group-containing monomer such as 2-hydroxyethyl(meth)acrylate; an amino group-containing monomer such as morpholyl (meth)acrylate; an amide group-containing monomer such as (meth)acrylamide; a cyano group-containing monomer such as (meth)acrylonitrile; or a (meth)acrylic acid ester having an alicyclic hydrocarbon group such as isobornyl (meth)acrylate.

The acrylic adhesive polymer can include a copolymer of one or more of (meth)acrylic acid $C_1$-$C_{12}$ alkyl esters such as ethyl acrylate, butyl acrylate or 2-5 ethylhexyl acrylate, and at least a copolymerizable monomer selected from hydroxyl group-containing monomers such as 2-hydroxyethyl actylate and a carboxyl group-containing or acid anhydride group-containing monomer such as acrylic acid, or a copolymer of one or more of (meth)acrylic acid $C_1$-$C_{12}$ alkyl esters, a (meth)acrylic acid ester having an alicyclic hydrocarbon group, and at least a copolymerizable monomer selected from hydroxyl group-containing monomers and carboxyl group-containing or acid anhydride group-containing monomers.

The acrylic polymer can be, for example, prepared by photopolymerizing (for example, with an ultraviolet light) the monomer components described above (and polymerization initiator) in the absence of solvent, as a liquid prepolymer of a high viscosity. Furthermore, a crosslinking agent can be added to the prepolymer. The crosslinking agent may be added at the preparation of the prepolymer. The crosslinking acrylic adhesive composition may also be obtained by adding, to an acrylic polymer obtained by polymerizing the monomer components described above or a solution thereof, a crosslinking agent and a solvent (not essential in a case of utilizing the solution of the acrylic polymer).

The crosslinking agent is not particularly restricted, and, for example, an isocyanate type crosslinking agent, a melamine type crosslinking agent, an epoxy type crosslinking agent, an acrylate type crosslinking agent (polyfunctional acrylate), or a (meth)acrylic acid ester having an isocyanate group may be used for this purpose. Examples of the acrylate type crosslinking agent include hexanediol diacrylate, 1,4-butanediol diacrylate, trimethylolpropane triacrylate, pentaerythritol tetraacrylate, and dipentaerythritol hexaactylate. Examples of (meth)acrylic acid ester having an isocyanate group include 2-isocyanatethyl acrylate and 2-isocyanatethyl methacrylate. The crosslinking agent is normally employed in an amount of from 0.01 to 15 parts by weight with respect to 100 parts by weight of the base polymer.

The crosslinking acrylic adhesive may contain, in addition to the base polymer and the crosslinking agent, appropriate additives such as a crosslinking promoter, a tackifier resin (such as a rosin derivative resin, a polyterpene resin, a petroleum resin, or an oil-soluble phenolic resin), a viscosifier, a plasticizer, a filler, an aging resistor, and an antioxidant.

Other adhesives 30 useful for assisting in bonding the backing material 20 and the shrink film 40 together during a lamination process include two component epoxy adhesives comprising epoxide resins and nucleophiles. There are at least two main categories of epoxy resins, namely the glycidyl epoxy, and non-glycidyl epoxy resins. The glycidyl epoxies are further classified as glycidyl-ether, glycidyl-ester and glycidyl-amine. The non-glycidyl epoxies are either aliphatic or cycloaliphatic epoxy resins. Glycidyl epoxies are prepared via a condensation reaction of appropriate dihydroxy compound, dibasic acid or a diamine and epichlorohydrin. While, non-glycidyl epoxies are formed by peroxidation of olefinic double bonds.

Glycidyl-ether epoxies such as, diglycidyl ether of bisphenol-A (DGEBA) and novolac epoxy resins are most commonly used epoxies. Diglycidyl ether of bisphenol-A (DGEBA) is a typical commercial epoxy resin and is synthesised by reacting bisphenol-A with epichlorohydrin in presence of a basic catalyst. The properties of the DGEBA resins depend on the value of n, which is the number of repeating units commonly known as degree of polymerization. The number of repeating units depends on the stoichiometry of synthesis reaction. Typically, n ranges from 0 to 25 in many commercial products.

Novolac epoxy resins are glycidyl ethers of phenolic novolac resins. Phenols are reacted in excess, with formaldehyde in presence of acidic catalyst to produce phenolic novolac resin. Novolac epoxy resins are synthesized by reacting phenolic novolac resin with epichlorohydrin in presence of sodium hydroxide as a catalyst. Novolac epoxy resins generally contain multiple epoxide groups. The number of epoxide groups per molecule depends upon the number of phenolic hydroxyl groups in the starting phenolic novolac resin, the extent to which they reacted and the degree of low molecular species being polymerized during synthesis. The multiple epoxide groups allow these resins to achieve high cross-link density resulting in excellent temperature, chemical, and solvent resistance.

The curing process for an epoxy is a chemical reaction in which the epoxide groups in epoxy resin reacts with a curing agent (hardener) to form a highly cross-linked, three-dimensional network. A wide variety of curing agent for epoxy resins is available depending on the process and properties required. The commonly used curing agents for epoxies include amines, polyamides, phenolic resins, anhydrides, isocyanates and polymercaptans. The cure kinetics and the Tg of cured system are dependent on the molecular structure of the hardener. Amines are the most commonly used curing agents for epoxy cure. Primary and secondary amines are highly reactive with epoxy. Tertiary amines are generally used as catalysts, commonly known as accelerators for cure reactions. Epoxy resins can be cured with phenolic hardeners as well.

Additional components can be used to enhance the epoxy, including thermoplastic polymers to improve toughness, such as polyetherimide, polysulphone, polyethersulphone, polycarbonate, liquid acrylonitrile-butadiene copolymers with various terminal groups, polysiloxanes, polyepichlorohydrin, and polyurethanes.

In one embodiment, the adhesive 30 is a two component epoxy comprising an epoxy component comprising between about 70%-95% bisphenol A-epoxy resin and between about 5%-30% butadiene homopolymer and a hardener component comprising between about 1%-5% cycloaliphatic amines such as benzene-1,3 dimethane amine and <75% amine compounds. In one embodiment, the epoxy is the commercially available epoxy Bondit® B45TH from Reltek, or an epoxy adhesive similar thereto.

Two-part acrylic-based adhesives can also be used as the laminating adhesive 30. In one embodiment, laminating adhesive 30 is a two-part acrylic adhesive which comprises one component comprising between about 40%-70% polyester adipate, between about 10%-30% amine borane complex, between about 10%-30% polyfunctional aziridine, and between about 0.5%-1.5% amorphous silica, which is mixed with another component comprising between about 30%-70% methacrylate, between about 15%-30% acrylate polymer, between about 10%-30% 2-ethylhexyl methacrylate, between about 1%-15% methylacrylate, between about 1%-10% impact modifier, between about 1%-10% glass spheres, <1% 2-hydroxyethyl methacrylate. In one embodiment, the adhesive 30 is the two-part acrylic adhesive commercially available as Scotch-Weld™ structural plastic adhesive DP-8005 from 3M, or a two-part acrylic adhesive similar thereto.

The adhesive 30 may also further include a viscosity modifier or diluent, allowing the adhesive to be applied more easily. Diluents or viscosity modifiers may be especially useful when the laminating adhesive 30 is an epoxy. The diluent may be added to the hardener component of the epoxy or the resin component of the epoxy. The diluent added to the epoxy may account for between about 0.1%-60% of the adhesive, between about 1%-60%, between about 2%-60%, between about 5%-60%, or between about 10%-40%. In one embodiment, the diluent added to the epoxy accounts for up to 40% of the epoxy. In particular embodiments, the diluent accounts for about 1%, 5%, 7.5%, 10%, 12.5%, 15%, 20%, 25%, 30%, 35%, 40%, 45%, 50%, 55%, or 60% of the epoxy. In one embodiment, the diluent is a diglycidyl ether of neopentyl glucol. In one embodiment, the diluent is a monofunctional aliphatic glycidyl ether. In one embodiment, the diluent is a monofunctional aromatic glycidyl ether. In one embodiment, the diluent is a polyfunctional glycidyl ether. In one embodiment, the diluent is comprised of di- or polyfunctional reactive modifiers made from polyols and acids. In one embodiment, the diluent is selected from a alkyl $C_{12}$-$C_{14}$ glycidyl ether, butyl glycidyl ether, 2-ethylhexyl glycidyl ether, cresyl glycidyl ether, p-tert-butyl phenyl glycidyl ether, trimethyol propane triglycidyl ether, 1,4 butanediol diglycidyl ether, neopentyl glycol diglycidyl ether, cyclo hexane dimethanol diglycidyl ether, dimer acid diglycidyl ester, castor oil polyglycidyl ether, or neodecanoic acid glycidyl ester. In one embodiment, the diluent is a neopentyl glycol diglycidyl ether. In one embodiment, the diluent is the commercially available product Heloxy™ 68 from Momentive, or a diluent similar thereto.

In one particular embodiment, the composite material 110 is formed by laminating a backing 20 comprising a thermoplastic polyester film to a shrink film 40 comprising a thermoplastic polyester shrink film. In one embodiment, the composite material 110 is formed by laminating a backing 20 comprising a polyethylene terephthalate film to a shrink film 40 comprising a polyethylene terephthalate, such as a polyester terephthalate glycol (PETG) shrink film using an adhesive 30 selected from the group consisting of a permanent pressure sensitive solventless acrylic, an epoxy, a polyurethane-based adhesive, for example, a 2-component polyurethane, such as 100% solids 2-component polyurethane adhesives, including solvent-free 100% solids 2-component polyurethane adhesives, polyurethane dispersions such as water-based polyurethane dispersions, water-based polyurethane dispersions with epoxy cross-linkers, or water-based hybrid polyurethane dispersion/acrylic emulsions with epoxy cross-linkers, a polyester-based adhesive, for example, solvent-based polyester based adhesives with isocyanate cross-linkers, including solvent-based polyester based adhesives with isocyanate cross-linker "F" and solvent-based polyester based adhesives with isocyanate cross-linker "A", or a copolymer of a polyester such as a polyester polyurethane, and solvent-less acrylics applied at a coat thickness of less than about 1.0 mils, and preferably, at less than about 0.2 mils, and more preferably, at less than about 0.15 mills, and even preferably at about 0.10 mils or less. In one embodiment, the composite material 110 is formed by laminating a backing 20 comprising a polyethylene terephthalate film to a shrink film 40 comprising a polyethylene terephthalate, such as a polyester terephthalate glycol (PETG) shrink film using an epoxy as the adhesive 30. In one embodiment, the composite material 110 is formed by laminating a backing 20 comprising a polyethylene terephthalate film to a shrink film 40 comprising a polyethylene terephthalate, such as a polyethylene terephthalate glycol shrink film, using an epoxy as an adhesive 30 such as a two component epoxy comprising a Part A comprising between about 70%-95% bisphenol A-epoxy resin and between about 5%-30% butadiene homopolymer and a Part B comprising between about 1%-5% cycloaliphatic amines such as benzene-1,3 dimethane amine and <75% amine compounds. In one embodiment, the composite material 110 is formed by laminating a backing 20 comprising a polyethylene terephthalate film to a shrink film 40 comprising a polyethylene terephthalate such as a polyethylene terephthalate glycol (PETG) shrink film using a solvent-less acrylic as the adhesive 30, wherein the adhesive is applied at a coat thickness of less than about 1.0 mils. In one embodiment, the composite material 110 is formed by laminating a backing 20 comprising a polyethylene terephthalate film to a shrink film 40 comprising a polyethylene terephthalate (PET) shrink film such as polyethylene terephthalate glycol (PETG) shrink film using a two-component solvent-less, aliphatic polyurethane adhesive as the adhesive 30, wherein the adhesive 30 is applied at a coat thickness of less than about 0.2 mils, and preferably at about 0.1 mils or less. In one embodiment, the composite material 110 is formed by laminating a backing 20 comprising a polyethylene terephthalate film to a shrink film 40 comprising a polyethylene terephthalate (PET) shrink film such as polyethylene terephthalate glycol (PETG) shrink film using a water-based polyurethane dispersion with epoxy cross-linker as the adhesive 30, wherein the adhesive 30 is applied at a coat thickness of less than about 0.2 mils, and preferably at about 0.1 mils or less. In one embodiment, the composite material 110 is formed by laminating a backing 20 comprising a polyethylene terephthalate (PET) film to a shrink film 40 comprising a polyethylene terephthalate (PET) shrink film such as polyethylene terephthalate glycol (PETG) shrink film using a water-based hybrid polyurethane dispersion/acrylic emulsion with epoxy cross-linker as the adhesive 30, wherein the adhesive 30 is applied at a coat thickness of less than about 0.2 mils, and preferably at about 0.1 mils or less. In one embodiment, the composite material 110 is formed by laminating a backing 20 comprising a polyethylene terephthalate film to a shrink film 40 comprising a polyethylene terephthalate (PET) shrink film such as polyethylene terephthalate glycol (PETG) shrink film using a water-based polyurethane dispersion as the adhesive 30, wherein the adhesive 30 is applied at a coat thickness of less than about 0.2 mils, and preferably at about 0.1 mils or less. In one embodiment, the composite material 110 is formed by laminating a backing 20 comprising a polyethylene terephthalate (PET) film to a shrink film 40 comprising a polyethylene terephthalate (PET) shrink film such as polyethylene terephthalate glycol (PETG) shrink film using a solvent-based polyester with isocyanate crosslinker "F" as the adhesive 30, wherein the adhesive 30 is applied at a coat thickness of less than about 0.2 mils, and preferably at about 0.1 mils or less. In one embodiment, the composite material 110 is formed by laminating a backing 20 comprising a polyethylene terephthalate (PET) film to a shrink film 40 comprising a polyethylene terephthalate (PET) shrink film such as polyethylene terephthalate glycol (PETG) shrink film using a solvent-based polyester with isocyanate cross-linker "A" as the adhesive 30, wherein the adhesive 30 is applied at a coat thickness of less than about 0.2 mils, and preferably at about 0.1 mils.

The backing 20 can vary in thickness depending on intended application. For example, thicknesses of less than or about 0.25, 0.5, 0.75, 0.9, 1.0, 1.2, 1.5, 2, 3, 4, 5, 7.5, 10, 12.5, 15, 20 mils or greater, or a thickness between about 0.1-20 mils or greater, or an equivalent thickness as measured in gauge are hereby contemplated. In a particular embodiment, the backing 20 has a thickness of about 0.5, 1.0, or 5 mils. In one embodiment, the backing 20 is a polyethylene terephthalate (PET) film having a thickness of about 0.5 mils, 1.0 mils, or 5 mils. In one embodiment the backing 20 is a polyethylene terephthalate (PET) backing of about 0.5 mils or 2.0 mils, or size in between therein.

Likewise, the shrink film 40 can vary in thickness depending on intended application and the desired characteristics of the composite. For example, thicknesses of up to about 25, 50, 75, 100, 120, 140, 150, 150, 170, 180, 190, 200, 300, 400 or greater gauge, or a thickness of up to about 25-400 or greater gauge, or an equivalent thickness as measured in mils, is contemplated herein. In a particular embodiment, the shrink film 40 has a thickness of about 160 gauge or 200 gauge. In one embodiment, the shrink film 40 is a polyethylene terephthalate (PET) such as polyethylene terephthalate glycol (PETG) shrink film having a thickness of about 160 gauge or 200 gauge, or size in between therein.

As with the backing and shrink film, the thickness of the applied adhesive 30 can vary as well. Preferably, however, the adhesive 30 should be applied at as minimal of a thickness that results in a permanent or near-permanent bond (or permanence) between the backing 20 and shrink film 40, that is, a bond of at least about 35 ounces per inch or greater. The thickness of the adhesive 30 will depend on the particular adhesive used and the particular characteristics desired in the composite. For example, the adhesive 30 can be applied to from a layer within the composite material having a thickness less than about 5 mils, less than about 2.5 mils, less than about 1.0 mils, less than about 0.75 mils, less than about 0.5 mils, less than about 0.25 mils, less than about 0.2 mils, less than about 0.15 mils, or less than about 0.1 mils. In a particular embodiment, the adhesive 30 forms a layer within the composite material having a thickness less than about 0.20 mils, and, preferably less than about 0.15 mils, and even more preferably, about 0.10 mils or less.

In certain embodiments, additional components may be further included as part of the composite material 110. For example, the composite material 110 may further include an adhesive, such as a pressure-sensitive adhesive, on the first surface 22 of the backing material 20 or, in an alternative embodiment, the second surface 44 of the shrink film 40, in order to adhere the composite to a surface. In one particular embodiment, the adhesive is on the first surface 22 of the backing material 20. The adhesive may allow the composite material 110 to adhere to a surface or structure. For example, the composite material 110 may include an adhesive on an outer surface, such as a pressure-sensitive adhesive, including water-based pressure-sensitive adhesives, such as acrylate adhesives, thermoplastics "hot melt" adhesives, two-sided adhesive tape, urethane adhesives, porous acrylic co-polymer adhesives, elastomer-based adhesives, natural and synthetic rubber adhesives, acrylic adhesives, or medical grade adhesives. Examples include polyacrylate adhesives, and polyvinylethyl ether blend adhesives.

Likewise, the composite material 110 may further include, in certain embodiments, a release liner or a coating on the first surface 22 of the backing 20 or the second surface 44 of the shrink film 40. Various release agents or coatings may be used, such as a silicone coating, stearato chromic chloride, polysteric carbonate, and other release agents well known in the art.

Various prototypes representative of FIG. 1 have been fabricated as non-limiting examples. For example, polyethylene terephthalate (PET) films of various thickness, 0.5, 1.0, or 5 mils, for example McMaster #8567K104 PET film, McMaster #8567k12 PET film, and McMaster #8567K52 PET film, was utilized as the backing materials and a polyethylene terephthalate shrink films, for example, the polyethylene terephthalate glycol-modified (PETG) shrink film SKC, Inc. Skyrol™ SP19H film in 160 gauge and 200 gauge thicknesses, polyethylene shrink films, for example, McMasters Polyolefin film, or PVC shrink films, for example, Uline PVC film, were laminated using a variety of adhesives. In one example, the materials were laminated using epoxy adhesives, for example, Loctite® 3034™, Bondit® B-45, and 3M DP-8005™, two-component aliphatic polyurethane adhesives, for example, Ashland, Inc. Purelam Fastcure™ 110/230, solventless acrylic adhesives, for example a 3M High Performance Acrylic Adhesive 467-like adhesive. The derived composite materials were exposed to heat ranging from 50° C. to 80° C. in order to activate the shrink films and induce the desired longitudinal width cross-web curl structure, and thus self-supporting materials.

Particularly useful composite materials were developed using a backing comprising PET film and a PETG shrink film laminated using the 3M 467-like acrylic adhesive product and a water-based hybrid polyurethane dispersion/acrylic emulsion with epoxy cross-linker. These combinations provided preferable laminate peel results, curvature profiles, and flexibility profiles.

Additional composite materials comprising ethylene vinyl acetate films, for example, Bloomer Plastics MC100K 12 mil matte emboss, vinyl plastic films, for example, vinyl plastic film #1781 from Vinyl Plastic Film Corp., cellophane films, for example McMaster #6712T11, and BOPP, for example, BOPP film from Griff Paper and Film were laminated to PETG shrink film using Bondit® B-45.

Other particularly useful composite materials were developed using a PET backing (92 gauge) and a PETG shrink film (the polyethylene terephthalate glycol-modified (PETG) shrink film SKC, Inc. Skyrol™ SP19H film in 160 gauge). For example, PET backing and PETG shrink film composites were made wherein the PET backing and PETG shrink film were laminated using several adhesives of varying technology-type and chemistry-type, including a two-component solventless, aliphatic polyurethane (Purelam Fastcure™ 110/230 100% solids adhesive; Purelam™ 6000/6050 100% solids adhesive; and Purelam™ Hybrid 6050 100% solids adhesive from Ashland, Inc.), a water-based polyurethane dispersion with epoxy cross-linker (Purethane™ A 4020 adhesive from Ashland, Inc.), a water-based hybrid polyurethane dispersion/acrylic emulsion with epoxy cross-linker (Purethane™ A 1078; and Purethane™ A 1090 from Ashland, Inc.), a water-based polyurethane dispersion (Purethane™ A 4025 from Ashland, Inc.), a solvent-based polyester with isocyanate crosslinker "F" (Solvester™ SB-F from Ashland, Inc.), and a solvent-based polyester with isocyanate "A" (Solvester™ SB-A from Ashland, Inc.). Preferably, the adhesives exhibit preferable peel strength, for example near-permanent to permanent bonding (i.e., peel strength of at least about 35 oz./in.).

In particular, a composite material comprising PET backing, a PETG shrink film (the polyethylene terephthalate glycol-modified (PETG) shrink film SKC, Inc. Skyrol™ SP19H film in 160 gauge), and a water based hybrid polyurethane dispersion/acrylic emulsion with epoxy cross-linker (Purethane™ A 1078) applied at a coat thickness of less than about 0.2 mils showed particularly good peel strength as measured by hand, flexibility, clarity (that is, a clear or transparent composite structure after manufacture), degree of arc cross-web curl induction control, and extended self-supporting capability (i.e., of greater than about 36 inches in strips of ¾ inches to 2 inches in width).

FIGS. 2-15 described below are directed to exemplary embodiments of the composite material 110 formed into an adhesive tape for exemplary purposes; however, other embodiments of the invention, at least as noted above, are contemplated, and the backing materials, shrink film materials, adhesive materials for lamination, and, to the extent described in the embodiments above or below, other materials such as pressure-sensitive adhesives for adhering the composite to a surface and the like, are applicable to composite materials formed into sheets, rolls, panels, graphics and signs, sewing patterns and shelf liners, wall paper and stencils, low cost packaging materials, bags that stay open without gussets, surface-protection materials, safety laminates for windows, windshields, and doors, bandages, wound care, and surgical films, nasal dilator strips, window tinting film, house wrap and weather stripping, safety and reflective film, incise, drape, and fenestration films, and point of purchase displays as well.

Figure 2:
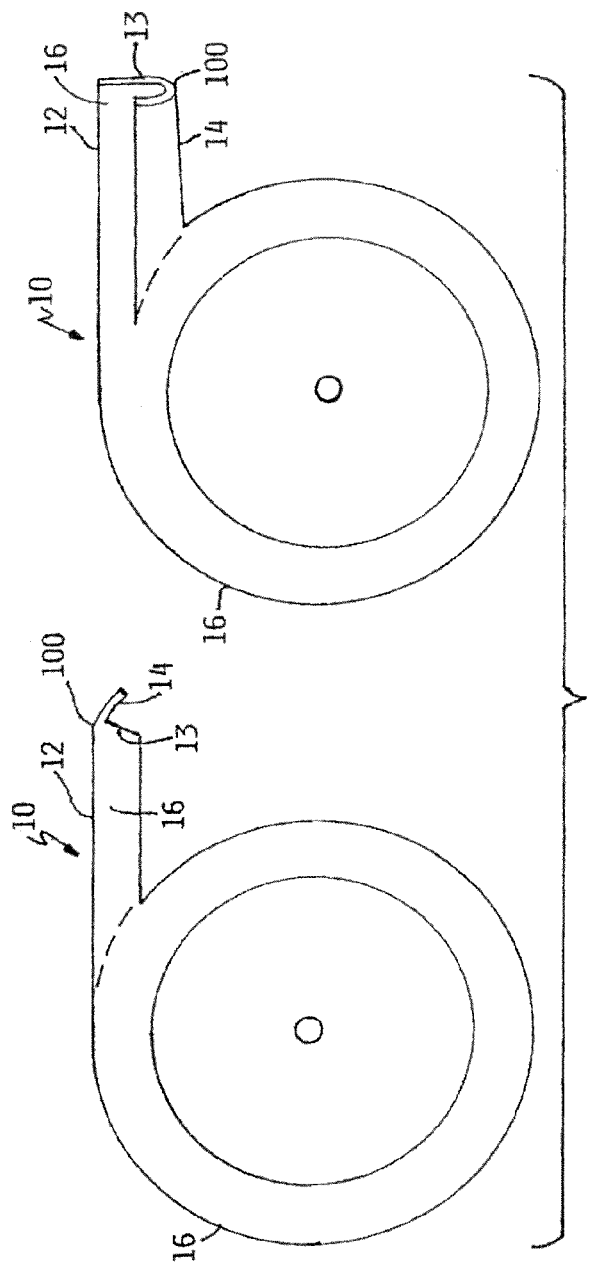
FIG. 2 depicts the composite material formed as roll of pressure-sensitive tape that is an exemplary embodiment of the instant disclosure, wherein the curvature of the length of tape is evident.

As illustrated in FIG. 2, the composite materials can be formed into a tape 10 on a roll and when extended from the roll, a cross section 13 of the tape length or strip 12 defines a cross web curl structure 100. The extended length 12 does not curl or coil on itself. An adhesive for adhering the tape to a surface, such as, for example, a pressure-sensitive adhesive, is coated on a first surface 14 of the tape 10 and, optionally, a release coating is coated on the second surface 16 of the tape 10. A certain extendable rigidity is imparted to the tape length 12, while the tape 10 remains flexible and generally conforms to the surface to which it may be affixed. As shown in FIG. 2, the adhesive for adhering the tape to a surface can be applied to the shrink film, depicted in the "curl-down" configuration of FIG. 2 (i.e., shrink film on the bottom of the tape as dispensed from the roll), or the adhesive for adhering the tape to a surface can be applied to backing, depicted in the "curl-up" configuration of FIG. 2 (i.e., backing on the bottom of the tape as dispensed from the roll).

Figure 3:
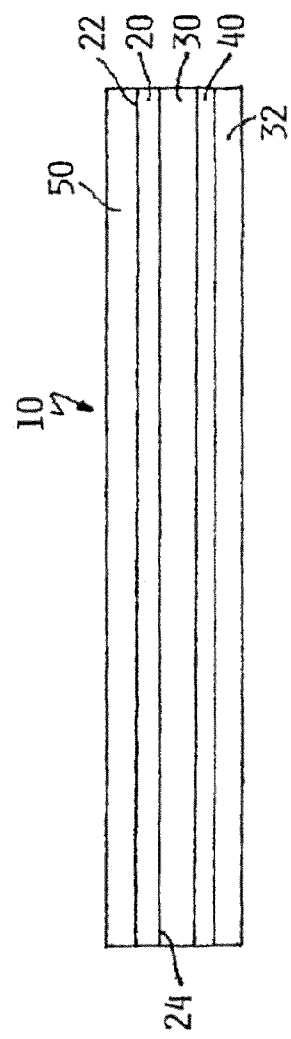
FIG. 3 illustrates a side view of the layers of an embodiment of the composite material formed as a tape.

Referring to FIG. 3 a side view of the tape 10 is depicted in one embodiment of the invention, with the components comprising the tape separated into layers. Here, one layer of the tape 10 is a backing material 20, one layer is a laminating adhesive 30, one layer is a shrink film 40, and another layer is an adhesive 32 that allows the tape to adhere to a surface or substrate. In addition, the backing material 20 may have a release agent or coating 50 coated on a first surface 22 of the backing material 20, and the laminating adhesive is coated on a second surface 24 of the backing material 20. In this embodiment, the adhesive 32 coated on the shrink film 40 is a pressure-sensitive adhesive 32 that is exposed during usage and adheres to the desired surface. Although FIG. 3 provides that adhesive 32 for adhering the tape 10 to a surface is disposed on the non-laminated side of the shrink film 40, in one embodiment (figure not shown), the adhesive 32 can also be applied to the backing 20 of the tape 10.

The adhesive 30 for laminating, or adhesive 32 allowing adherence to a surface or substrate may be altered prior to its application to the awaiting film to create the mechanism for imparting rigidity to the sheet or tape. Alternatively, the composite material itself may be altered prior to receiving the adhesive 32, for example, the shrink film may be activated before or after the adhesive 32 is applied. Various release agents or coatings 50 may be used, such as a silicone coating, stearato chromic chloride, polysteric carbonate, and other release agents well known in the art. In an alternative embodiment, the adhesive tape shown in FIGS. 3 and 4 does not contain a release coating 50 or 150 coated on a first surface of the backing material 20 and 120, respectively. In this alternative embodiment, the adhesive 32 and 132 is chosen such that it is easily released from the backing material 20 and 120 when the tape is wound into a roll configuration.

Figure 4:
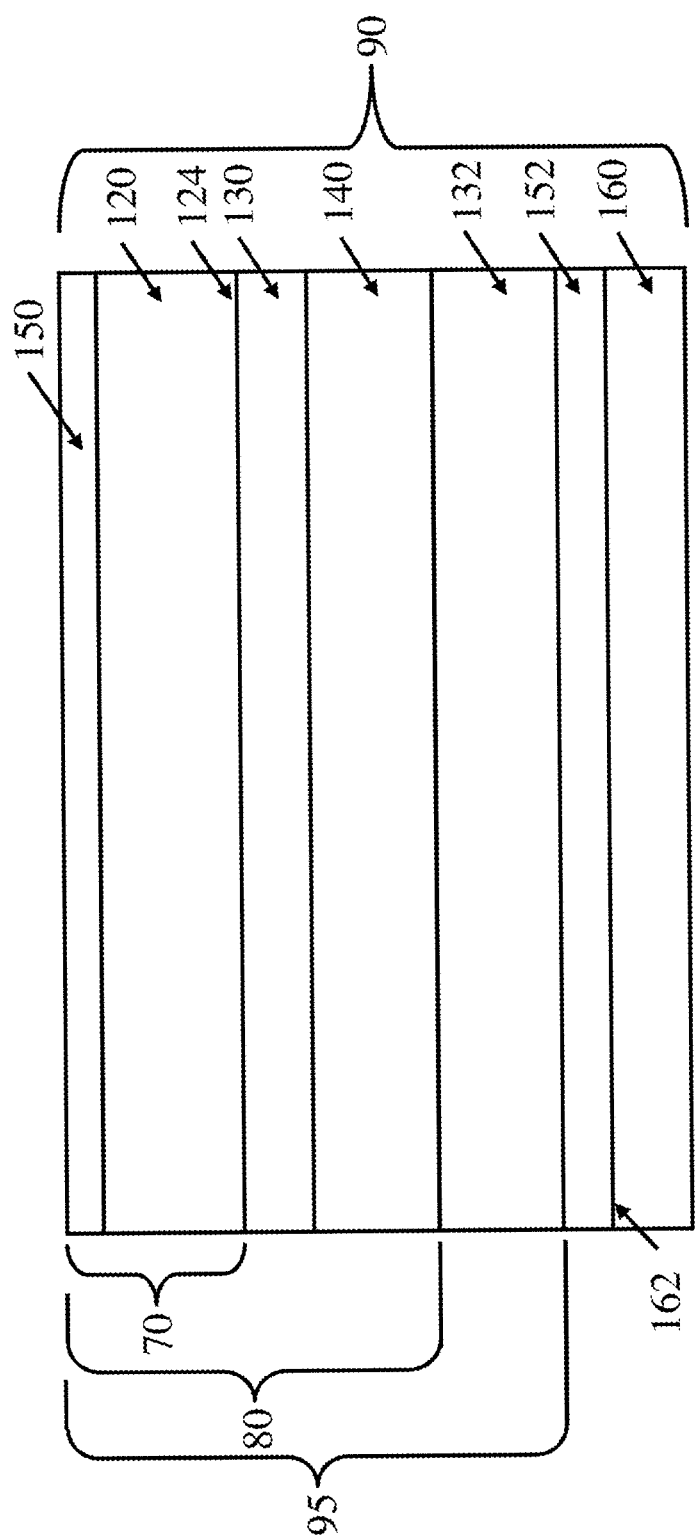
FIG. 4 illustrates the various layers of an exemplary embodiment created during the process of manufacturing the composite materials formed as a tape.

In another alternative embodiment, the tape shown in FIGS. 3 and 4 contains the shrink film 40 and 140 between the release coating 50 and 150 and the backing material 20 and 120, respectively. In an alternative embodiment (figure not shown), the adhesive 30 and 130 is located between the shrink film 40 and 140 and backing material 20 and 120, respectively, and the adhesive 32 and 132 is coated on the first surface (or non-laminated surface) of the backing material 20 and 120, respectively.

In still another alternative embodiment, the adhesive tape shown in FIGS. 3 and 4 also contains a graphic, decal or wording, which may be printed on the backing material 20 and 120 or contained on another intermediate layer.

The adhesive tape 10 shown in FIGS. 3 and 4 may be manufactured utilizing a system including a CLS 300 slot die-coater, a May coater and an Acumeter PG 10 melter. Other such equipment capable of coating a backing with adhesive and winding rolls of material is also contemplated. The adhesive allowing adherence to a substrate or surface that is used to coat the composite material may be a permanent pressure-sensitive adhesive or a removable pressure-sensitive adhesive, for example, an adhesive containing microspheres, and comes in various forms, such as water based adhesive, hot melt adhesive, solvent based adhesive.

Figure 5:
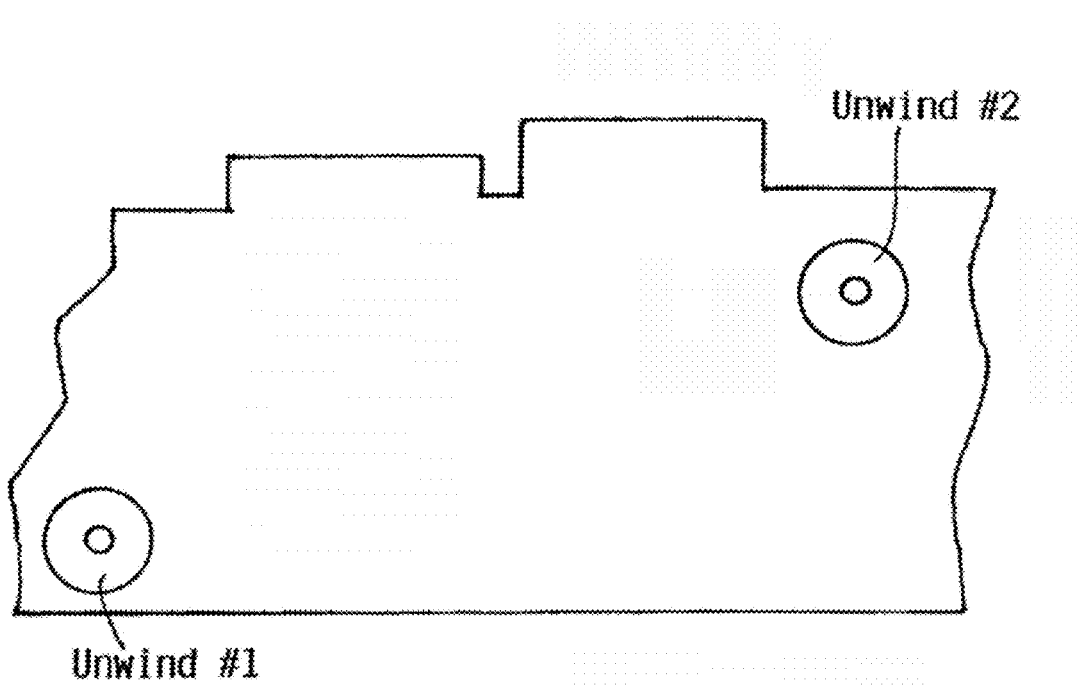
FIG. 5 illustrates an example of the manufacturing equipment useful in manufacturing the composite materials.

FIG. 5 depicts coating equipment that may be used to manufacture the composite material. For example, a backing material 120, for example a PET film, can be placed on unwind #1 of the coater. The adhesive 130 for laminating, for example an acrylic or polyurethane-based adhesive, can be applied to a second surface 124 of the backing material 120, at a coating speed of approximately 20-30 feet/minute or faster, for example, at 150 feet/minute. The adhesive coating 130 can be applied to the backing material 120 at a thickness of preferably less than about 1.0 mil, and more preferably at less than about 0.2 mils, and even more preferably at about 0.1 mils or less.

A shrink film 140, for example a PET such as a PETG shrink film, can be placed on unwind #2 and be laminated at the first surface 142 of the shrink film 140 using the adhesive 130 for laminating coated to the second surface 124 of the backing material 120 at the nip roller apparatus at approximately 30 psi and then be rewound to form a roll. Optionally, the shrink film can be surface treated, for example, corona surface treated, prior to lamination.

An additional embodiments, a silicone coated kraft paper liner 160 can be mounted on unwind #1 and the silicone coated side 162 of the kraft paper liner 160 may be coated with a pressure-sensitive adhesive 132. The pressure-sensitive adhesive 132 may be applied to the silicone coated surface 162 of the kraft paper liner 160. The roll of composite material 80 comprising silicone coating 150, backing material 120, adhesive 130, and shrink film 140 can be positioned on unwind #2 and the pressure-sensitive adhesive layer 132 of the kraft paper liner 160 laminate can be mated to the shrink wrap surface of the composite material 80. This new laminate 90 comprises a silicone coating 150, backing material 120, adhesive 130 for laminating, shrink film 140, pressure-sensitive adhesive 132 for adhering to a surface, silicone coating 150, and kraft paper liner 160. The rolls of laminate 90 can be slit into the desired tape diameter. The kraft paper liner 160 can be removed, leaving behind the laminate 95 comprising a silicone coating 150, backing material 120, laminating adhesive 130, shrink film 140, and the pressure-sensitive adhesive 132. In roll or stacked sheet form, the pressures sensitive adhesive 132 is in contact with the silicone release coating 150 on the backing material 120, and thus forms a roll of pressure-sensitive tape or stack of pressure-sensitive sheets.

To induce the cross-web curl structure, the shrink film of the composite material can be subjected to heat at a temperature appropriate to activate the shrink film resulting in the shrinking of the shrink film. In one embodiment, the cross-web curl structure is imparted in a single manufacturing step, that is, the backing material and shrink film are laminated and the cross-web curl structure is imparted in the resultant composite material in a single "in-line" run. For example, in one embodiment, the cross-web curl structure is imparted as part of the laminating process, that is, the structure is induced simultaneously upon laminating the shrink film to the backing, for example, by using an adhesive for laminating applied at a temperature at or above the onset activation temperature of the shrink film. In one exemplary embodiment, the adhesive can be a heat-cure adhesive, that is, an adhesive that cures when exposed to a specific minimum temperature. Heat cure adhesives are known in the art. Non-limiting examples of heat cure adhesives include acrylics, such as solution and solventless acrylics, two-component polyurethanes, polyurethane dispersions, polyurethane dispersions/acrylic emulsions, and polyesters. In a particular embodiment, the adhesive can be a hybrid polyurethane dispersion/acrylic emulsion with epoxy cross-linker.

In an alternative embodiment, the backing material and shrink film are first laminated and then immediately exposed to cross-web curl structure inducing conditions, for example, subject to heat, such as with a heat roller, heated bar, radio frequency, pass-through oven, microwaves, gamma radiation, infrared radiation, heated water-bath, and the like, to impart the cross-web curl structure. In one particular embodiment, the composite material is exposed to a heated water-bath in order to activate the shrink film and induce a cross-web curl structure in the composite material.

In an alternative embodiment, the backing material and shrink film are first laminated to form a composite material and then, in a separate, second manufacturing step some time later, the composite material is imparted with a cross-web curl by being subjected to heat, such as with a heat roller, heated bar, radio frequency, pass-through oven, microwaves, gamma radiation, infrared radiation, heated water-bath and the like. In one particular embodiment, the composite material is exposed to a heated water bath, wherein the temperature of the water-bath is sufficient to activate the shrink film in the composite material and impart a cross-web curl structure in the composite material. In either event, the composite material with the desired cross-web curl structure can be formed into a roll of tape 10 or stacked sheets, or any of the other applicable structures described herein.

In one particular embodiment, the backing material and shrink film are first laminated to each other to form a composite material using a laminating heat-cure adhesive that has an initial cure temperature that is less than the initial activation temperature of the shrink film. The backing and heat shrink material can be laminated using heat at a temperature sufficient to cure the heat-cure adhesive but insufficient to induce shrink in the film. Non-limiting examples of heat cure adhesives include acrylics, such as solution and solventless acrylics, two-component polyurethanes, polyurethane dispersions, polyurethane dispersions/acrylic emulsions, and polyesters. In a particular embodiment, the adhesive can be a hybrid polyurethane dispersion/acrylic emulsion with epoxy crosslinker. The resultant composite can then be exposed to a temperature sufficient to activate the shrink film in the composite material and impart a cross-web curl web structure in the composite material.

In an alternative embodiment, the backing material and shrink film are first laminated to each other to form a composite material using a laminating heat-cure adhesive. The resultant composite can then be exposed to a temperature sufficient to both simultaneously cure the heat cure adhesive and activate the shrink film in the composite material, imparting a cross-web curl web structure in the composite material. Non-limiting examples of heat cure adhesives include acrylics, such as solution and solventless acrylics, two-component polyurethanes, polyurethane dispersions, polyurethane dispersions/acrylic emulsions, and polyesters. In a particular embodiment, the adhesive can be a hybrid polyurethane dispersion/acrylic emulsion with epoxy crosslinker.

As shown in FIG. 2, the cross-section 13 of the tape 10 may flatten laterally while configured in the roll of tape 10 or stacked sheets. However, for example, when a length or strip 12 of tape is pulled from the roll of tape 10, the cross-web curl structure or arc 100 is present in the cross-section 13 of the length of tape 12. The cross-web curl structure of the tape strip 12 cooperates with the materials of the strip of tape 12 such that the strip of tape 12 does not coil or curl on itself and extends a distance from the edge of the roll of tape 10. One embodiment includes structures which, when formed into, for example composites with a longitudinal width of about ½ inch, about ¾ inch, about 1 inch, about 2 inches, about 3 inches, about 4 inches or more having an imparted cross-web curl along its longitudinal width, can extend from the roll at least about 4 inches, at least about 5 inches, at least about 6 inches, at least about 7 inches, at least about 8 inches, at least about 12 inches, at least about 16 inches, at least about 18 inches, at least about 24 inches, at least about 36 inches or more. Furthermore, larger composite material samples, for example composite material sheets having longitudinal widths of at least about 8 inches, at least about 12 inches, at least about 16 inches, at least about 24 inches, at least about 30 inches, at least about 36 inches or more and having imparted cross-web curled structure also experience the extension of the bending moment in comparison to the same material without the imparted cross-web curl. Such self-supporting lengths can be, for example, at least about 4 inches, at least about 5 inches, at least about 6 inches, at least about 7 inches, at least about 8 inches, at least about 12 inches, at least about 16 inches, at least about 18 inches, at least about 24 inches, at least about 36 inches or more. Although the example has been provided for producing tape, a similar process is used to produce sheets or panels of similar material that also have the property of being self-supporting, yet flexible.

Figure 6A:
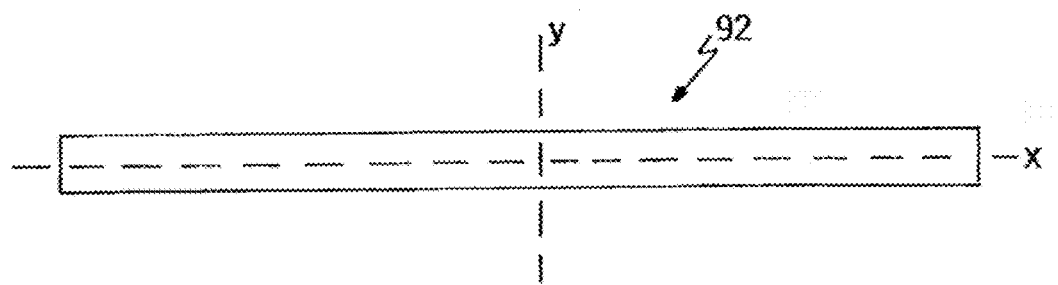
FIG. 6A illustrates composite materials as a flat tape strip without an arc-shaped curvature before the shrink film layer is induced by, for example, heat activation
Figure 6B:
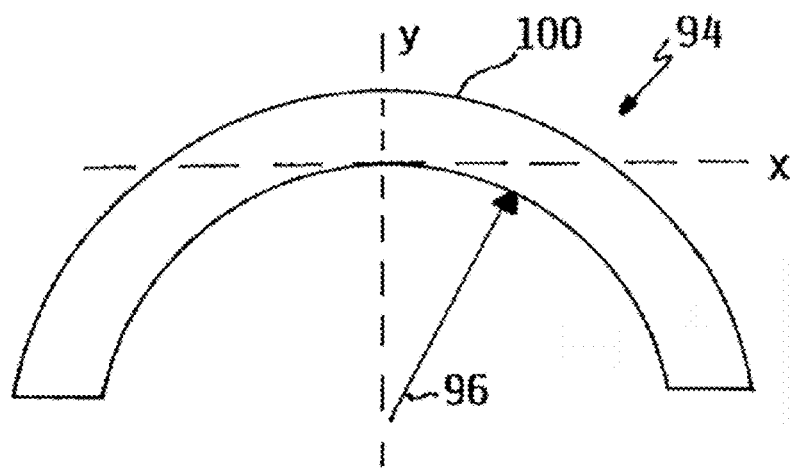
FIG. 6B illustrates an arced strip of tape following the heat activation of the heat shrink film layer of the composite material.

Referring to FIGS. 6A and 6B, respective cross-sections of a flat tape or sheet 92 and a tape or sheet imparted with a cross-web curl structure 94 are depicted. Although not wanting to be bound by any particular theory, the arc shape cross-web curl structure 100 or radius 96 of the arced shaped cross web structured tape or sheet 94 possesses a certain stiffness or rigidity that is imparted to the strip of tape 12. The stiffness of the tapes or sheets 92 or 94 about an x axis or y-axis is proportional to the second moment of inertia I of the cross-section 13. In the instance of the flat tape or sheet 92, the stiffness of the tape or sheet 92 about the y axis is substantially greater than the stiffness about the x-axis; thus, the tape or sheet 92 resists deflection about the y-axis to a greater extent than about the x-axis. For the imparted cross-web curl structure tape or sheet 94, the stiffness about x-axis is greater than the stiffness of the flat tape or sheet 92 about the y-axis resulting in a more rigid length. While the stiffness of the imparted cross-web curl structure tape or sheet 94 about the y-axis may be diminished somewhat relative to the flat tape or sheet 92, the overall stiffness of the imparted cross-web curl structure tape or sheet 94 is generally more self-supporting. As such, a composite having an imparted arc will have an extended bending moment compared to the same composite without the imparted arc, that is, in comparing the two materials, the composite with the arc will horizontally extend or self-support a distance further than the composite without the arc before buckling or falling. In certain embodiments, this extended distance difference before buckling between two like composites with and without an imparted arc can be at least about 4 inches, at least about 6 inches, at least about 8 inches, at least about 10 inches, at least about 12 inches, at least about 18 inches, at least about 24 inches, at least about 36 inches or more.

Figure 7:
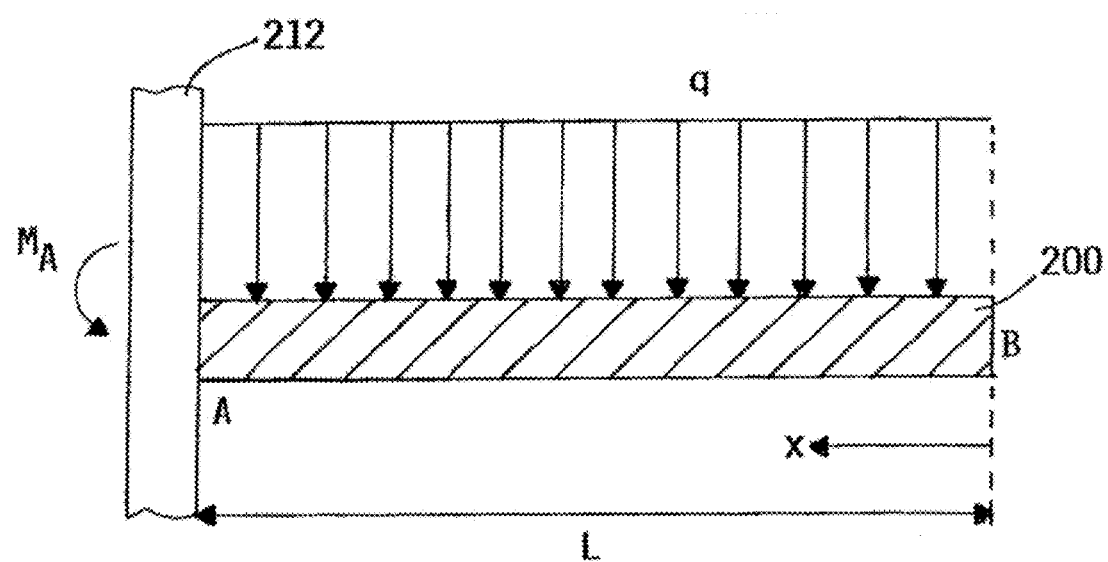
FIG. 7 illustrates the composite materials formed as a tape, wherein the tape length is under uniform pressure.
Figure 10:
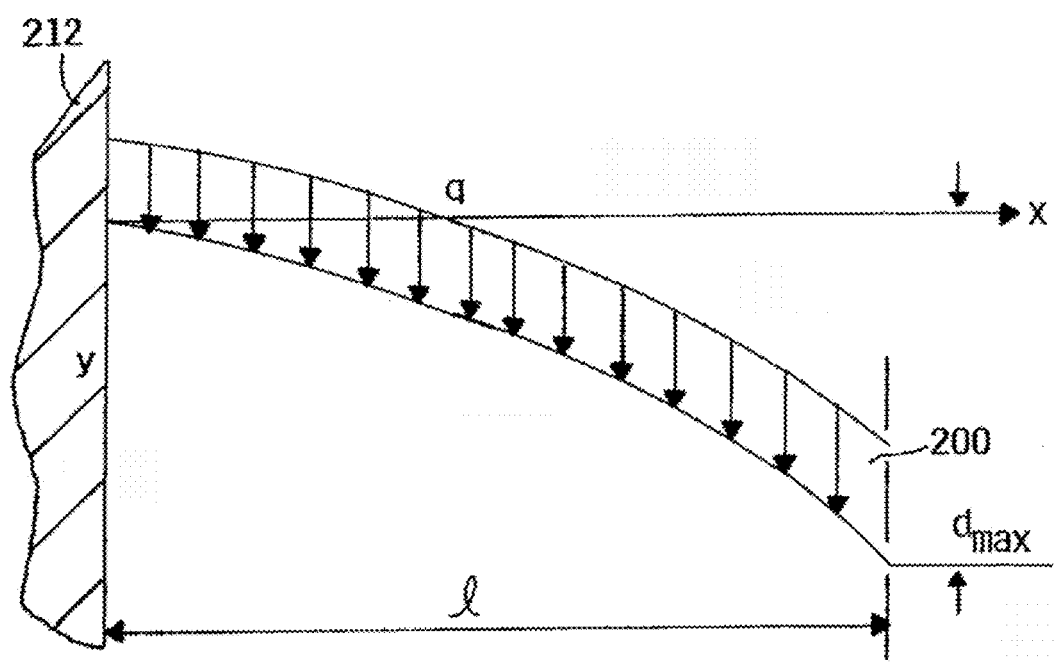
FIG. 10 illustrates the composite materials formed as a tape, wherein the tape length is bending under uniform pressure.

One exemplary embodiment of the invention is represented by tape lengths that are self-supporting and are able to extend beyond the tape roll or beyond the end of a tape applicator without additional mechanical support. A panel or sheet of material of the invention can also be configured to behave similarly, for self-support when extended. Although not wanting to be bound by any particular theory, the following is a general description of parameters affecting the self-supporting extendibility of composite material of the invention. Referring to FIG. 7, the deflection of a length of tape 200 extending from the end of a tape dispenser can be approximated as a cantilever beam having a length L extending from a fixed support 212. For a cantilever beam, the shear force V is represented by the formula $V=-qx$ and the bending moment M is represented by the formula $M=-qx^2/2$, where q represents a uniformly distributed load over the length L (i.e. the weight of the tape in force per unit length) and x is any point along the axis of the length of tape 200 relative to a free end. The maximum values of the sheer force and bending moment occur at the fixed support 212 where x=L, $V_{max}=-qL$ and $M_{max}=-qL^2/2$. The bending moment is when a structural element, such as the tape 200 or beam, bends. The deflection at any section of the beam/tape, as shown in FIG. 10, is given by $$y=(qx^2/24EI)(x^2+6l^2-4lx),$$

and the maximum deflection is found by $\delta_{max}=ql^4/8EI$.

The Euler-Bernoulli beam theory provides a means of calculating the load-carrying and deflection characteristics of beams. The relationship between the beam's deflection and the applied load can be represented by the Euler-Bernoulli equation $$\partial^2/\partial x^2 f(EI\partial^2 u/\partial x^2)=w$$

The curve u(x) describes the deflection u of the beam at some position x.
w=a distributed load (force/unit length)
E=Young's modulus (modulus of elasticity; ratio of stress to strain)
I=the second moment of area or second moment of inertia. $EI\ \partial^4 u/\partial x^4=w(x)$ describes the deflection of a uniform, static beam.
u is the deflection; $\partial u/\partial x$ is the slope of the beam; $EI\ \partial^2 u/\partial x^2$ is the bending moment of the beam; and $-\partial/\partial x\ (EI\ \partial^2 u/\partial x^2)$ is the shear force in the beam.
The bending moment and the shear force cause stresses in the beam. Shear force stresses are minimal in comparison to bending moment stresses, unless the beam is a stocky (short and thick) beam. The tensile stress of the beam can be expressed by the equation $$\delta=Mc/I-Ec\partial^2 u/\partial x^2$$

c is the distance from the neutral axis to a point of interest;
c is a position along u
M=the bending moment When the tensile stress is greater than the yield stress of the material, failure in bending will occur. The equation implies that bending of positive sign will cause zero stress at the neutral axis, positive (tensile) stress is at the top of the beam and compressive stress is at the bottom of the beam; the maximum stress will be at the top surface and the minimum stress will be at the bottom surface.

In the embodiment of a length of tape being dispensed from a tape dispenser, the tape can be likened to a cantilever beam. The length of the tape can be assigned a value, L, and this is the length from the dispenser, where the dispenser x-coordinate is 0. The boundary conditions for the cantilever beam that is completely fixed at one end (deflection and slope at fixed end are both 0) and completely free at the other end (shear force and bending moment are both zero at L; assuming EI is a constant) are:

$$u|_{x=0}=0\ \partial u/\partial x|_{x=0}=0 \text{ at the fixed end; and}$$

$$\partial^2 u/\partial x^2|_{x=L}=0 \text{ and } \partial^3 u/\partial x^3|_{x=L}=0 \text{ at the free end.}$$

The second moment of area or second moment of inertia is used to predict the material's resistance to bending and deflection. A high second moment of inertia in a material or beam indicates a propensity not to bend or deflect.

$$I_x=\int y^2 dA \text{ where}$$

$I_x$=the second moment of inertia about the x-axis
dA=the elemental area
y=the perpendicular distance from the x-axis to the element dA.

In the example of an extension of tape, the normal stress in the tape extension due to bending is $\delta=(MI)\ y$ where
M=bending moment
I=second moment of inertia about the x-axis
y=the perpendicular distance to the centroidal x-axis.

Figure 8:
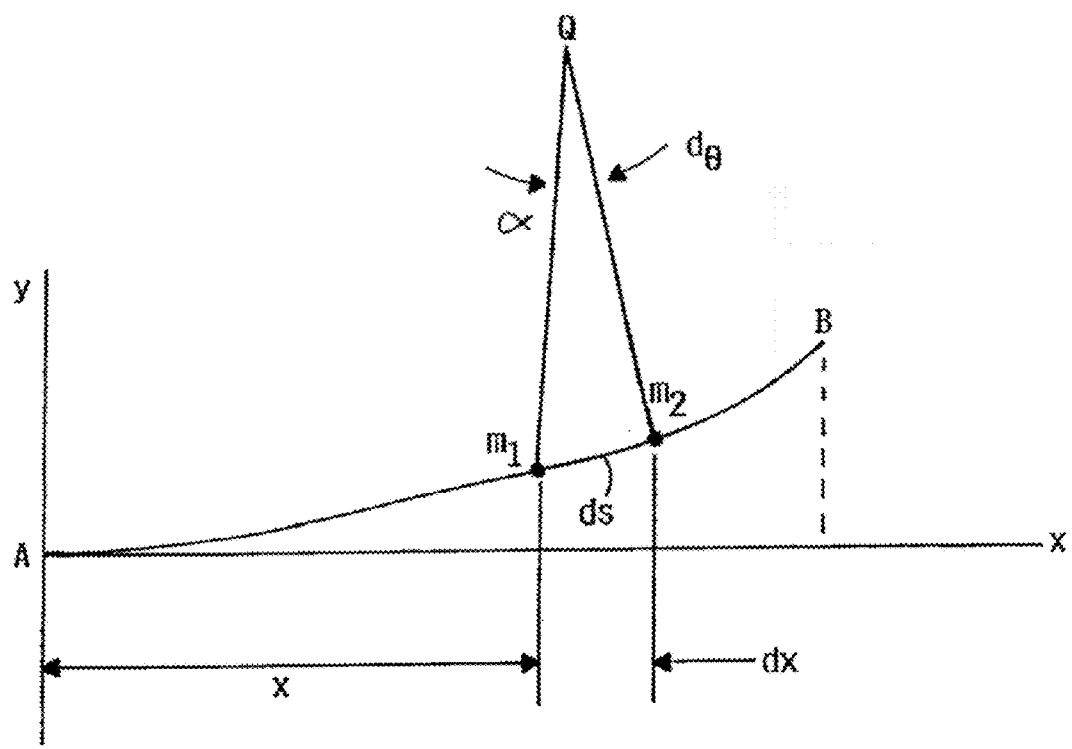
FIG. 8 illustrates the composite materials formed as a tape showing the deflection of a length of tape.

A representation of the curvature of the length of tape of the example, where the tape extends from the tape dispenser is shown in FIG. 8. Here, $d\theta/ds=-\kappa=1/\rho$, where the curvature $\kappa=1/\text{radius of curvature}$. Curvature is the measure of how sharply a beam, here, the tape, is bent. As load is increased, amount of bending increases and the radius of curvature becomes smaller. The curvature can also be expressed as $\kappa=M/EI$; curvature=bending moment/flexural rigidity.

Flexural rigidity is the measure of the resistance to bending; the larger the flexural rigidity, the smaller the curvature for a given bending moment. Hence, dependent upon the various materials used for the tape, the tape's degree of arc or the cross-web curl structure and the bending moment of the tape are related such that, for a given bending moment, a small curvature (x) is coupled with a larger flexural rigidity; and a larger curvature (x) is coupled with a smaller flexural rigidity.

Young's modulus of elasticity (E) is a measure of the stiffness of a material, and can be represented by the ratio of stress/strain, and is measured in pascals or psi.

$$E=\delta/\epsilon=F/A_0/\Delta L/L_0=FL_0/A_0\Delta L, \text{ where;}$$

F=force applied to the object
$A_0$=cross sectional area through which force is applied
$\Delta L$=amount by which the length of the object changes
$L_0$=original length of object Hence, the modulus of elasticity (E) of the tape, sheet, decal, or other embodied composite material can be calculated, thus differentiating the various materials that can compose the tape or sheet of the invention. The tapes and sheets can comprise various combinations of backing materials, shrink materials, adhesives, and so on, so that the E value can be tested and calculated for each combination, and ranges of values developed within which typical tapes and sheets or panels will fall. The same process can be conducted for embodiments of the invention other than tapes; for example, decal sheets or vinyl graphics panels.

Some (E) and tensile stress values for materials that can be incorporated in a tape or sheet product are noted in FIG. 11. The modulus of elasticity (E) can be determined experimentally from the slope of a stress-strain curve, created during tensile tests conducted on a sample of the material. Young's Modulus, E, allows the behavior of a material under load to be calculated; and the E value can be used to predict when a material will buckle or hinge under compression. At some point the deflection of the material (e.g. tape) will be overcome, and instead of deflecting, the material (e.g., tape) will buckle. The energy method is one method of approximating maximum buckling load, especially for non-columnar shapes. To calculate the maximum buckling load, two equations are used;

$$A_{innwe}=EI/2\int(w_{xx}(x))^2 dx \text{ and } A_{outer}=P_{crit}/2\int(w_x(x))^2 dx;$$

where w(x) is the displacement function and subscripts "x" and "xx" refer to the first and second derivatives of the displacement. Energy conservation results in $A_{inner}=A_{outer}$ or $EI/2\int(w_{xx}(x))^2\ dx=P_{crit}/2\int(w_x(x))^2\ dx$.

However, the shape of the tape length along the x-axis counteracts the tendency of the tape length to deflect, and eventually to hinge or buckle. The curvature of the tape (i.e., the degree of arc of the cross-web curl structure) sets-up a tension so that the tape does not deflect or buckle at the points predicted by the Euler-Bernoulli beam equations or the Timoshenko beam equations.

Figure 9:
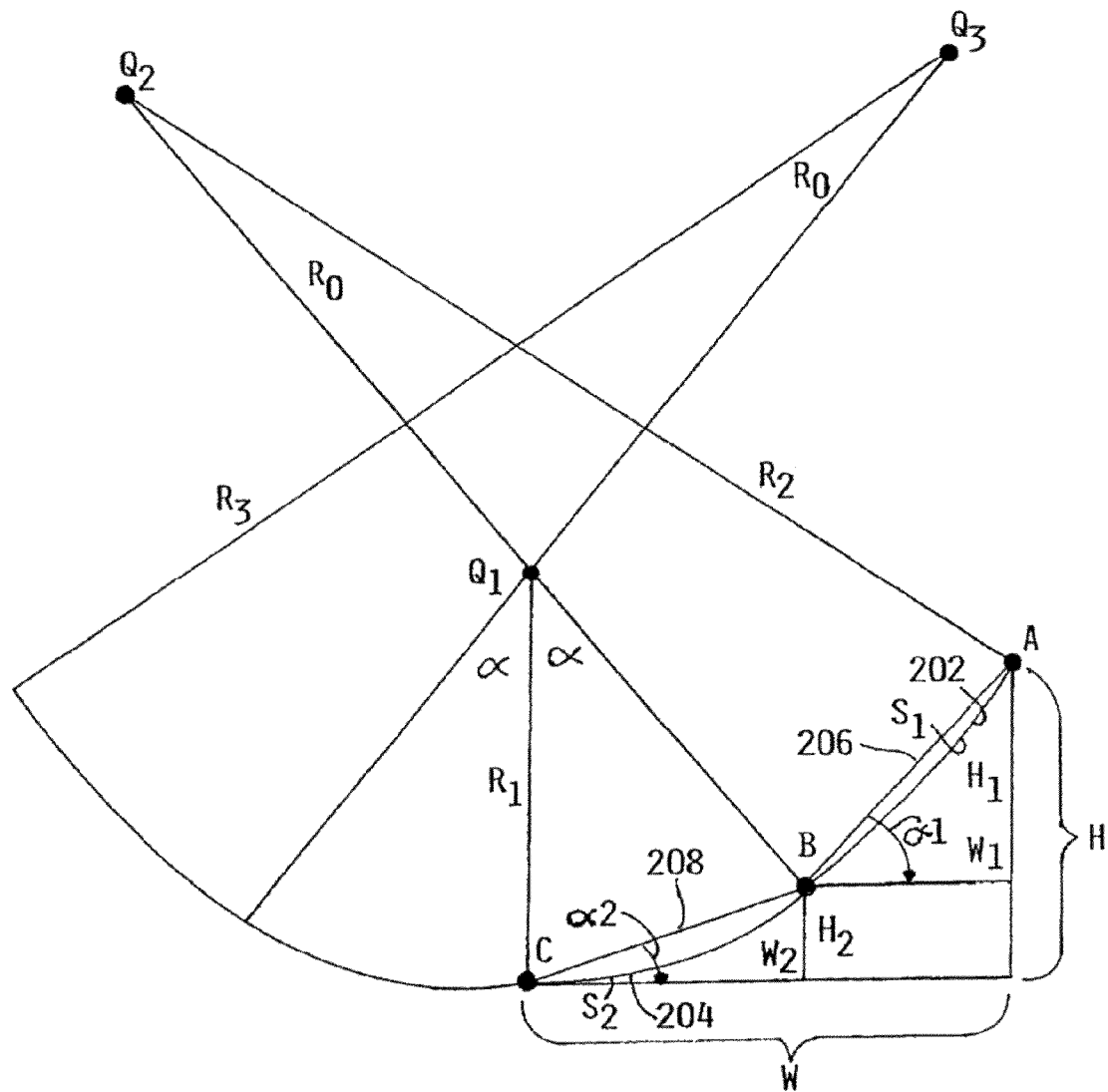
FIG. 9 illustrates longitudinal curvature of the composite materials formed as a tape or sheet.

The face of the sheet or tape along the x-axis is represented in FIG. 9, wherein the sheet or tape has a cross-web curl structure. As a result of the cross-web curl structure, that is, the convex/concave configuration, the tape, or other such composite material structures (e.g. sheets) is capable of extending from a tape dispenser or roll for an extended length without buckling, or in the instance of tape, coiling, curling, or prematurely falling. In the instance of larger panels, for example, decals or vinyl graphic panels, the decals and panels extend in such a manner that they do not buckle at the point that panels and sheets not incorporating composite materials imparting a cross-web curl structure generally buckle or deflect.

An optimal cross-web curl structure of the concave or convex configuration of the tape length is an important point to ensure extended self-support of the tape, decal, graphic panel, or other such material or product.

Referring to FIG. 9, in one embodiment, the tape has two longitudinal central sections and two longitudinal side sections where the curvature of the side sections is not as great as the curvature of the central section of the tape. The tape has a slope parameter D and a length parameter L where $C=2(S_1 t_1 + S_2 t_2)/W$ where W is the width of the tape (flattened) and $S_1$ is the arc length of the center section of the tape and $S_2$ is the arc length of the side sections of the tape; $t_1$ is the slope of the central section of the tape and $t_2$ is the slope of the side sections of the tape and H is the thickness of the tape.

As noted above, each of the side segments of the tape has a curvature that is less than the curvature of the central segment of the tape. Hence, the tape forms a concave structure; a trough-like shape. In certain embodiments, this concave structure of the tape, along with the tape materials, is instrumental in maintaining the extendable self-supporting configuration of the tape. The radius of the central segment curvature is designated $R_1$, with a radius angle $2\alpha$; and the radius of each side segment curvature is designated $R_2$, with a radius angle $\beta$. If the radii $R_1$ of the central segment are extended, they intersect at point $Q_1$, the center of a circle with radii $R_1$. Similarly, if the radii $R_2$ of a first side segment are extended, they intersect at a point $Q_2$, the center of a circle with radius $R_2$. The circle formed by the radii $R_3$ of a second side segment form a circle with a radius of $R_2$, and a center of $Q_3$, as shown in FIG. 9.

The two radii $R_2$ associated with the first side segment define an arc AB (202), with a length of $S_1$. The radii R1 associated with the central segment, and a projecting angle $\alpha$ define an arc BC (204) with a length of $S_2$. Further, the width from A to B is defined as $W_1$ and the width from B to C is defined as $W_2$. The height from A to B is defined as $H_1$ and the height from B to C is defined as $H_2$. The total width of the tape is defined as W. A chord 206 connecting points A and B is shown in FIG. 9 and defined as $t_1$ (the tangent), where $t_1 = H_1/W_1 = \tan \gamma_1$. Further, a chord 208 connecting points B and C is shown in FIG. 9 and is defined as $t_2$, where $t_2 = H_2/W_2 = \tan \gamma_1$. Therefore, the arc length from A to B can be expressed as $S_1 = R_2 \beta$; and the arc length from B to C is expressed as $S_2 = R_1 \alpha$. Further, the width of the tape can be expressed as $2(S_1 + S_2)$. The slope of the line AC can be expressed as $D = 2(S_1 t_1 + S_2 t_2)/W$.

Examples of the self-supporting tape or sheet are measured to determine the various parameters as described above. Based upon these measurements, the ratio of the slope of line AC (value D) is determined. The ratio of L/D, where L is the length of tape that is self-supporting for that particular D value is calculated for each sample. The length L is correlated to the value of the slope D, so that the ratio of L/D, at various values of D is predictive of the self-supporting length L. In the above samples, the value of the thickness of the tape is held constant. However, in additional examples, the thickness of the tape can be varied, to determine the effect of the thickness of the tape on the self-extending length L. Further, the ration of W/D can be calculated to determine the width parameter of the self-supporting tape.

The transverse curvature of the tape or sheet increases the second moment of inertia, improving the bending performance of the tape or sheet. The transverse curvature of the tape or sheet also imparts hinge-like behavior to the tape length or sheet. When a bending moment M is applied to the end of, for example, the tape, the tape exhibits elastic deformation, and when the bending moment M is removed, the tape returns generally to its original configuration. Once a critical load on the tape end is reached, the tape behaves like an elastic hinge, and buckles. A constant force is required if the deformation is to be increased. The materials composing the tape or sheet, and the degree of transverse curvature of the tape or sheet, affect the magnitude of the load needed to induce the hinge-like effect in the tape or sheet. This effect can by described by the equations $$r = \sqrt{(D^*_{11}/D^*_{22})} R \text{ and } My = D_{22}/R$$

Figure 12A:
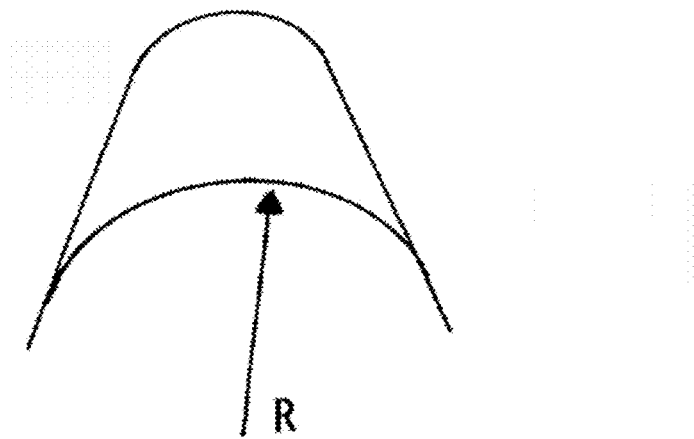
FIG. 12A illustrates the non-deformed transverse curvature of a length of composite material of the invention and FIG. 12B illustrates the deformed longitudinal curvature (hinge/hinging) of composite material of the invention.
Figure 12B:
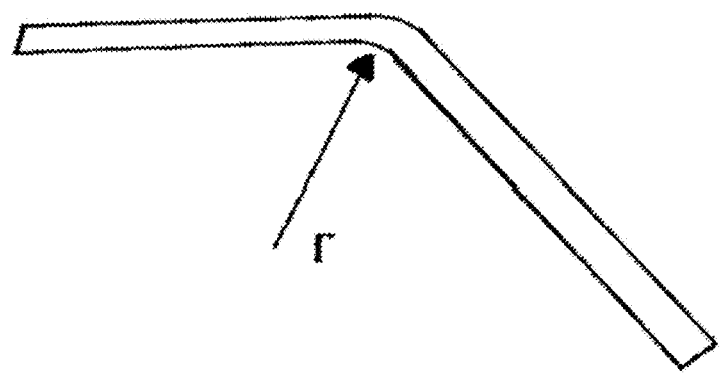
Figure 13:
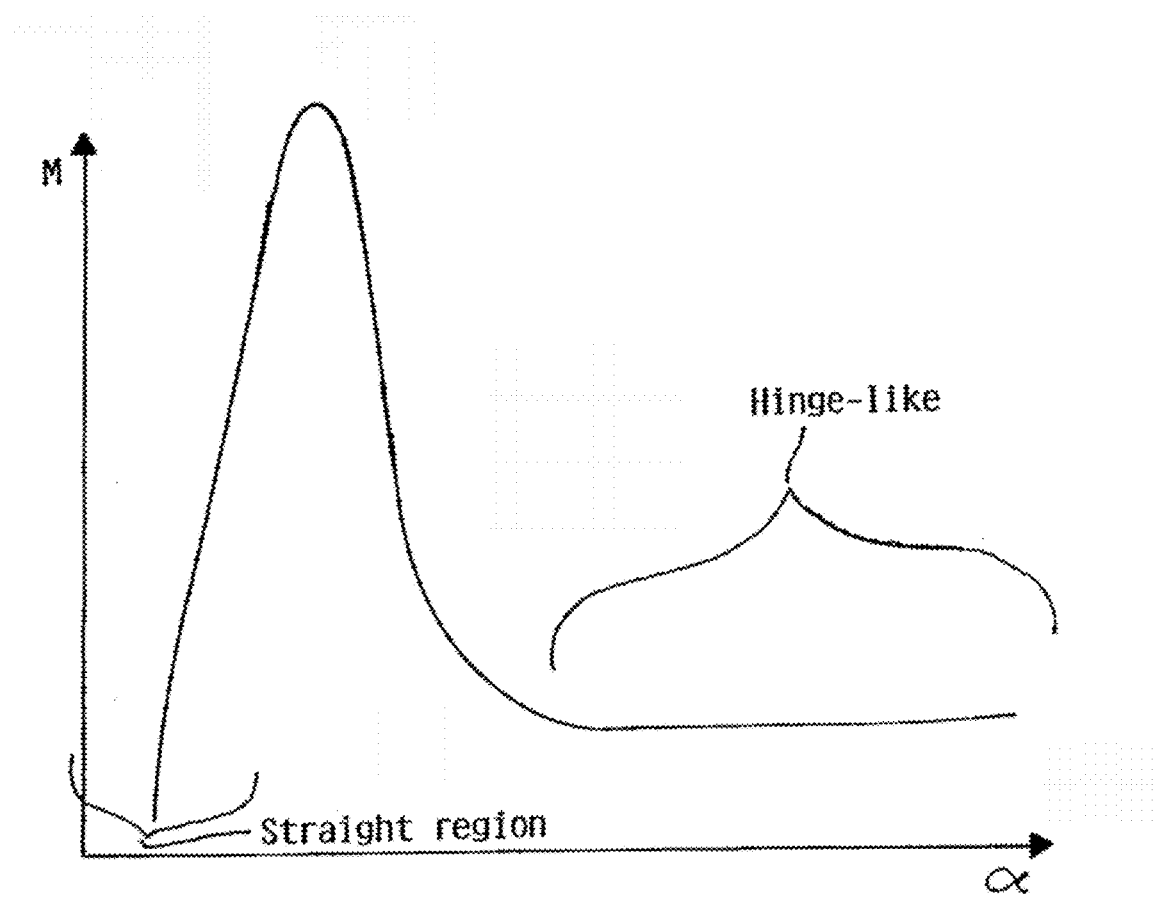
FIG. 13 is a chart illustrating bending moment effect on the straight region and hinge-like region of material of the invention.
Figure 14A:
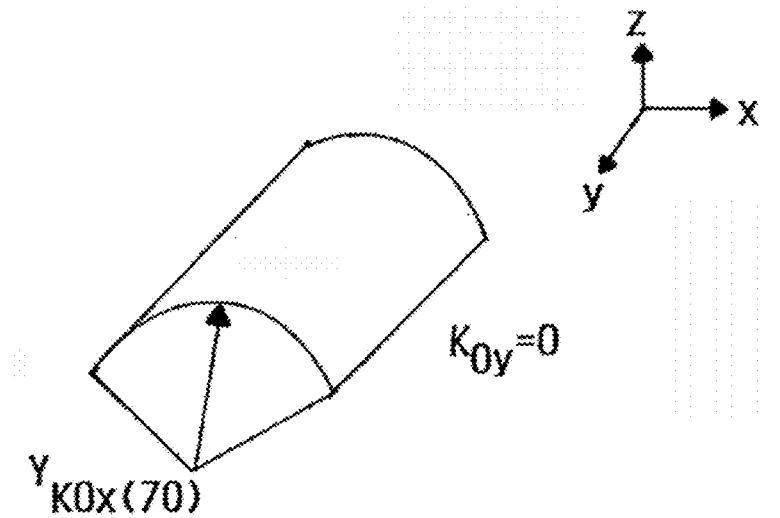
FIG. 14A illustrates an arced sheet composite material of the invention and FIG. 14B illustrates edge bending moments resulting in substantially flattened sheet composite materials of the invention.
Figure 14B:
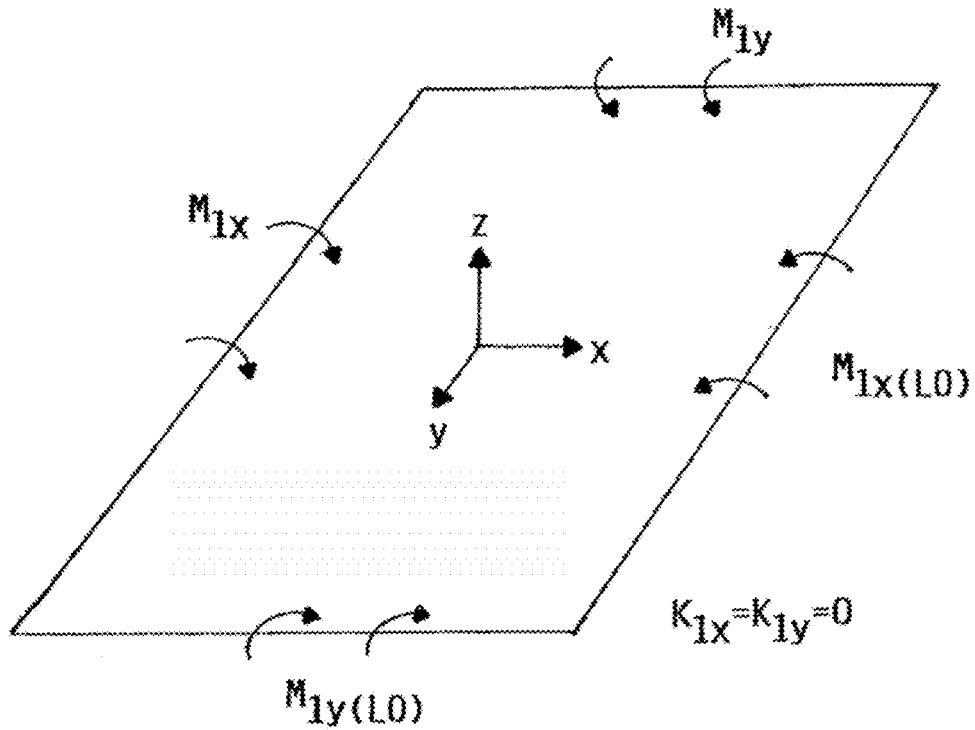

$D^*ii_{11}$ represents the components of the reduced flexural matrix of the laminate, R and r are the undeformed transverse curvature and the deformed longitudinal curvature of the tape or sheet, as shown in FIG. 12A and FIG. 12B. The value $D_{22}$ is a component of the flexural matrix and My is the moment that has to be applied to a flat sheet to produce the curvature $\kappa_y = 1/R$. A chart in FIG. 13 shows diagrammatically, the effect of applying bending moments at the end of the tape. Referring to FIG. 14, generally, likely, the tape or sheet flattens prior to buckling, creating the hinge in the tape or sheet. The tape or sheet is flattened by applying edge bending moments per unit length $M_{1x}$ and $M_{1y}$ such that $k_{1x} = k_{1y} = 0$. The stress $\sigma_{1x}$ in the tape or sheet is a result of the imposed change of curvature in the x direction and the stress $\sigma_{1y}$ is due to Poisson's ratio effects.

$$\sigma_{1y} = -(\nu E/1-\nu^2) z k_{0x}, \quad \sigma_{1x} = -(E/1-\nu^2) z k_{0x}$$

z is the distance from the mid-surface of the tape or sheet; E is Young's modulus and $\nu$ the Poisson's ratio of the material.

The tape or sheet elastically flattens when the cross-section cannot support the load on the tape or sheet. A thicker tape or sheet, or a smaller radius (i.e. deeper trough in the curvature/greater degree of arc) can increase the second moment of inertia, working to improve self-supporting extendibility by improving bending performance.

The hinge effect as it relates to the sweep angle of airplane wings is discussed in the application of residual stress tailoring of snap-through composites for variable sweep wings by Mattioni et al. in 47th AIAAJASME/ASCE/AHS/ASC Structures, Structural Dynamics, and Materials Conference 1-4 May 2006, Newport, R.I. and the "snap-bracelet" configuration of a coil wherein the transverse curvature in the extended configuration and longitudinal in the coiled configuration have equal signs is discussed in Bistable prestressed shell structures by Kebadze et al in the International Journal of Solids and Structures 41 (2004) 2801-2820, and both references are herein incorporated by reference.

The above described analysis is extended to self-supporting sheets and panels, wherein the value of the length and width of the self-supporting sheet or panel can be determined using the above methodology.

A non-limiting list of various types of articles (especially elongate articles) with which the present technology may be most advantageously practiced includes films, tapes, sheets, labels, liners, rolls of film and sheets, tear-apart sheets, rolls, films (e.g., with tear lines between segments) and the like. The only overriding desirability for the selection of an article with which to use the present technology is that when the article is supported in an extended position, it is subject to an amount of deflection, bending, curling, rotation, torqueing, collapse or other alteration from a desired position by the actions of gravity, air pressure, electrostatic charging, magnetic fields or any other force that alters the shape and alignment of the article with respect to itself. The concept of "with respect to itself" means that it is the structure of the article itself that changes, and not merely its external alignment.

Each material will have its own properties (strength, flexibility, Young's modulus, elasticity, brittleness, etc.) that will impact individual characteristics of deflection in response to external forces. In its simplest terms, where forces acting on an article cause more internal deflection than is desired for its intended use, the technology described herein should be used to reduce the amount of internal deflection that the article is undergoing in its intended use, and thus be self-supporting over a distance.

Figure 15A:
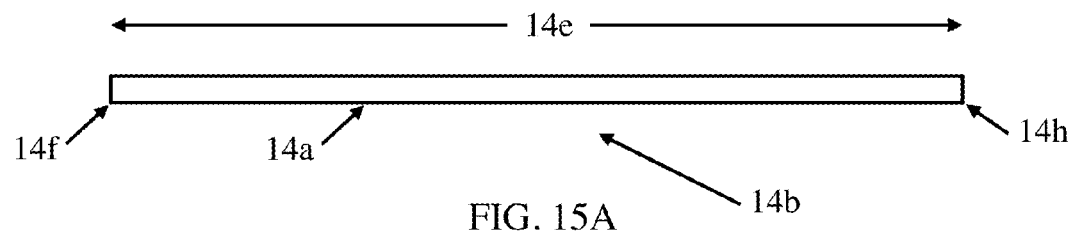
FIG. 15A shows a side view of an elongate composite material in theoretic extended position.
Figure 15B:
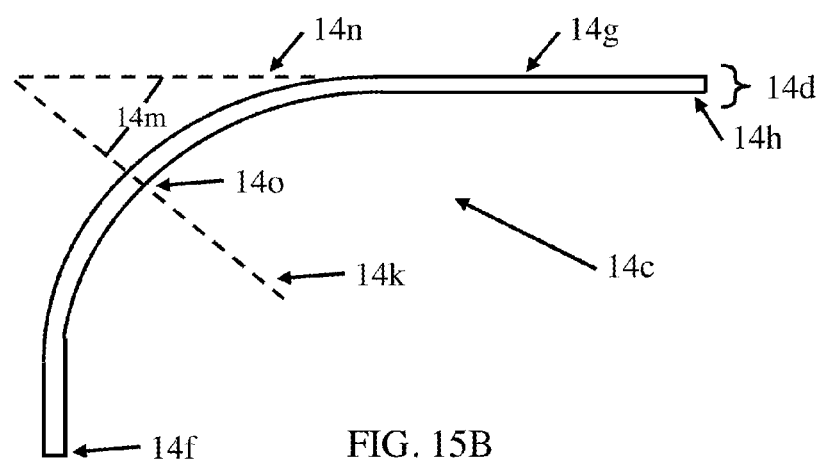
FIG. 15B shows a side view of the elongate composite material of FIG. 15A when exposed to external forces such as gravity and before impartation of a cross-web curl structure.
Figure 15C:
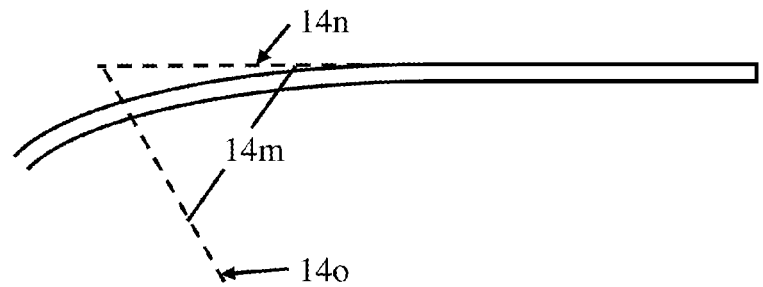
FIG. 15C shows a view along the length of the elongate composite material of FIG. 14A when stabilized against collapsing, bending, curling and the like by practice of the technology of the present application.

Consideration of FIGS. 15A, 15B, and 15C will assist in an understanding of the technology. FIG. 15A shows a side view of an elongate material 14a in a vacuum and subject to no external forces in a theoretic extended position 14b. FIG. 15B shows a side view of an elongate material in real extended position 14c. The material 14a has a thickness 14d. The thickness 14d and the degree of effects of forces on the internal structure and internal deflection of the material 14a are somewhat material dependent and force dependent, but all materials, if properly dimensioned, will be subject to deflective forces and likely will deflect to some degree.

Again referring to FIG. 15A and FIG. 15B, a first description will relate to the effects of forces on a film or sheet material 14a. The sheet material depicted in FIG. 15A in a perfect state (in a vacuum, freer of gravitation and in an otherwise force-free environment) would have a perfectly linear appearance as in 14e, unless constructed to have a different shape.

As depicted in FIG. 15B, material 14g shows the impact of an intermediate strength perpendicular force (e.g., gravity) against the sheet material. End 14h is supported, with an original orientation, as depicted in FIG. 15A, of the sheet material 14a in a position parallel to the ground. Upon being subject to the perpendicular downward force as depicted in FIG. 15B, the unsupported end 14f moves down and the sheet material deflects or bends in the shape of a curve. The degree of bending can be estimated by the radius of a solid surface to which the resultant curve can conform. For example, with very slight deformation (slight curvature) the sheet material could conform to a larger radius solid surface, such as a solid surface with a 100m radius. This would be a very slight observable curvature, but the measurement clearly defines the degree of curvature to one skilled in the art. The greater the force and/or the less internal strength of the sheet material, the greater the amount of curving and the smaller is a radius of a solid surface to which the sheet material would conform, and the less the ability of the material to be self-supporting. For example, with an intermediate force, the conforming solid surface diameter (CSSD) could be 3-10 meters. Stronger forces and/or lesser internal strength could produce CSSD for the sheet material in ranges of 1-3 m, 0.20-1 m, and even cause inelastic deformation and permanent bending in the sheet material. The curvature may be measured as points intermediate the length of the sheet material, as ends of the sheet material will tend to retain as much linearity as possible. Measurement of the curvature (CSSD) at the middle of the bend of sheet materials (e.g., See FIG. 15B, 14k), extending outward 5-10% (e.g., 5-10 mm, 10-20 mm, etc.) of the effective length of the sheet material can give a reasonable estimate of the degree of bending and the resistance to bending of the sheet material.

The addition of the stabilizing effects through the shrinking of the shrink film in the composite should be able to change the CSSD of a film or sheet material by increasing the CSSD by at least 5% and preferably at least 10% under the same force conditions as measurement of the untreated material. An angle 14m between the normal position 14n of an unforced element and the perpendicular center or curvature line 14o is another basis for measuring deflection. One measure of a degree of improvement in performance is a degree of reduced curvature (bending) as measured by an increase in angle 14m between a sheet or film without the imparted arc structure and a stabilized sheet or film having an imparted arc or structure. Looking at FIG. 15C, it can be seen that the greater the angle 14m, the less deformation that appears in the sheet or film.

A measure of a degree of improvement according to practices of the present technology can be alternatively described in terms of the increase in angle 14m. The increase may be measured in relative terms (percentages) or in terms of absolute degrees of increase in angle 14m. For example, a sheet or film without the imparted arc may have an angle 14m of Y° and improved stability by impartation of an arc structure may be measured as increases in angle 14m of, for example, at least 5%, at least 10%, at least 15%, at least 20 or at least 25%, or at least 4°, at least 5°, at least 8°, at least 10°, at least 15°, at least 20, and the like.

Figure 15D:
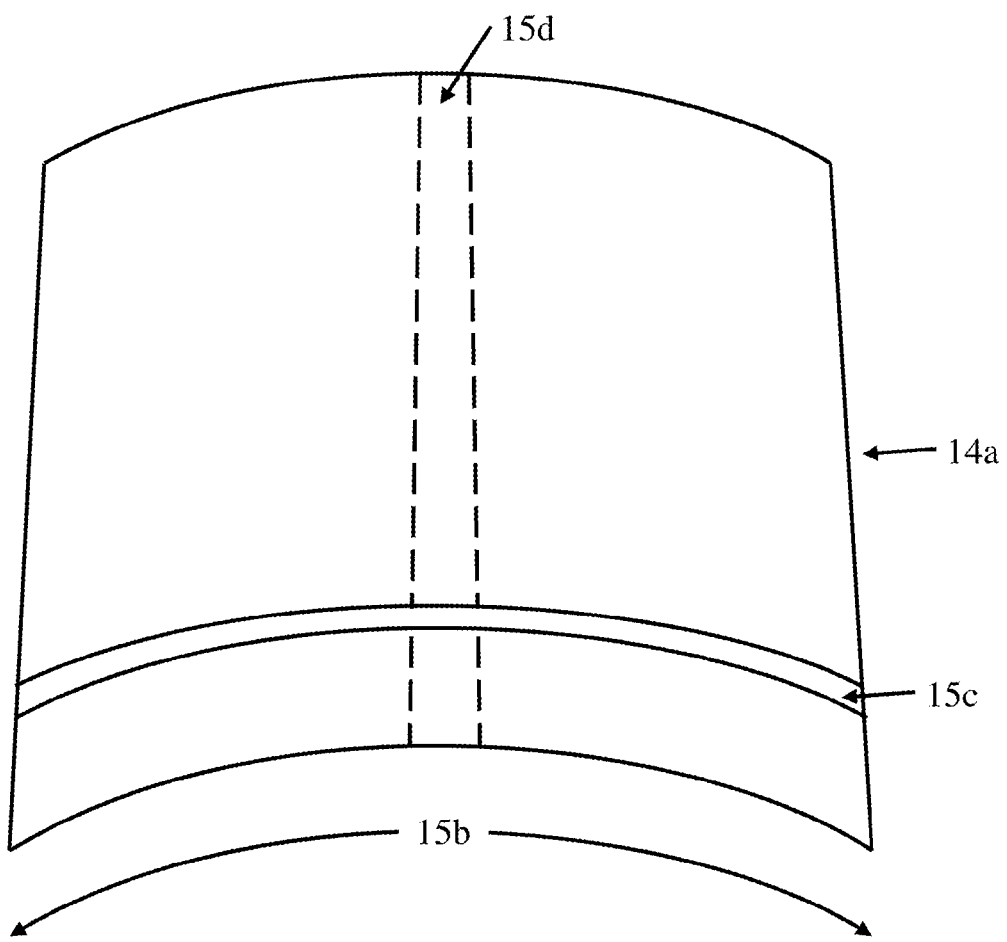
FIG. 15D is the lengthwise perspective view of an arched elongate, flexible composite material.
Figure 16A:
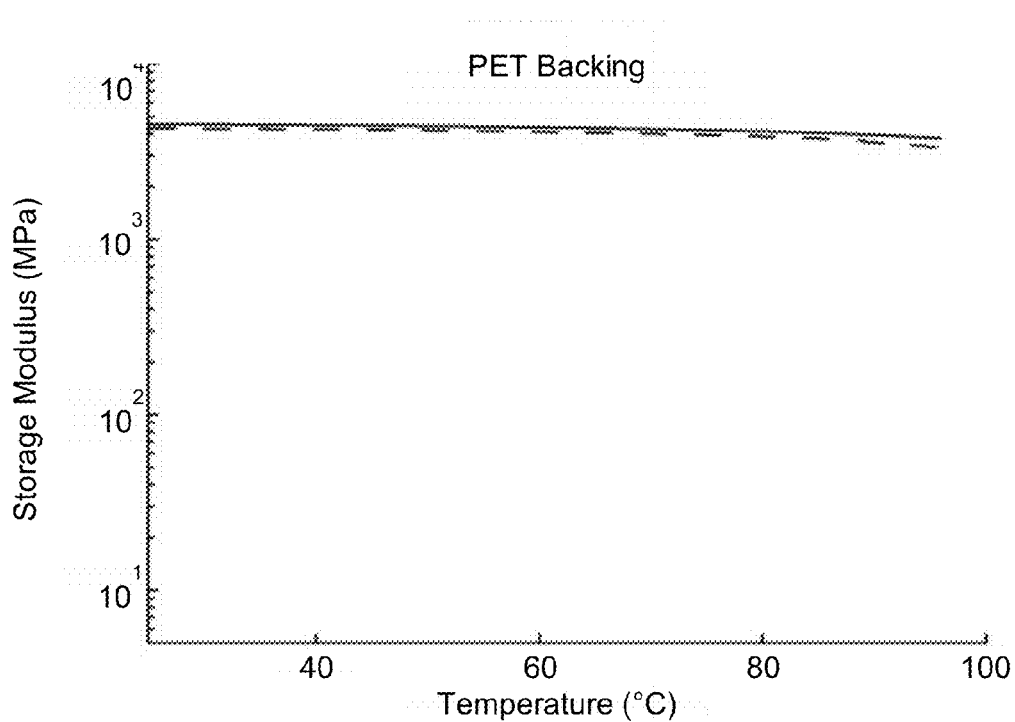
FIG. 16 shows the decrease in storage modulus over increasing temperature for PET backing (FIG. 16A), PETG shrink film (FIG. 16B), polyolefin shrink film (FIG. 16D), and PVC shrink film (FIG. 16C).
Figure 16B:
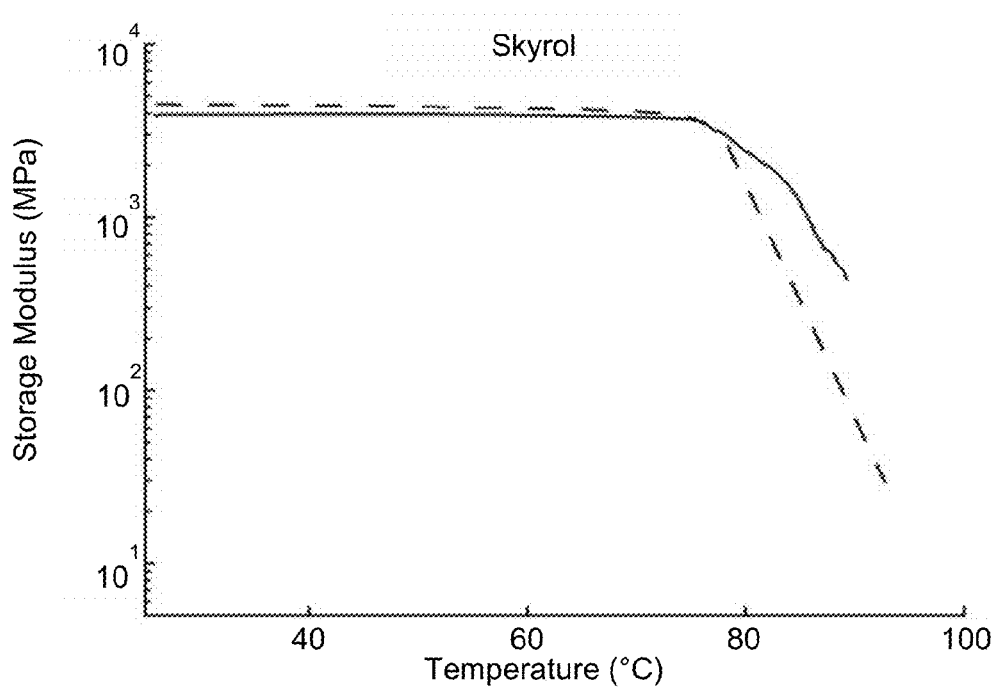
Figure 16C:
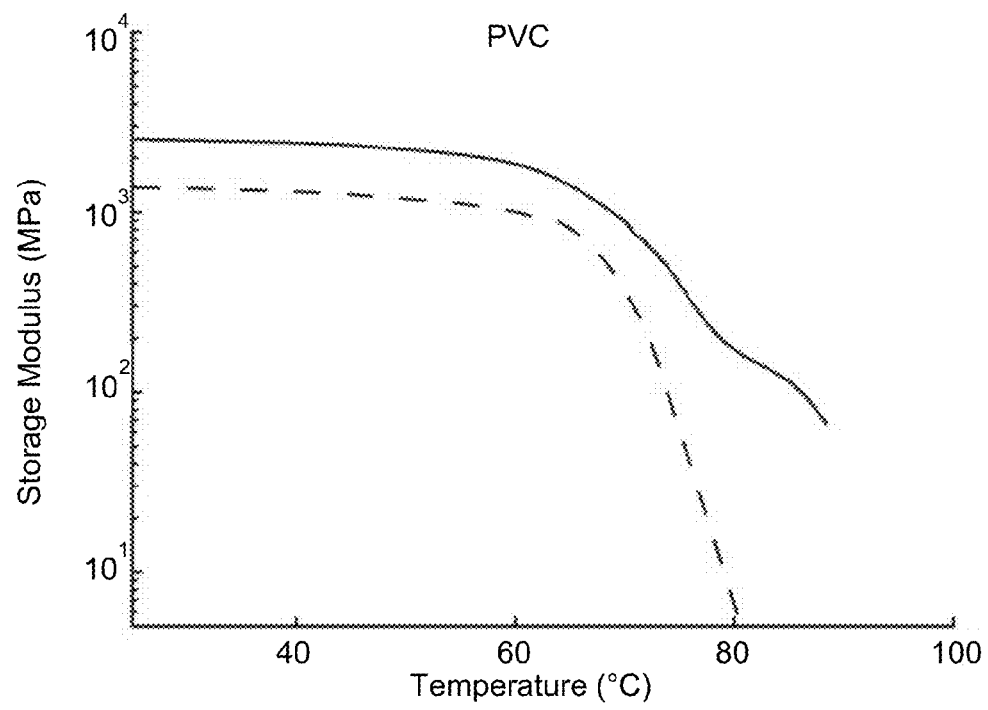
Figure 16D:
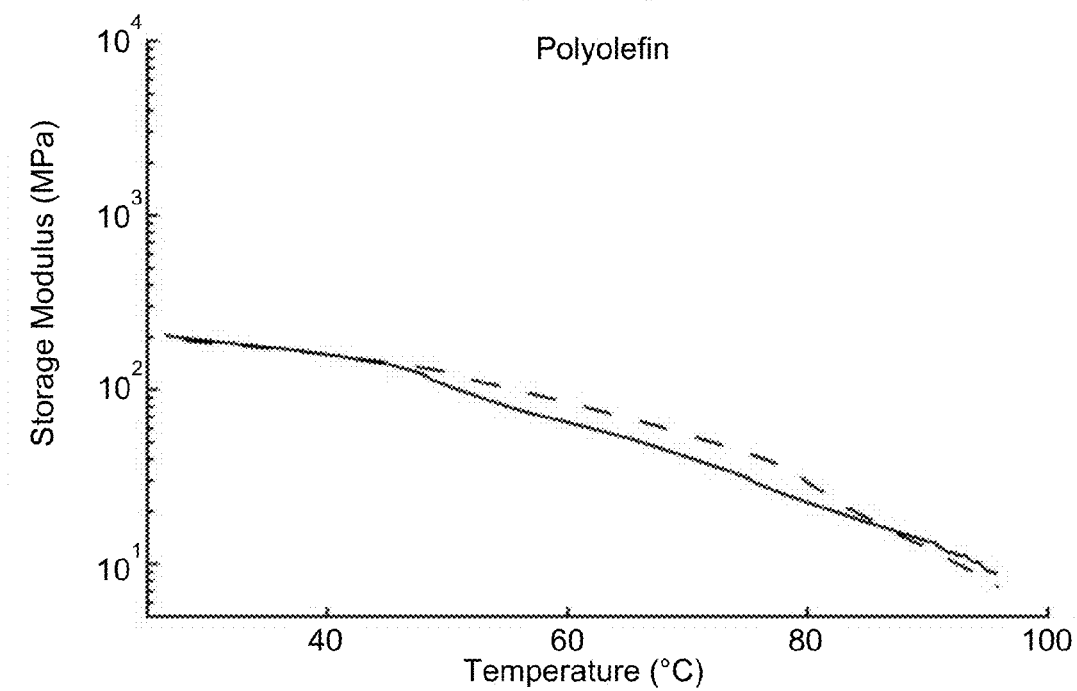

Similarly with respect to stabilizing films or sheets by adding longitudinal width arching structure as shown in FIG. 15D, by decreasing the CSSD of the arch 15b, the material 14 is stabilized against longitudinal bending. Again, the degree of change imposed to effect deformation reduction can be measured in absolute or relative changes in CSSD or the angle of deformation 14m in a manner similar to that used in FIG. 15B.

FIG. 15C shows a side view of the elongate material of FIG. 15A when stabilized against collapsing, bending, curling and the like by imparting a curvature to the disclosed composites herein. As can be seen, the CSSD has been significantly increased (the conforming radius or Diameter has increased in size) and the curvature (or bending) reduced. The reduction in curvature (bending) can have been effected by any of the strengthening means discussed herein, but is shown with an elongate element 14a (strip or sheet) lengthwise on the material.

FIG. 15D shows a view along the length of the elongate material of FIG. 15A when stabilized against collapsing, bending, curling and the like by practice of the technology of the present application. By adding more cross-web curl structure (i.e., an increase in the degree of arc) to the cross section of the material, an internal structural arch 15b is built into the film so that the material resists bending in a line perpendicular to the arc. As shown in FIG. 15D, in one embodiment, a composite material comprising a backing material as previously described herein has a longitudinal reinforcing/stabilizing segment 15d comprised from a shrink film is provided herein. The shrink film forming the reinforcing/stabilizing segment 15d is narrower in width than the backing it is laminated to. The shrink film, upon activation, shrinks to form the longitudinal reinforcing/stabilizing segment, creating a cross-web curl arc across the width of the composite, and allowing the composite material to self-extend and resist buckling as described above.

As further shown in FIG. 15D, in one embodiment, a composite material comprising a backing material as previously described herein has a discontinuous stabilizing segment 15c is also provided, the discontinuous stabilizing segments being formed with the shrink films described herein. The shrink film, upon activation, shrinks to form the discontinuous stabilizing segments, creating a cross-web curl arc across the width of the composite, and allowing the composite material to self-extend and resist buckling as described above. One or more discontinuous segments may be provided.

In one aspect, a method of reducing deformation of an article during manufacture is provided by importing composite materials having an imparted cross-web curl structure as a support material to protect articles during, for example, webbing process manufacturing. For example, the composites described herein can be used as a support structure for or backing to separate processed materials during their manufacture. In one embodiment, a method of reducing deformation in an article during manufacture is provided comprising identifying deformation in the article during the process from forces that cannot be removed from an environment in which the process is performed; attaching a removable (or permanent) stabilizing layer to the article such that the removable (or permanent) stabilizing layer provides stabilization against deformation caused by the forces during the process; performing the process with the article while the stabilizing layer is attached to the article; and after completion of the process, if necessary or desirable, removing the stabilizing layer, wherein the stabilizing layer is comprised of a composite material comprising a backing and a shrink film, and having an imparted cross-web curl structure.

In an alternative embodiment, the composites materials described herein can be used as nasal dilators. The use of materials with imparted curvatures as nasal dilators is described in U.S. Patent Publication 2012/0004683, incorporated herewith. The imparted curled structure contained within the composite material imparts a resiliency into the composite that provides it with return memory properties, when placed on a user's nose, towards curled shape, creating uplifting force on the nostrils during use. In certain embodiments, the composite nasal dilator may include: a composite base element comprising a composite comprised of a backing, for example a polyester backing such as a PET backing as previously described herein, and a polyester heat activated shrink film, for example a PET shrink film such as a PETG shrink film described previously herein, the composite base element having an outer surface and an inner surface; the inner surface having a skin-compatible or hypoallergenic or non-irritating adhering material, which can be a pressure sensitive material, thereon; wherein the composite base element has a spring element that provides tension, elastic memory and/or stiffness to the base element when the base element is transitioned from a planar to a non-planar state during use; and wherein the spring element is formed through the interaction of the backing and polyester heat activated shrink film when the shrink film in the base element is induced by heat activation of the shrink film, the spring element imparting resiliency into the base element and providing the base element with return memory properties towards a planar conformation during use.

In regard to the composites described herein useful as nasal dilators, the spring element of the base element is induced by activating the shrink film through exposure to heat, creating two distinct regions within the base element, the non-shrunk polyester backing and the shrunk polyester heat shrink film, whose interaction induces a spring element. Activation of the shrink film acts to create a tension or stiffness at the interface of the shrink film and backing material within the base element due to the shrinking of the shrink film, resulting in the base element having an elastic memory when the base element is placed upon the user's nose. When the backing and shrink film used to create the spring element within the nasal dilator have differential shrink properties, the application of thermal energy (by conductive or convective heating, IR radiation, and the like) will cause the two materials to shrink at different rates. Particularly when there is a persistent or permanent change caused by shrinkage, the differential in dimensions caused by shrinkage causes the combined layers to develop an imparted curvature in the shape of an arc, with the "shorter" or greater shrinking component being on the concave side of the arc and the "longer" or less shrinking component being on the convex side of the arc. The changes in the properties of the two components may also act by the "longer" component on the exterior or convex side shrinking (thereby reducing differences and flattening the composite) or by the "shorter" component on the interior or concave side expanding (thereby reducing differences and flattening the composite). The imparted curvature can be created along the longitudinal length or, if desired, width of the nasal dilator, or both. It is preferred that the thermal treatment create a permanent memory of the dimensional change as by heat shrinkage of the polyester shrink film. The extent or degree of arc or curl can be controlled so that the appropriate tension, elastic memory and/or stiffness are imparted to the base element when the base element is transitioned from a planar to a non-planar state during use.

There are various methodologies of forming these composite nasal dilators, which may include steps such as: a) creating a composite base element having an outer surface and an inner surface, wherein the composite base material is comprised of a composite comprising a backing and a polyester shrink film; and b) inducing a spring element in the base element through the interaction of the backing and polyester shrink film upon exposure to a temperature sufficient to activate the shrink film. In one embodiment, the induction of the spring element results in the deformation of the base element from a linear shape so that the base element also deforms from a planar shape. In certain embodiments, the change in shape may cause controlled differential bending along the spring element resulting in the inner surface of the base element changing to a concave shape that will secure itself to the nose of the wearer by the adhesive, with controlled uplifting spring force provided during use.

In certain embodiments, the change in shape may cause the base element to create tension in a direction opposite its position during use, creating control uplifting spring force on the nostrils during use. In certain embodiments, the change in shape may result in the development of a curvature along the longitudinal width of the nasal dilator, creating uplifting spring force during use.

Figure 23:
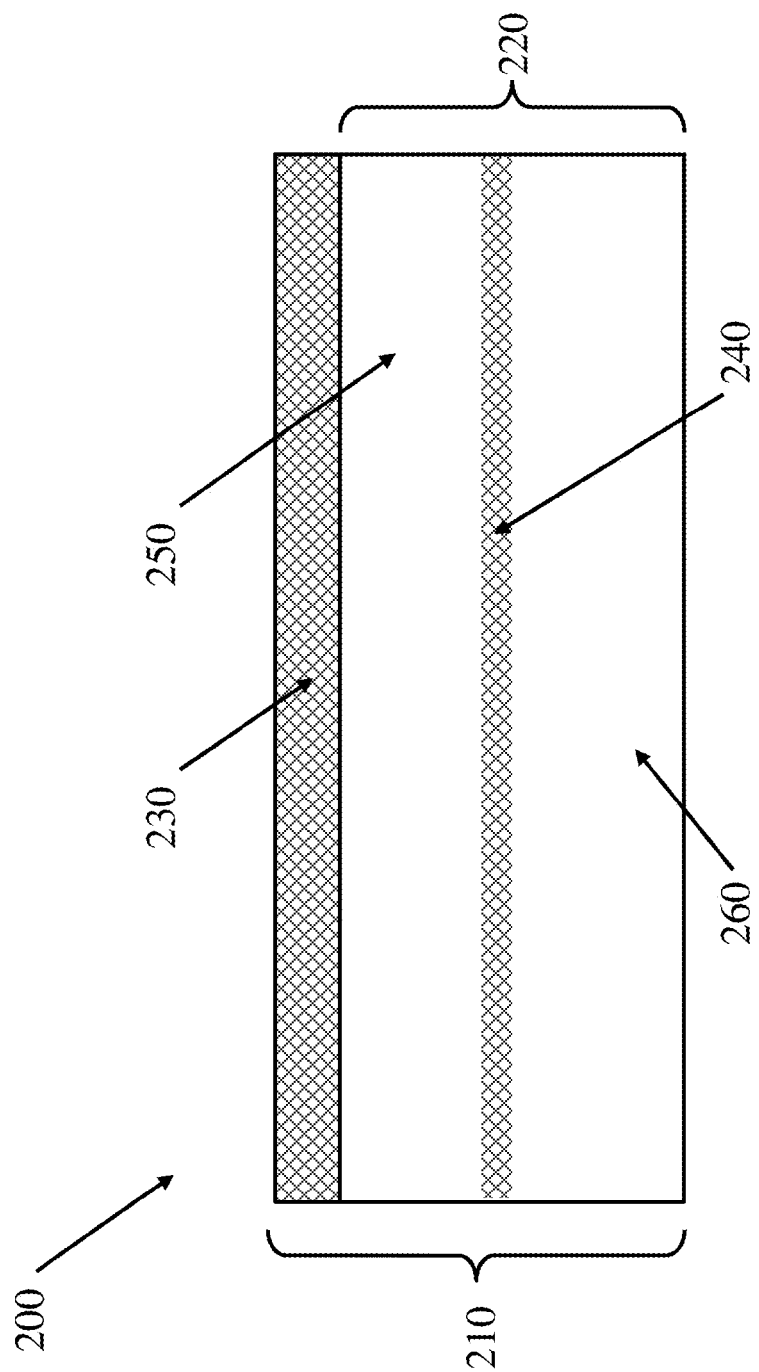
FIG. 23 shows an exemplary embodiment of a nasal dilator.

Referring now to FIG. 23, a cross-section of exemplary composite nasal dilators is illustrated therein, the nasal dilator being generally referred to by reference numeral 200. The nasal dilator 200 comprises a base layer 210 comprised of a base element 220 and an adhesive layer 230, the adhesive layer 230 being disposed on the side of the base element 220 that is to be adhered to the user's nose. The base element 220 is comprised of a composite comprising a backing 250 and a polyester shrink film 260, wherein the interaction of the differing materials or regions imparts at least one spring element 240 that provides the base element with return memory properties towards a planar conformation. Upon exposure to heat, the shrinkage of the shrink film 260 creates tension between it and the backing 250 within or across the base element 220, imparting a resiliency on the base element 220. The backing 250 and the shrink film 240 can be laminated using the laminating adhesives described herein, including an acrylic, such as a solution or solventless acrylic, an epoxy, a two-component polyurethane, a water-based polyurethane dispersion with epoxy cross-linker, a water-based hybrid polyurethane dispersion/acrylic emulsion with epoxy cross-linker, a water-based polyurethane dispersion, a solvent-based polyester with isocyanate cross-linker "F", or a solvent-based polyester with isocyanate "A". The nasal dilator further includes a pressure sensitive adhesive 230 disposed on the inner surface of the base element 220. The pressure sensitive adhesive 230 adheres the nasal dilator 200 to the user's nose. The pressure sensitive adhesive may include any releasable adhesive or releasable tenacious components to affect pressure-sensitivity. Pressure sensitive adhesives suitable for nasal dilators are well known and include water-based pressure-sensitive adhesives, such as acrylate adhesives, thermoplastics "hot melt" adhesives, two-sided adhesive tape, urethane adhesives, porous acrylic co-polymer adhesives, elastomer-based adhesives, natural and synthetic rubber adhesives, and acrylic adhesives, and medical grade adhesives. Examples include polyacrylate adhesive, and polyvinylethyl ether blend adhesives. In certain embodiments, the change in shape may cause the base element 220 to develop a curvature along the longitudinal width of the nasal dilator, creating uplifting spring force during use.

In one aspect, composite materials described herein comprising a backing and a shrink film and having an imparted cross-web curl structure can also be used to form bags that are capable of standing up or staying open without the use of gussets. Such gussetless bags can take the form of cylindrical tubular containers capable of standing up length wise, and may be useful for the storage and packaging of, for example, foods such as snack foods like potato chips. For example, the opposing axial length sides of composite materials having a backing laminated to a shrink film and having an axial length and a longitudinal width with an imparted curvature in the shape of an arc across the longitudinal width can be joined to form a cylindrical tube. The cylindrical tube can then be sealed on one end (or alternatively adhered to an apparatus that serves as the bottom) to form a bag that can be filled with a desired material, such as food, and subsequently sealed at the opposing end. The joining of the opposing axial side lengths and sealing of the opposing ends can be accomplished by any standard means known in the art, including using a laminating adhesive as described herein. Because of the increased rigidity of the cross-web curl structured composites, thinner films can be used in the packaging of such articles while maintaining the benefits of thicker and gusseted bags.

The composite materials described herein, their manufacture, and use will be further understood by reference to the following non-limiting examples.

EXAMPLES

The characteristics of various composite materials comprised of different combinations of a backing, an adhesive, and a dimensionally alterable film such as a shrink film that shrinks when exposed to sufficient heat were examined. The composites should desirably impart cross-web curl structures to the composite material when exposed to heat due to the performance of the heat shrink film, and the backing material and shrink film of the composite should optimally not exhibit unacceptable delamination within the parameters of target use. Characteristics examined included the ability of the composite to resist delamination between the backing material and shrink film of the composite and the ability of the shrink film, upon heating, to impart sufficient curvature to the composite material and a cross-web curled structure exhibiting a longitudinal extendibility or rigidity as a result of the backing material cooperating with or interacting with the shrink film in the composite material, resulting in a structure that is self-supporting across a significant length such as up to 36 inches or more.

Example 1

Different backing materials, shrink films, and adhesives were selected and characterized in order to identify combinations that provided desirable properties, such as ability to maintain permanent cross-web curl structure, maintain flexibility, provide a clear or transparent composite, and resist delamination between the backing material and shrink film (i.e., preferable peel strength).

A. Film Characterization.

1. Surface Characterization: To determine contact angle and surface energy of the films under both neat and washed conditions, selected films were washed in isopropanol and dried before measurement via ASTM D-5946 with a Ramé-hart Model 250 goniometer. The results of the pre-treated surface energy of the selected materials are summarized in Table 1. PET backing and PET HS had highest surface energies, which made them favorable candidates for further characterization.

TABLE 1

Contact Angle and Surface Energy Characterization.

| Material-As Produced | Contact Angle (°) | Surface Energy (Dyne/cm) |
|---|---|---|
| PET Backing (McMaster #8567K12 (.001")) | 69.0 ± 1.26 | 40 |
| PETG HS (SKC-Skyrol ® SP19H 160 g) | 36.2 ± 1.62 | >46 |
| Polyolefin (PE) HS (McMaster Polyolefin HS Film 75 g #19435T2) | 87.5 ± 1.15 | 33 |
| PVC HS (Uline Centerfold 75 gauge #S-7755) | 94.1 ± 0.98 | 31 |

Each of the materials above were then treated with an isopropanol wash to determine if such wash improved the surface energy characteristics of the materials. Cleaning with isopropanol lowered the surface energy of PET in this test, but increased it for PE and PVC by removing excess particles. The results of the treated surface energy of the selected materials are summarized in Table 2.

TABLE 2

Contact Angle and Surface Energy Characterization Following Isopropanol Wash.

| Material-Isopropanol Wash | Contact Angle (°) | Surface Energy (Dyne/cm) |
|---|---|---|
| PET Backing (McMaster #8567K12 (.001")) | 76.9 ± 2.37 | 38 |
| PETG HS (SKC-Skyrol ® SP19H 160 g) | 72.5 ± 2.02 | 39 |
| Polyolefin (PE) HS (McMaster Polyolefin HS Film 75 g #19435T2) | 79.2 ± 2.89 | 37 |
| PVC HS (ULine Centerfold 75 gauge #S-7755) | 88.8 ± 0.87 | 33 |

2. Dynamic Mechanical Analysis: To determine mechanical properties as a function of temperature and strain recovery as a function of temperature, selected films were heated from 25 C to 100° C. at 5° C./min at 0.1% strain to determine modulus as a function of temperature on a TA Q800 machine. The decrease in storage modulus over increasing temperature for the PET backing, PETG shrink film, PVC shrink film, and polyolefin shrink film, are shown in FIGS. 16A, 16B, 16C, and 16D, respectively.

Based on the data derived during the dynamic mechanical analysis, the modulus onset temperature for each film was determined. The PET backing, PETG heat shrink film, and PVC heat shrink film maintained moduli above 1 GPa until their transition temperature. The polyolefin shrink film material gradually decreased from 200 MPa to 10 MPa, favoring a broad transition range. The results for the heat shrink films are summarized in Table 3.

TABLE 3

Modulus Onset Temperature Determination.

| Material | Modulus Onset Transition Temp (° C.) |
|---|---|
| PETG HS (SKC-Skyrol ® SP19H 160 g) | 75.7 ± 0.89 |
| Polyolefin (PE) HS (McMaster Polyolefin HS Film 75 g #19435T2) | 48.5 ± 2.70 |
| PVC HS (ULine Centerfold 75 gauge #S-7755) | 62.7 ± 3.10 |

Figure 17A:
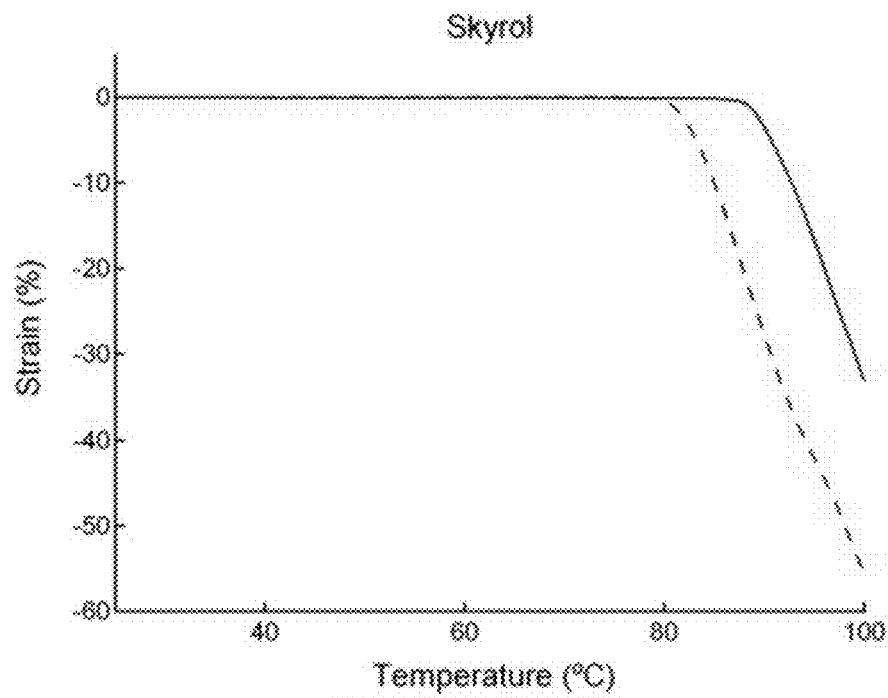
FIG. 17 shows the strain recovery over the defined temperature range for PETG shrink film (Skyrol®) (FIG. 17A), polyolefin shrink film (FIG. 17C), and PVC shrink film (FIG. 17B).
Figure 17B:
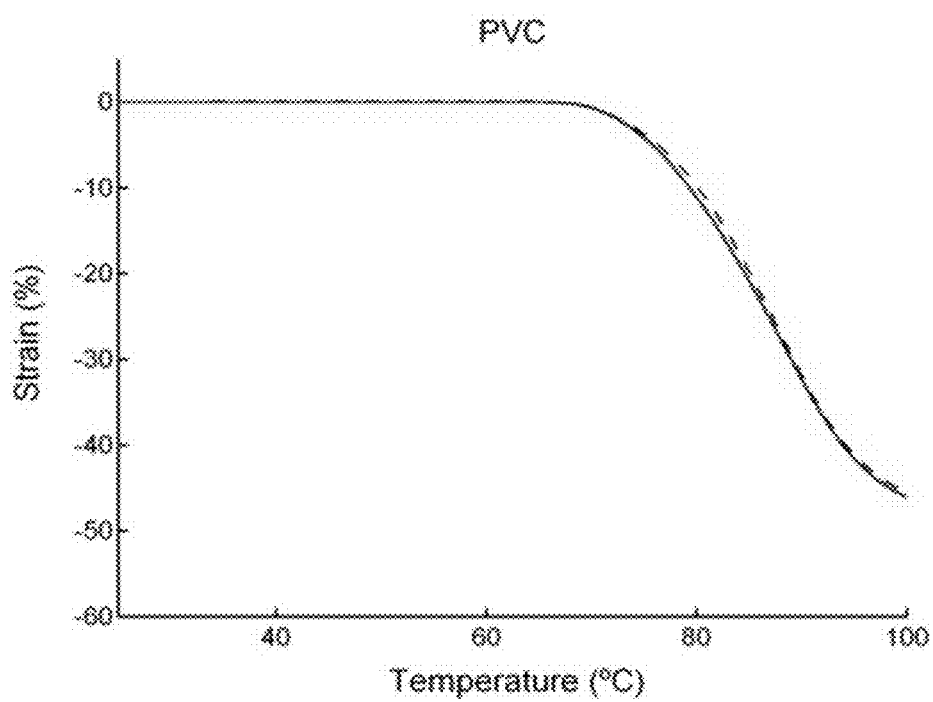
Figure 17C:
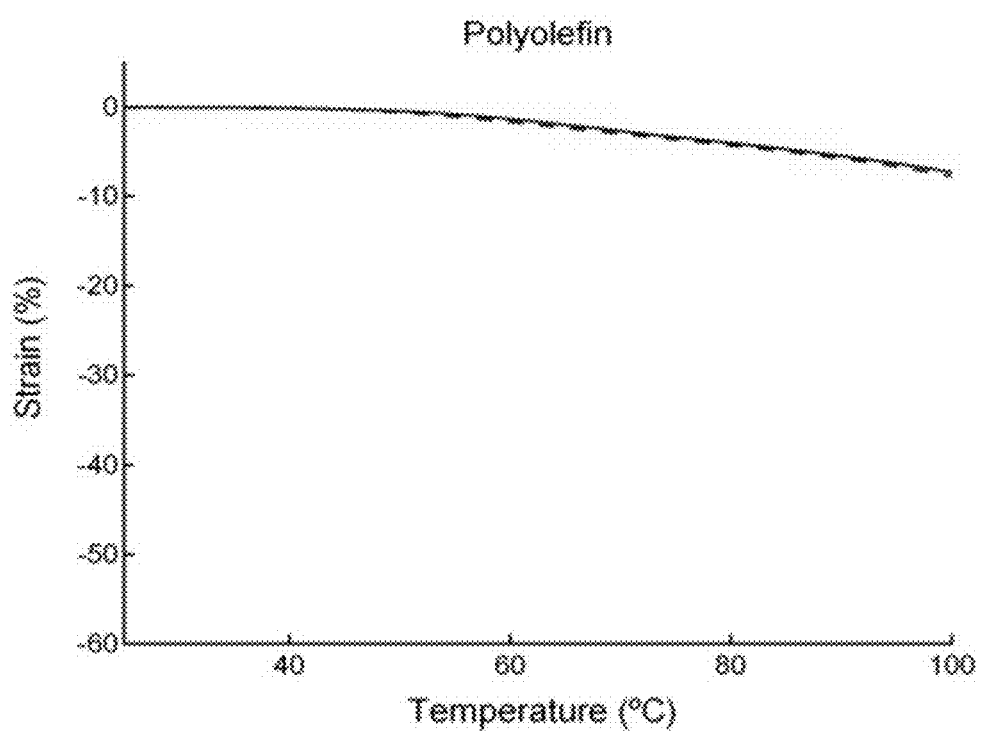
Figure 18A:
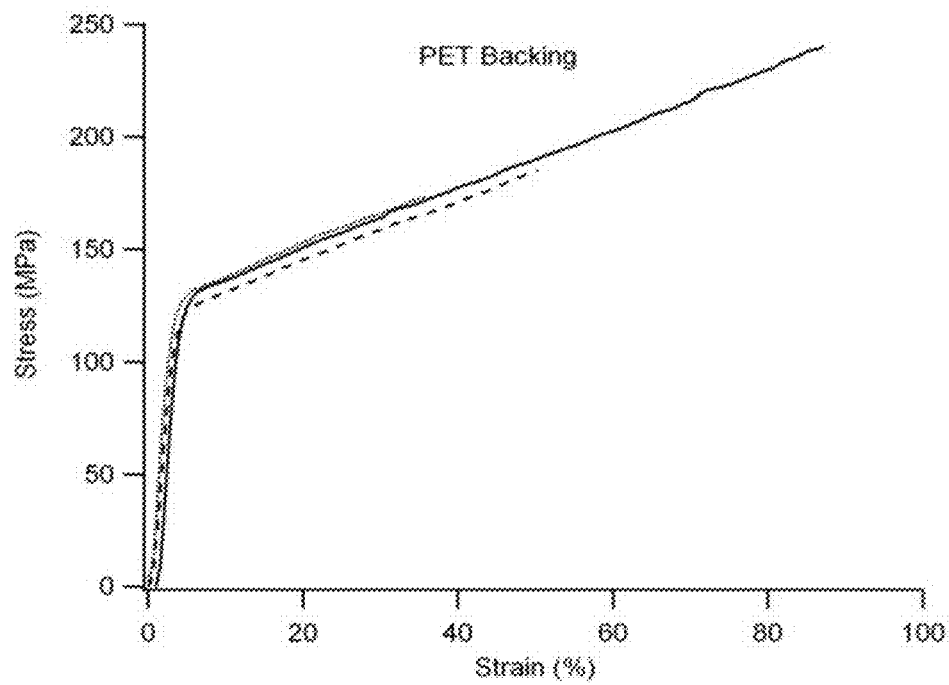
FIG. 18 shows the results of the tensile strength of PET backing (FIG. 18A), PETG shrink film (FIG. 18B), polyolefin shrink film (FIG. 18C), and PVC shrink film (FIG. 18D).
Figure 18B:
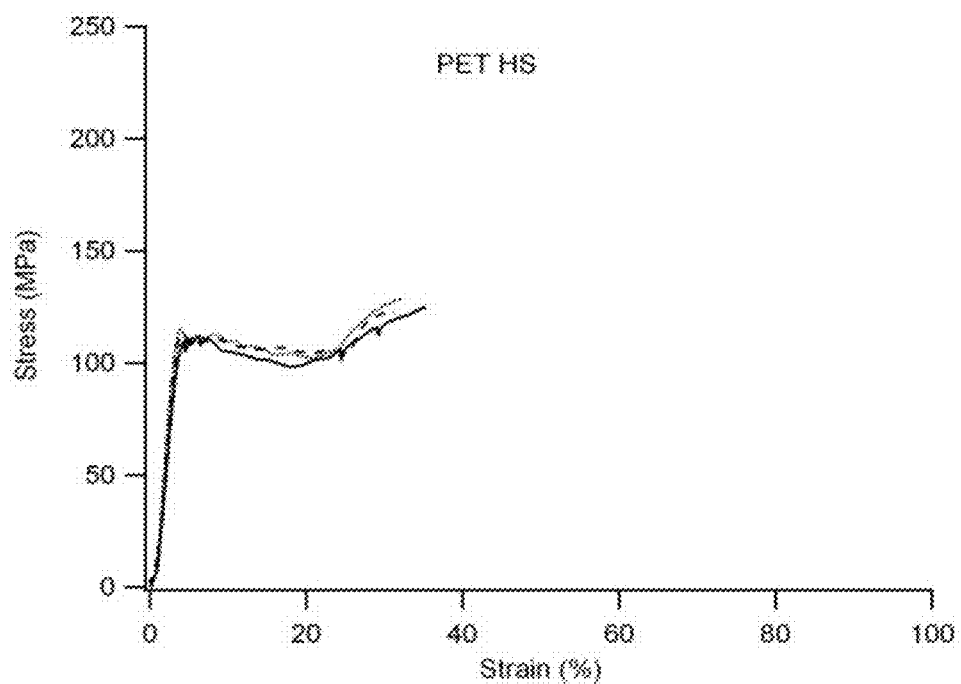
Figure 18C:
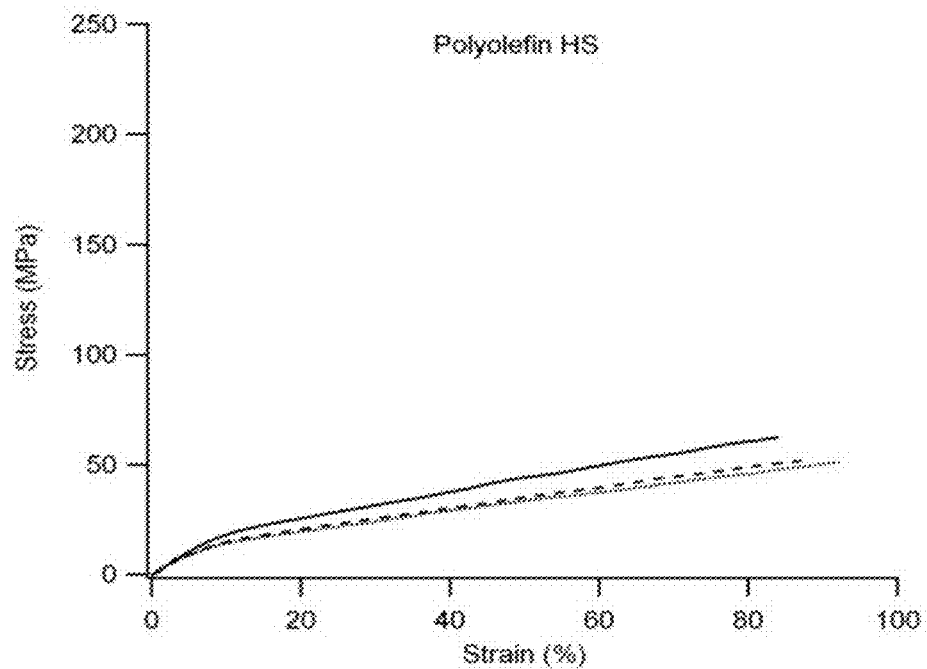
Figure 18D:
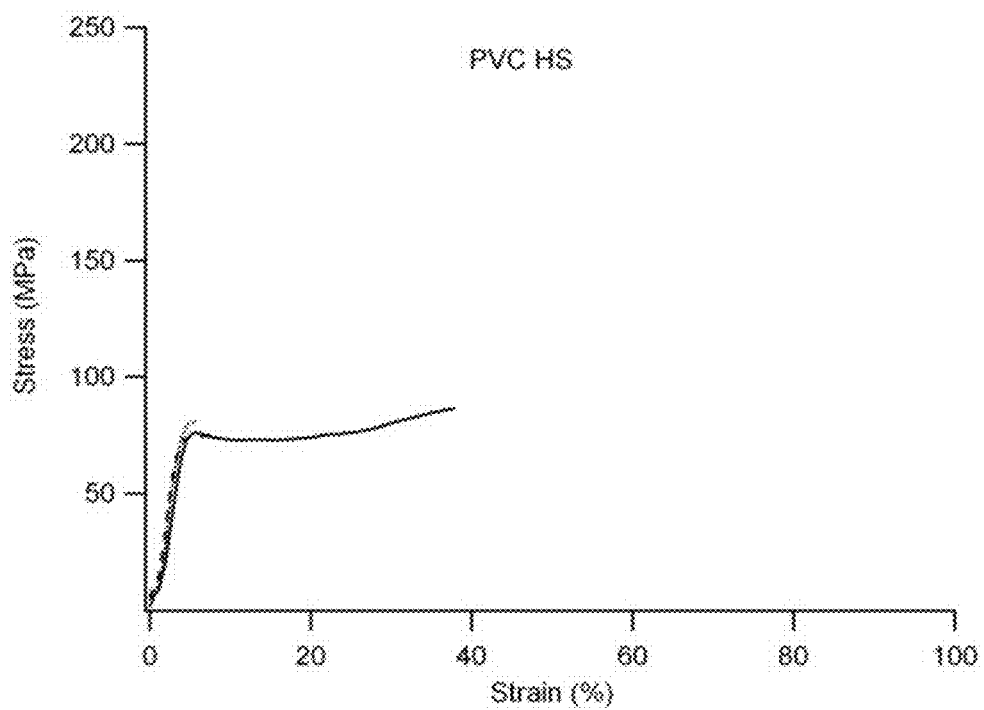

To determine the free strain recovery of the heat shrink films, the films were heated from 25 C to 100° C. at 5° C./min at constant 0.01 N to determine strain recovery as a function of temperature. The strain recovery over the defined temperature range for the PETG heat shrink film, PVC heat shrink film, and polyolefin heat shrink film is shown in FIGS. 17A, 17B, and 17C, respectively. The heat shrink films contracted 10-50% of their length over a range of temperatures from 51-85° C. The strain onset transition temperature for these shrink films is summarized in Table 4.

TABLE 4

Strain Onset Transition Temperature of Select Heat Shrink Films.

| Material | Strain Onset Transition Temp (° C.) |
|---|---|
| PETG HS (SKC-Skyrol ® SP19H 160 g) | 85.24 ± 4.75 |
| Polyolefin (PE) HS (McMaster Polyolefin HS Film 75 g #19435T2) | 51.17 ± 2.20 |
| PVC HS (ULine Centerfold 75 gauge #S-7755) | 72.39 ± 0.51 |

3. Mechanical Testing: The tensile strength of the PET backing and selected heat shrink materials was tested on rectangular specimens according to ASTM D882 with 100 mm×25 mm specimens at 50 mm/min. The results of the tensile strength of the PET backing, PETG heat shrink film, polyolefin heat shrink film, and PVC heat shrink film are shown in FIGS. 18A, 18B, 18C, and 18D, respectively. The PET based films were the strongest, while the polyolefin shrink film was the weakest, but had high strain capacity.

B. Adhesive Characterization

1. Dynamic Mechanical Analysis

Figure 19A:
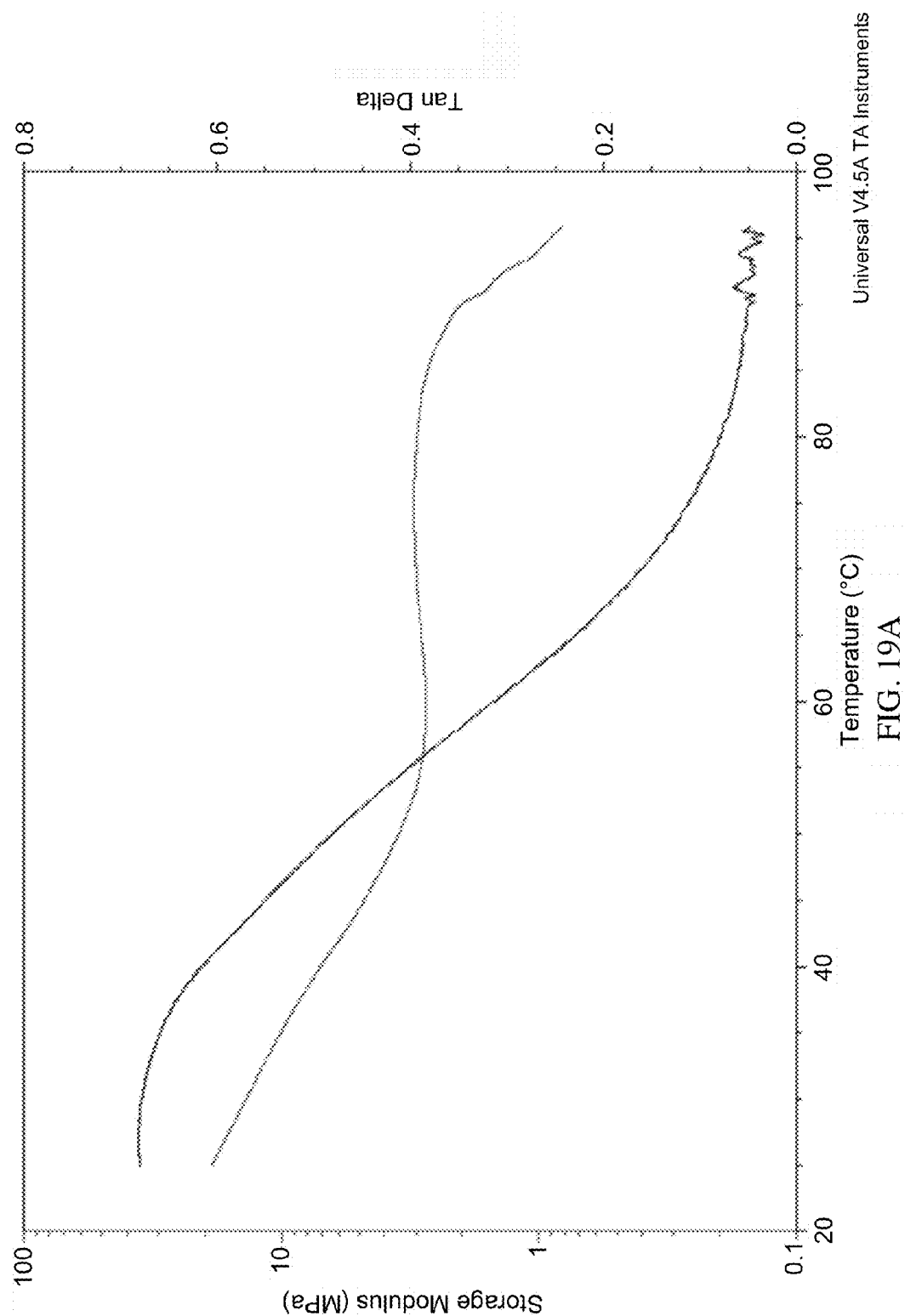
FIG. 19 shows the thermo-mechanical properties of three commercially available adhesives, Bondit® B-45$^{TH}$ (FIG. 19A), Loctite® 3034™ (FIG. 19B), and 3M DP-8005™ (FIG. 19C).
Figure 19B:
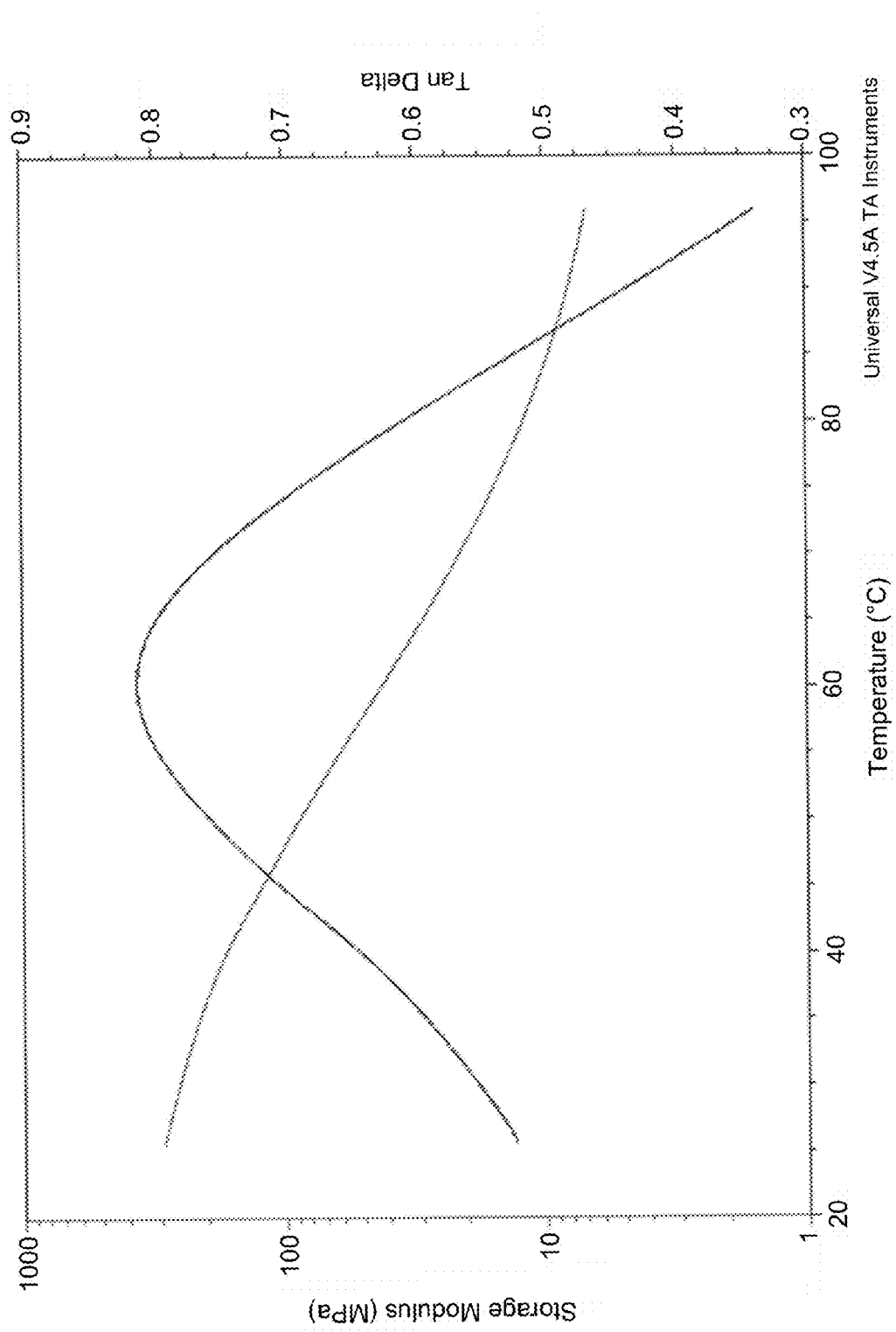
Figure 19C:
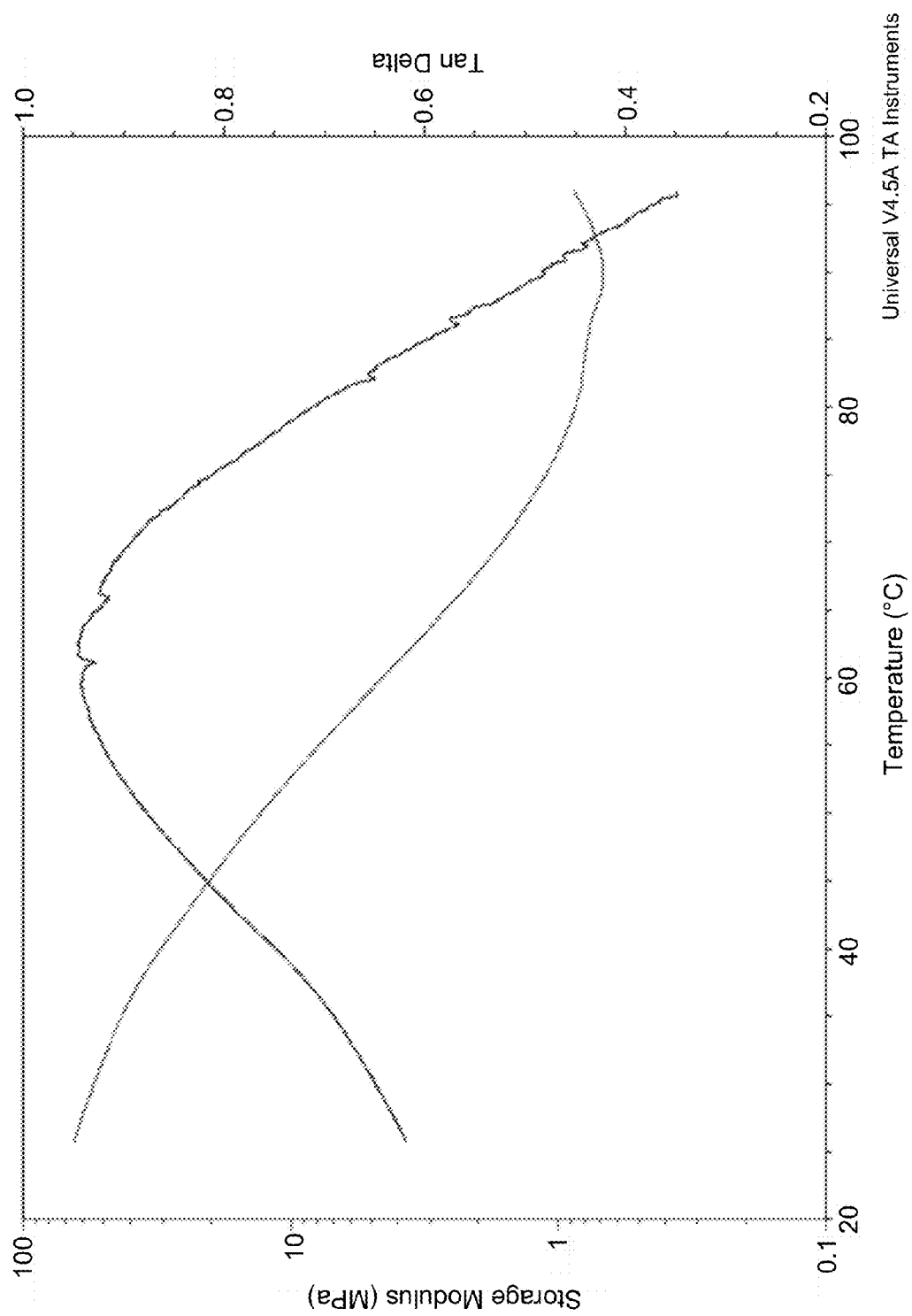

The thermo-mechanical properties of three commercially available adhesives, Loctite® 3034™, Bondit® B-45TH, and 3M DP-8005™, were examined via dynamic mechanical analysis following the procedures as mentioned previously. The results for Bondit® B-45 are shown in FIG. 19A. The results for Loctite® 3034™ are shown in FIG. 19B. The results for 3M DP-8005™ are shown in FIG. 19C. The Bondit® B-45 is the most flexible at ambient conditions, while the 3M DP-8005 and Loctite have higher stiffness and do not have flexibility until high temperatures.

2. T-Peel Test

In order to determine the relative peel resistance of the adhesive bond strength of the adhesive with different backing materials and shrink films individually, the peel resistance of the various adhesives (T-Peel Test) applied to the materials was examined based on ASTM 1876-08. The results are summarized in Table 5. Peel strength is expressed in terms of load in Newtons normalized by the width in meters, and can be converted to ounces per inch using the following conversion: 1 N/m=0.09136 oz./in., where 1 N=3.5969 oz., and 1 m=39.3701 in.

The PET backing and PETG heat shrink composites performed well in peel tests. The BOPP backing (Griff Paper and Film) and PVC heat shrink performed moderately, but tore more often. The epoxy resin Bondit® B-45TH was preferable in these peel tests.

TABLE 5

Bond Strength of Various Backing, Heat Shrink, and Adhesive Combinations.

| Adhesive | Material | Avg. Str. N/M | St. Dev. |
|---|---|---|---|
| Bondit ® B-45TH | PET Backing (McMaster #8567K104 (.0005")) | 166.97 | 12.59 |
| Bondit ® B-45TH | Isopropanol-treated PET Backing (McMaster #8567K104 (.0005")) | * | * |
| Bondit ® B-45TH | PETG HS (SKC-Skyrol ® SP19H 160 g) | * | * |
| Bondit ® B-45TH | Isopropanol-treated PETG HS (SKC-Skyrol ® SP19H 160 g) | 366.63 | 36.46 |
| Bondit ® B-45TH | BOPP Backing (Griff Paper and Film) | * | * |
| Bondit ® B-45TH | Isopropanol-treated BOPP Backing (Griff Paper and Film) | * | * |
| Bondit ® B-45TH | PVC Heat Shrink (ULine Centerfold 75 gauge #S-7755) | 32.78 | 15.87 |
| Bondit ® B-45TH | Isopropanol-treated PVC Heat Shrink (ULine Centerfold 75 gauge #S-7755) | 66.53 | 31.11 |

TABLE 5-continued

Bond Strength of Various Backing, Heat Shrink, and Adhesive Combinations.

| Adhesive | Material | Avg. Str. N/M | St. Dev. |
|---|---|---|---|
| Bondit ® B-45TH | Polyolefin (PE) HS (McMaster Polyolefin HS Film 75 g #19435T2) | 2.36 | 1.31 |
| Bondit ® B-45TH | Isopropanol-treated Polyolefin (PE) HS (McMaster Polyolefin HS Film 75 g #19435T2) | 2.26 | 0.80 |
| 3M DP-8005 ™ | PET Backing (McMaster #8567K104 (.0005")) | 8.4 | 1.81 |
| 3M DP-8005 ™ | Isopropanol-treated PET Backing (McMaster #8567K104 (.0005")) | * | * |
| 3M DP-8005 ™ | PETG HS (SKC-Skyrol ® SP19H 160 g) | * | * |
| 3M DP-8005 ™ | Isopropanol-treated PETG HS (SKC-Skyrol ® SP19H 160 g) | * | * |
| 3M DP-8005 ™ | BOPP Backing (Griff Paper and Film) | * | * |
| 3M DP-8005 ™ | Isopropanol-treated BOPP Backing (Griff Paper and Film) | * | * |
| 3M DP-8005 ™ | PVC Heat Shrink (ULine Centerfold 75 gauge #S-7755) | * | * |
| 3M DP-8005 ™ | Isopropanol-treated PVC Heat Shrink (ULine Centerfold 75 gauge #S-7755) | * | * |
| 3M DP-8005 ™ | Polyolefin (PE) HS (McMaster Polyolefin HS Film 75 g #19435T2) | 0.23 | .31 |
| 3M DP-8005 ™ | Isopropanol-treated Polyolefin (PE) HS (McMaster Polyolefin HS Film 75 g #19435T2) | 0.11 | 0.39 |
| Loctite ® 3034 ™ | PET Backing (McMaster #8567K104 (.0005")) | 5.60 | 2.54 |
| Loctite ® 3034 ™ | Isopropanol-treated PET Backing (McMaster #8567K104 (.0005")) | 15.12 | 8.75 |
| Loctite ® 3034 ™ | PETG HS (SKC-Skyrol ® SP19H 160 g) | * | * |
| Loctite ® 3034 ™ | Isopropanol-treated PETG HS (SKC-Skyrol ® SP19H 160 g) | * | * |
| Loctite ® 3034 ™ | BOPP Backing (Griff Paper and Film) | 22.14 | 15.90 |
| Loctite ® 3034 ™ | Isopropanol-treated BOPP Backing (Griff Paper and Film) | 13.28 | 15.66 |
| Loctite ® 3034 ™ | PVC Heat Shrink (ULine Centerfold 75 gauge #S-7755) | * | * |
| Loctite ® 3034 ™ | Isopropanol-treated PVC Heat Shrink (ULine Centerfold 75 gauge #S-7755) | * | * |
| Loctite ® 3034 ™ | Polyolefin (PE) HS (McMaster Polyolefin HS Film 75 g #19435T2) | 0.78 | 0.46 |
| Loctite ® 3034 ™ | Isopropanol-treated Polyolefin (PE) HS (McMaster Polyolefin HS Film 75 g #19435T2) | 1.16 | 0.01 |

* = no data available. In peel tests, the concerned interface never experienced a peel.

C. Composite Characteristics

1. Curl Test

Composites were constructed comprising PET backing (McMaster #8567K104 (0.0005"), #8567K12 (0.001"), and #8567K52 (0.005")) and PETG shrink film (SKC-Skyrol® SP19H 160 g and 200 g) laminated together with Bondit® B-45TH. Following construction, the composites were exposed to different temperature conditions and the ability of the heat shrink film to activate and induce a temporary curl, as well as a permanent and repeatable cross-web curl structure in the composite material was examined.

Lab tests methods were developed capable of inducing a temporary cross-web curl structure and a permanent cross-web curl structure for evaluation of samples. The procedure developed for inducing a temporary cross-web curl structure involved heating a hot plate across a range of set temperatures. The composites were cut into a longitudinal strip 33-35 mm long and 10 mm wide, with the width dimension along the axis of intended imparted cross-web curl structure. The various composites were then placed on the hot plate and the cross-web curl structure height was measured every 10 seconds using the calipers/ruler for a total of two minutes. The curl angle was determined by approximating each curled side as the hypotenuse of a right triangle. Therefore, curl angle was calculated using the following formula: $\theta = \tan^{-1}(2 h/l)$, where theta is the curl angle, h is the curl height, and l is the length. The factor of two accounts for the fact that curling takes place on both sides across half of the length. The results of the temporary cross-web curl structure imparted on the various composites across different temperatures is shown in FIG. 20A, FIG. 20B, FIG. 20C, and FIG. 20D.

The procedure developed for imparting a permanent cross-web curl structure curl for testing purposes involved heating a hot plate across a range of set temperatures and placing an aluminum bar on the hot plate. The aluminum bar was approximately ⅓ the width of the film strip. The composites were cut into a longitudinal strip, with the width dimension along the axis of intended imparted cross-web curl structure. The composite strips were placed on top of the aluminum bar, with the aluminum bar being directly under the middle of the strip. Pressure was applied to the composite in order to flatten the strip, so equal heating occurred along the length of the composite. The angle of cross-web curl structure induced was then measured. The test method proved to be repeatable and achieved consistent results.

It was found that varying process characteristics to achieve different degrees of arc is feasible under the conditions used in these experiments within a range of cross-web curl structure angles from about 5 to 45. With the particular films and adhesives tested in these particular set of experiments, the best results for temporary cross-web curl structure occurred at 70 C, 160 gauge heat shrink and 0.5 mil PET backing Thicker heat shrink films were found to more consistently outperform thinner grades only for higher backing thicknesses. The effect becomes less pronounced and consistent with lower backing thicknesses. All grades were tested for ability to activate into a permanent cross-web curl structure. All showed this capability with some ability to customize the angle between 5 and 45 under the current experimental conditions depending on the grades of backing and heat shrink.

2. T-Peel Test

In order to determine if activating the heat shrink film to induce a cross-web curl structure within the composite affected the bond strength between the backing material and heat shrink material, a peel test was performed on cross-web curl structure induced composites and compared to non-curl induced composites. Composites were constructed comprising PET backing (McMaster #8567K104 (0.0005"), #8567K12 (0.001"), and #8567K52 (0.005")) and PETG shrink film (SKC-Skyrol® SP19H 160 g and 200 g) laminated together with Bondit® B-45$^{TH}$. The effects of thickness of the backing and heat shrink films on peel strength were also examined.

In short, 12" long by 1" wide strips of backing or shrink film materials where prepared, with 3" of the end length being not laminated. The width and thickness of the composite was measured. Composites that were to be peel tested following cross-web curl structure induction were exposed to heat as described above for a period of two minutes. The free ends (the non-bonded 3" ends of the composite) where clamped, and the peel was calculated over a length of at least 127 mm (5") using a machine. The peel strength was calculated by dividing the load imparted by the bond by the width of the strip. To determine average peel strength, the resultant graph of load v. extension was examined. The preliminary spike due to initial break and stop when the load starts to decline near the end of the test was eliminated.

Figure 21A:
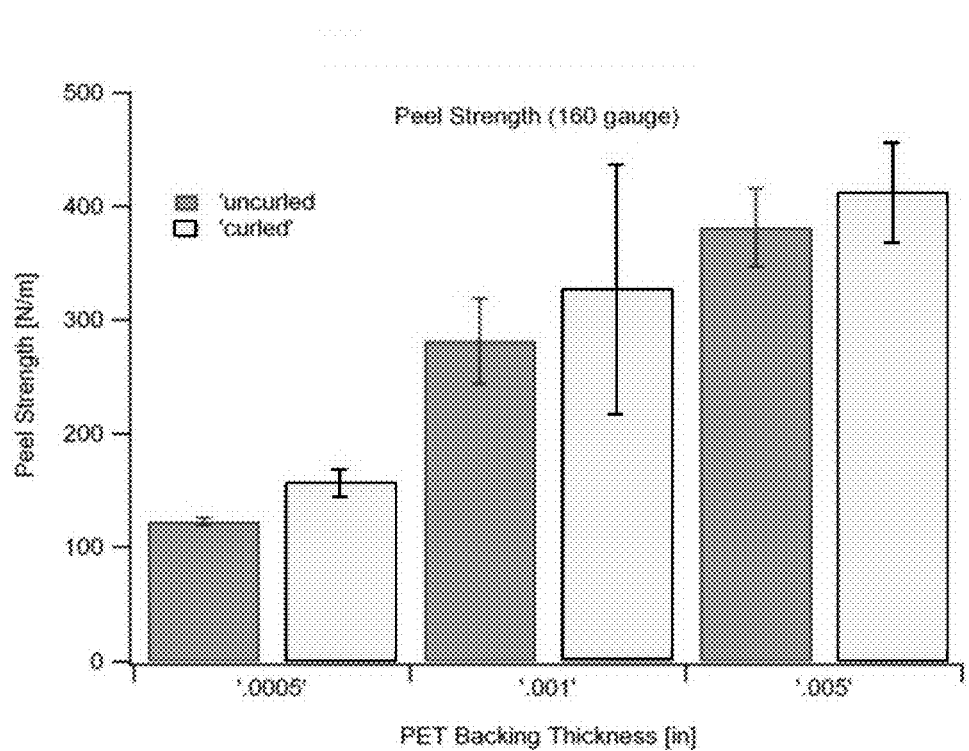
FIG. 21 shows the peel strength of various curled and uncurled composites comprising 160 gauge (FIG. 21A) and 200 gauge (FIG. 21B) PETG HS with varying PET backing thickness.
Figure 21B:
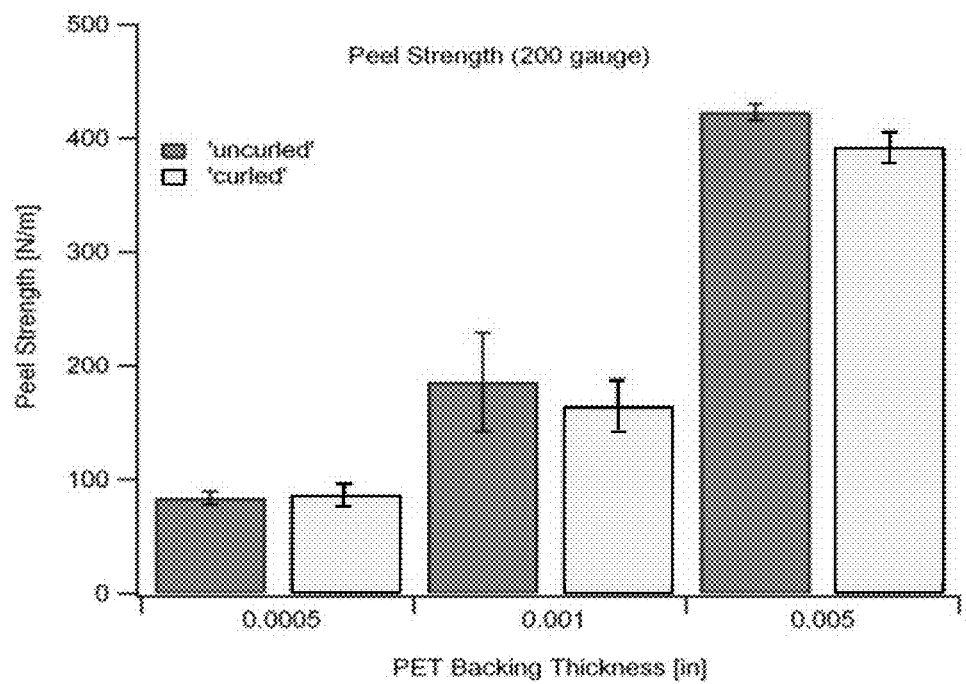

FIG. 21A and FIG. 21B shows that peel strength was found to consistently increase with an increase in backing thickness using the particular adhesives of this experiment. It was also found that for the same backing thickness, a decrease in heat shrink film thickness caused higher peel strength, but this effect becomes less significant, and in some cases reversed, at higher backing thicknesses under these specific conditions and backing, shrink film, and adhesive combinations. Adhesive coat weights, ranging from 0.11-0.18 lb./f$^2$, were not found to have any major effect on peel strength. These results are summarized in Tables 6 and 7.

TABLE 6

Bond strength with 200 gauge PETG HS with Varying PET Backing Thickness in an Uncurled Composite.

| Heat Shrink Thickness [gauge] | Adhesive | Backing Type | Backing Thickness [mil] | Average Peel Strength [N/m] | Standard Deviation |
|---|---|---|---|---|---|
| 160 | Bondit® B-45TH | PET | 0.5 | 123.03 | 3.31 |
| 160 | Bondit® B-45TH | PET | 1 | 281.71 | 37.53 |
| 160 | Bondit® B-45TH | PET | 5 | 381.36 | 34.32 |
| 200 | Bondit® B-45TH | PET | 0.5 | 84.06 | 5.78 |
| 200 | Bondit® B-45TH | PET | 1 | 185.90 | 43.41 |
| 200 | Bondit® B-45TH | PET | 5 | 423.19 | 7.35 |

TABLE 7

Bond strength with 200 gauge PETG HS with Varying PET Backing Thickness in a Curled Composite.

| Heat Shrink Thickness [gauge] | Adhesive | Backing Type | Backing Thickness [mil] | Average Peel Strength [N/m] | Standard Deviation |
|---|---|---|---|---|---|
| 160 | Bondit® B-45TH | PET | 0.5 | 157.42 | 11.47 |
| 160 | Bondit® B-45TH | PET | 1 | 326.87 | 109.77 |
| 160 | Bondit® B-45TH | PET | 5 | 412.81 | 43.2 |
| 200 | Bondit® B-45TH | PET | 0.5 | 86.91 | 9.78 |
| 200 | Bondit® B-45TH | PET | 1 | 165.17 | 23.12 |
| 200 | Bondit® B-45TH | PET | 5 | 392.11 | 13.68 |

3. Viscosity Modifier

In order to determine if diluting the epoxy adhesive with a viscosity modifier affected the peel strength between the backing material and heat shrink material, a peel test was performed on a composite comprising PET backing (McMaster #8567K104 (0.0005")) and PETG shrink film (SKC-Skyrol® SP19H 200 g) laminated together with Bondit® B-45TH. Heloxy™ 68 Modifier was used to dilute Bondit®B-45$^{TH}$. It was found that viscosity of Part B decreased with an increase in Heloxy™ 68 Modifier concentration. Heloxy™ 68 Modifier decreased the viscosity of the Bondit® B-45TH mixture to around 2100 cP when mixed at 40% with Part B prior to mixture of Part A. The results are shown in FIG. 22 and summarized in Table 8.

A T-Peel Test was performed as described in Example 1.C.2 above: The purpose was to determine the effect of Heloxy™ 68 on the peel strength between a PET backing (McMaster #8567K104 (0.0005")) and PETG shrink film (SKC-Skyrol® SP19H 200 g) laminated together with Bondit® B-45TH. Heloxy™ 68 was found to decrease peel strength compared to non-diluted Bondit® B-45TH, but qualitatively did not shear by hand. Table 9 summarizes the results, where bond strength is expressed in terms of load in Newtons normalized by the width in meters.

TABLE 8

Figure 22:
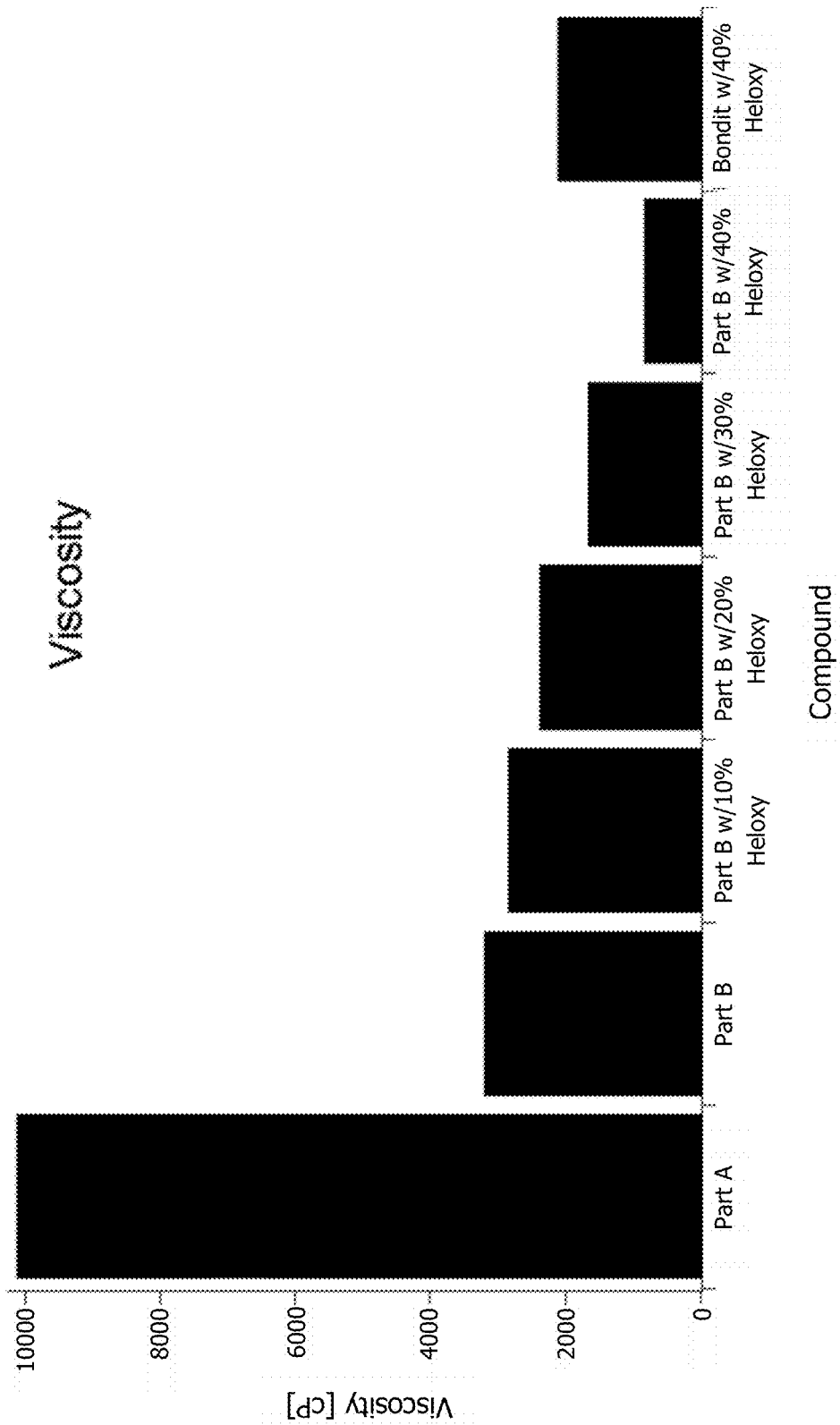
FIG. 22 shows the Dynamic Viscosity of epoxy that has been diluted with various concentrations of a diluent.

Viscosity data for FIG. 22.

| Compound | Dynamic Viscosity [cP] |
|---|---|
| Part A | 10100 |
| Part B | 3200 |
| Part B w/10% Heloxy ™ 68 | 2900 |
| Part B w/20% Heloxy ™ 68 | 2400 |
| Part B w/30% Heloxy ™ 68 | 1100 |
| Part B w/40% Heloxy ™ 68 | 850 |
| Bondit ®B-45 ™ w/40% Heloxy ™ 68 | 2100 |

TABLE 9

Effects of Diluent on Bond Strength.

| Heat Shrink Thickness [gauge] | Adhesive | Backing Type | Backing Thickness [mil] | Average Peel Strength [N/m] | Standard Deviation |
|---|---|---|---|---|---|
| 200 | Bondit ® B-45TH | PET | 0.5 | 84.06 | 5.78 |
| 200 | Bondit ® B-45TH with 40% Heloxy ™ 68 | PET | 0.5 | 54.69 | 16.27 |

Example 2

Additional backing materials vinyl and EVA were laminated to 200 gauge PETG shrink film and laminated with Bondit® B-45[111] adhesive. T-peel tests as described in Example 1.C.2 above were performed to determine the peel strength of the lamination between the backings and heat shrink film. Vinyl backed composites made with PETG heat shrink and Bondit® B-45TH had good peel strength, while EVA backed samples had lower but likely suitable peel strength for a target use. The peel strength of these laminates is summarized in Table 10.

Cross-web curl structure impartation tests were also performed as described in Example 1.C.1 above. EVA backed composites performed moderately well in temporary impartation of cross-web curl structure tests, but were found to over-curl during permanent curl treatment unless handled carefully. Vinyl backed composites were found to curl very quickly, but then flatten back out during temporary curl. Like EVA, they tended to be sensitive to curling.

TABLE 10

Peel Strength between EVA Backing, Vinyl Backings, and PETG Shrink Film Laminated with Bondit ® B-45TH Adhesive.

| Heat Shrink Thickness [gauge] | Adhesive | Backing Type | Backing Thickness [mil] | Average Peel Strength [N/m] | Standard Deviation |
|---|---|---|---|---|---|
| 200 | Bondit ® B-45TH | Vinyl | 11.8 | 321.81 | 162.37 |
| 200 | Bondit ® B-45TH | EVA | 12 | 66.14 | 12.09 |

Example 3

The ability for a composite material comprised of a PET backing (McMaster #8567K104 (0.0005")) and PETG shrink film (SKC-Skyrol® SP19H 200 g) laminated together with a two-component solvent-less, aliphatic polyurethane (Purelam Fastcure™ 110/230 100% solids adhesive from Ashland, Inc.) to resist delamination was examined. The shrink film in all samples made failed before any peel occurred, indicating significant and durable peel strength between the backing and shrink film.

Example 4

The ability of composite samples to, upon heating, create a cross-web curled structure exhibiting a longitudinal extendibility or rigidity as a result of the backing material cooperating with or interacting with the shrink film in the composite material was examined. In addition, the ability of the backing material and shrink film to resist delamination was also examined.

Using 8"×11" sheet samples, 92 gauge PET backing was laminated to 160 gauge heat shrinkable SKC SP19H PETG film using a 3M 467 type solution acrylic pressure sensitive adhesive applied at a thickness of about 1.0 mil. The following parameters were evaluated: effect of adhesive cure on cross web curl after laminating, the effect of laminating temperature on cross web curl, and the peel strength between the backing material and the shrink film.

Following creation of the composite material, it was observed that the degree of cure of the particular adhesive used in the composite did not significantly affect cross web curl. Cross web curl was generated in the activated laminates in all experiments. Laminating 2 layers of 92 gauge PET together (i.e., without a shrink film) and exposing to heat does not exhibit significant cross web curl structure.

In addition, it was shown that when composites were laminated at 210 F (98 C), the heat shrink film was capable of being activated during the lamination process with simultaneous cross web curl structure generated. For example, when 8"×11" sample sheets of PET backing and PETG shrink film were laminated using the above described solution acrylic PSA at either 210 F or room temperature, the composite laminated at 210 F exhibited cross-web curl structure (and self-extendibility) when subsequently cut into 1" strips, while the composite laminated at room temperature wherein the shrink film is not activated did not.

The peel strength between the PET backing and PETG shrink film using the above identified solution acrylic PSA was also examined utilizing Pressure Sensitive Tape Council Protocol 1 (PSTC-1: Peel Adhesion for Single Coated Pressure Sensitive Tapes at 180 Angle). The peel strength of the solution acrylic PSA on stainless steel (36.7 oz./in.) is typical for this fully cured adhesive and demonstrates permanency. The bond strength of the solution acrylic PSA between the PET backing and PETG Film was high at 65.7 oz./in.

Example 5

The ability of composite samples formed from differing adhesive chemistries to resist delamination was examined.

Using 8"×11" sheet samples, 92 gauge PET backing was laminated to 160 gauge heat shrinkable SKC SP19H PETG film using the following adhesives:
  a) a two-component solventless, aliphatic polyurethane (Purelam Fastcure™ 110/230 100% solids adhesive from Ashland, Inc.);
  b) a two-component solventless, aliphatic polyurethane (Purelam™ 6000/6050 100% solids adhesive from Ashland, Inc.);
  c) a two-component solventless, aliphatic polyurethane (Purelam™ Hybrid/6050 100% solids adhesive from Ashland, Inc.);
  d) a water-based polyurethane dispersion with epoxy cross-linker (Purethane™ A 4020 adhesive from Ashland, Inc.);
  e) a water-based hybrid polyurethane dispersion/acrylic emulsion with epoxy cross-linker (Purethane™ A 1078 from Ashland, Inc.);
  f) a water-based hybrid polyurethane dispersion/acrylic emulsion with epoxy cross-linker (Purethane™ A 1090 from Ashland, Inc.);
  g) a water-based polyurethane dispersion (Purethane™ A 4025 from Ashland, Inc.);
  h) a solvent-based polyester with isocyanate crosslinker "F" (Solvester™ SB-F from Ashland, Inc.); and,
  i) a solvent-based polyester with isocyanate "A" (Solvester™ SB-A from Ashland, Inc.).

The adhesives were applied to according to standard lab laminating practices as defined for each adhesive. All adhesive combinations exhibited good peel strength when measured by hand and maintained the flexibility of the composite material post-adhesive cure.

Example 6

The ability to produce large amounts of composite materials with an imparted cross-web curl structure on a commercial laminating machine was examined. 92 gauge PET backing was laminated to 160 gauge heat shrinkable PETG film (SP19H Heat Shrink PETG Film from SKC, Inc.) using a water-based hybrid polyurethane dispersion/acrylic emulsion with epoxy cross-linker (Purethane™ A 1078 from Ashland, Inc.). The 92 gauge PET roll was 26.5", while the 160 gauge heat shrink film roll was 27.625". Three separate production runs were performed.

The first production run consisted of laminating the PET backing to the shrink film at a temperature below the heat curing temperature of the adhesive and below the onset activation temperature of the shrink film. The adhesive was diluted to 22% solids was applied to the PET backing at 150 FPM using a TH120 Microgravure Cylinder. The application measured 2.85#/rm coat weight, and equated to an applied thickness of less than about 0.2 mils. At 150 FPM the coating was clear, dry to the touch, and felt a little tacky. The heat shrink film was corona treated prior to lamination to promote bond to the laminating adhesive, and the backing and heat shrink films were laminated across a laminating roller set at room temperature. Upon lamination of the heat shrink film to the PET backing, the final laminate laid flat and showed an adequate bond by hand testing. A roll comprising 3,467' of laminate was manufactured. A sample of about 3"xabout 36" was cut from the roll and run through a heated laminator. A cross-web curl structure was induced in the composite material, and the arc was in the shape of a semicircular curl of between 90° and 180° towards the heat shrink film. The composite material with the induced cross-web curl displayed a self-extending capability extending the entire length of the sample.

A second production run was performed using essentially the same initial operating conditions as the previous run, except the laminating roller was heated to 165° F. at its surface. The laminating temperature of 165° F. is both the initial onset activation temperature of the heat shrink film as well as the minimum curing temperature of the adhesive. A roll comprising 3,970' was manufactured. The laminated composite material, following heated lamination at 165° F., exhibited a semicircular curl towards the heat shrink film when pulled from the roll, and exhibited a self-supporting not present in the composite material laminated at room temperature. In addition, the final laminate exhibited a permanent bond between the backing and the heat shrink film.

A third production run was performed using essentially the same operating conditions as above, except the laminating roller was heated to 200° F. Because the shrink film exhibited excessive shrink at this temperature, the laminating roller was reduced to 175° F. A roll comprising approximately 400' was manufactured. The center 18" of the laminate was smooth. ¾"×36" samples were cut out of the center of the laminate roll, and exhibited perfect semicircle cross-web curl structures of about 180°. The ¾"×36" long sample had enough structure to hold straight-out without any support, thus exhibiting self-supporting capabilities of at least 36 inches.

Example 7

A sample from the second production run described in example 6 above was subsequently processed into 2" wide rolls×300 ft long on a 3" core roll. The sample exhibited mild cross-web curl structure. In order to determine if the cross-web curl structure could be further modified, a 36" long strip was removed from the roll and exposed to a heated water-bath at about 170° F. for approximately 3 seconds. Exposure to the water-bath resulted in the further shrinking of the shrink film contained in the composite material, and the impartation of a greater arc degree of the cross-web curl structure within the composite, indicating the ability to control the arc of the curvature by exposing the composite to various temperature profiles. The 36" long strip exhibited no bending moment, and extended without bending or buckling across its entire 36" length.

Example 8

To determine the ability to control the degree of cross-web curl structure imparted on the composite materials, the second production run described in Example 6 was further processed under various shrink film induction conditions. A number of trials were run using a commercial laminator and rewinder. Variable conditions included roller temperature, laminator and rewinder speed, and actual composite material (web) temperature. The NIP pressure of the laminator was constant at 60 psi. The trials generally indicated that, as the web temperature increases, the achieved degree of arc in the cross-web curl increased. Achieving web temperatures of about 157° F.-158° F. resulted in the impartation of sufficient cross-web curl structure so that a 2" wide sample could be extended horizontally without buckling or bending greater than 36 inches. Comparatively, prior to impartation of the cross-web curl structure, the composite was incapable of extension or self-support beyond about two inches. Similarly, achieving web temperatures of about 162° F.-167° F. resulted in the impartation of sufficient cross-web curl structure so that a ¾" wide sample could be extended horizontally without buckling or bending greater than 36 inches. As with the 2" wide sample, prior to impartation, the cross-web curl structure, the composite was incapable of extension or self-support beyond about two inches.

The invention envisions and includes modifications and alternative forms of the specific embodiments shown by way of example in the drawings. There is no intention that the invention is limited to the particular embodiments described; it covers all modifications, equivalents, and alternatives.

What is claimed is:

1. A self-supporting composite having an axial length and a longitudinal width, the composite comprising:
    a polyester film backing having a first surface and a second surface;
    a heat activated polyester shrink film comprising a first surface and a second surface;
    a polyurethane adhesive disposed between the second surface of the backing and the first surface of the shrink film, wherein the polyurethane adhesive is a water-based polyurethane dispersion selected from the group consisting of a water-based hybrid polyurethane dispersion with epoxy cross-linker and a water-based hybrid polyurethane/acrylic emulsion with epoxy cross-linker,
    the shrink film being oriented within the composite wherein, upon activation, the shrink film contracts greater along the longitudinal width of the composite than the axial length;
    and the axial length of the composite has a curvature about the longitudinal width of the composite material induced by heat activation of the shrink film, wherein the curvature is in the shape of an arc and which curvature imparts stiffness to the composite, and wherein the composite material when extended is self-supporting.

2. The composite of claim 1, wherein the shrink film comprises a polyethylene terephthalate (PET) film.

3. The composite of claim 1, wherein the shrink film comprises a polyethylene terephthalate glycol (PETG) film.

4. The composite of claim 1, wherein the backing material comprises a polyethylene terephthalate (PET) film.

5. The composite of claim 1, wherein the composite has a bond of at least about 35 ounces per inch between the backing and shrink film.

6. The composite of claim 1, wherein the polyurethane adhesive is a heat curing adhesive with a minimum curing temperature at or below the heat activation temperature of the shrink film.

7. The composite of claim 1, wherein the polyurethane adhesive is a heat curing adhesive with a minimum curing temperature at or above the heat activation temperature of the shrink film.

8. The composite of claim 1, wherein the shrink film has a shrink profile from its onset activation temperature to its maximum shrink potential of at least about 30° C. or greater.

9. The composite of claim 1, wherein the first surface of the backing material or the second surface of the shrink film further comprises a pressure sensitive adhesive.

10. The composite of claim 1, wherein the arc of the induced curvature is between about at least 15° and less than 360°.

11. The composite of claim 1, wherein the adhesive disposed between the backing and shrink film is less than about 0.2 mils.

12. The composite of claim 1, wherein the adhesive disposed between the backing and shrink film is less than about 0.15 mils.

13. The composite of claim 1, wherein the first surface of the shrink film has a surface energy of at least about 35 dynes/cm.

14. The composite of claim 13, wherein the first surface of the shrink film has not been activated or treated.

15. The composite of claim 13, wherein the first surface of the shrink film has been activated or treated.

16. The composite of claim 1, wherein the second surface of the backing has a surface energy of at least about 35 dynes/cm.

17. The composite of claim 16, wherein the second surface of the backing has not been activated or treated.

18. The composite of claim 16, wherein the second surface of the backing has been activated or treated.

19. The composite of claim 1, wherein the polyurethane dispersion is a water-based hybrid polyurethane dispersion with epoxy cross-linker.

20. The composite of claim 1, wherein the polyurethane dispersion is a water-based hybrid polyurethane/acrylic emulsion with epoxy cross-linker.

21. A method for manufacturing a self-supporting composite having an axial length and a longitudinal width comprising:
    providing a backing material having a first surface and a second surface;
    providing a heat shrink film comprising a first surface and a second surface, the shrink film having an onset activation temperature that, when the shrink film is exposed to such temperature, the temperature induces shrinkage within the shrink film;

heating a polyurethane adhesive to a temperature that exceeds the activation temperature of the shrink film;

applying the polyurethane adhesive to the second surface of the backing material;

laminating the second surface of the backing material with the first surface of the shrink film to create the composite, wherein the shrink film is oriented within the composite so that, upon activation, the shrink film contracts greater along the longitudinal width of the composite than the axial length;

wherein, at the time of lamination, the temperature of the polyurethane adhesive exceeds the activation temperature of the shrink film inducing the shrink film to activate; and wherein the activation of the shrink film creates a longitudinal curvature about the longitudinal width of the composite material induced by heat activation of the shrink film, wherein the curvature is in the shape of an arc and which curvature imparts stiffness to the composite, and wherein the composite material when extended is self-supporting.

22. The method of claim 21, wherein the backing material comprises a polyester film, the shrink film comprises a polyester film, and the polyurethane adhesive is selected from the group consisting of a two-component polyurethane, a polyurethane dispersion, a polyurethane dispersion with epoxy cross-linker, and a hybrid polyurethane dispersion/acrylic emulsion.

23. A method for manufacturing a self-supporting composite having an axial length and a longitudinal width comprising:

providing a backing material having a first surface and a second surface;

providing a heat shrink film comprising a film having a first surface and a second surface, the shrink film having an onset activation temperature that, when the shrink film is exposed to such temperature, the temperature induces shrinkage within the shrink film;

providing a heat curing polyurethane adhesive having a minimal curing temperature below the initial activation temperature of the shrink film;

applying the heat cure polyurethane adhesive to the second surface of the backing material;

heat laminating the second surface of the backing material with the first surface of the shrink film to create the composite, wherein the shrink film is oriented within the composite so that, upon activation, the shrink film contracts greater along the longitudinal width of the composite than the axial length;

wherein, at the time of lamination, the materials are exposed to a temperature sufficient to cure the adhesive but less than the activation temperature of the shrink film; and, subsequently exposing the composite to a temperature sufficient to activate the shrink film, wherein the activation of the shrink film creates a longitudinal curvature about the longitudinal width of the composite material induced by heat activation of the shrink film, wherein the curvature is in the shape of an arc and which curvature imparts stiffness to the composite, and wherein the composite material when extended is self-supporting.

24. The method of claim 23, wherein the backing material comprises a polyester film, the shrink film comprises a polyester film, and the heat cure polyurethane adhesive is selected from the group consisting of a two-component polyurethane, a polyurethane dispersion, a polyurethane dispersion with epoxy cross-linker, and a hybrid polyurethane dispersion/acrylic emulsion.

25. A method for manufacturing a self-supporting composite having an axial length and a longitudinal width comprising:

providing a backing material having a first surface and a second surface;

providing a heat shrink film comprising a film having a first surface and a second surface, the shrink film having an onset activation temperature that, when the shrink film is exposed to such temperature, the temperature induces shrinkage within the shrink film;

providing a heat cure polyurethane adhesive;

applying the polyurethane adhesive to the second surface of the backing material;

heat laminating the second surface of the backing material with the first surface of the shrink film to create the composite, wherein the shrink film is oriented within the composite so that, upon activation, the shrink film contracts greater along the longitudinal width of the composite than the axial length;

wherein, at the time of lamination, the materials are exposed to a temperature sufficient to cure the adhesive and activate the shrink film;

wherein the activation of the shrink film creates a longitudinal curvature about the longitudinal width of the composite material induced by heat activation of the shrink film, wherein the curvature is in the shape of an arc and which curvature imparts stiffness to the composite, and wherein the composite material when extended is self-supporting.

26. The method of claim 25, wherein the backing material comprises a polyester film, the shrink film comprises a polyester film, and the heat cure polyurethane adhesive comprises an adhesive selected from the group consisting of a two-component polyurethane, a polyurethane dispersion, a polyurethane dispersion with epoxy cross-linker, and a hybrid polyurethane dispersion/acrylic emulsion.

27. A self-supporting composite having an axial length and a longitudinal width, the composite comprising:

a polyester film backing having a first surface and a second surface;

a heat activated polyester shrink film comprising a first surface and a second surface;

a heat curing polyurethane adhesive disposed between the second surface of the backing and the first surface of the shrink film, the shrink film being oriented within the composite wherein, upon activation, the shrink film contracts greater along the longitudinal width of the composite than the axial length;

and the axial length of the composite has a curvature about the longitudinal width of the composite material induced by heat activation of the shrink film, wherein the curvature is in the shape of an arc and which curvature imparts stiffness to the composite, and wherein the composite material when extended is self-supporting.

28. The composite of claim 27, wherein the heat curing polyurethane adhesive is selected from the group consisting of a two component polyurethane, a hybrid polyurethane dispersion/acrylic emulsion, and a polyurethane dispersion.

29. The composite of claim 28, wherein the heat curing polyurethane adhesive is a polyurethane dispersion selected from the group consisting of a water-based hybrid polyurethane dispersion with epoxy cross-linker and a water-based hybrid polyurethane/acrylic emulsion with epoxy cross-linker.

30. The composite of claim 27, wherein the heat curing polyurethane adhesive has a minimum curing temperature at or below the heat activation temperature of the shrink film.

31. The composite of claim 27, wherein the heat curing polyurethane adhesive has a minimum curing temperature at or above the heat activation temperature of the shrink film.

32. The composite of claim 27, wherein the first surface of the backing material or the second surface of the shrink film further comprises a pressure sensitive adhesive.

* * * * *